United States Patent
Li et al.

(10) Patent No.: US 12,450,416 B2
(45) Date of Patent: Oct. 21, 2025

(54) INTEGRATED CIRCUIT AND METHOD OF FORMING THE SAME

(71) Applicant: TAIWAN SEMICONDUCTOR MANUFACTURING COMPANY, LTD., Hsinchu (TW)

(72) Inventors: Johnny Chiahao Li, Hsinchu (TW); Jung-Chan Yang, Hsinchu (TW); Jian-Sing Li, Hsinchu (TW); Hui-Zhong Zhuang, Hsinchu (TW); Jerry Chang Jui Kao, Hsinchu (TW); Xiangdong Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 604 days.

(21) Appl. No.: 17/821,559

(22) Filed: Aug. 23, 2022

(65) Prior Publication Data

US 2023/0385504 A1 Nov. 30, 2023

Related U.S. Application Data

(60) Provisional application No. 63/346,033, filed on May 26, 2022.

(51) Int. Cl.
| | |
|---|---|
| G06F 30/30 | (2020.01) |
| G06F 30/392 | (2020.01) |
| G06F 30/394 | (2020.01) |
| H10D 84/90 | (2025.01) |
| H10D 89/10 | (2025.01) |

(52) U.S. Cl.
CPC .......... *G06F 30/392* (2020.01); *G06F 30/394* (2020.01); *H10D 84/907* (2025.01); *H10D 89/10* (2025.01); *H10D 84/914* (2025.01); *H10D 84/975* (2025.01); *H10D 84/985* (2025.01)

(58) Field of Classification Search
None
See application file for complete search history.

(56) References Cited

U.S. PATENT DOCUMENTS

| | | | |
|---|---|---|---|
| 12,009,356 B2 * | 6/2024 | Ku | .......... H10D 89/10 |
| 2021/0240902 A1 * | 8/2021 | Ku | ........ H10D 62/121 |

FOREIGN PATENT DOCUMENTS

TW 202129532 8/2021

* cited by examiner

*Primary Examiner* — Leigh M Garbowski
(74) *Attorney, Agent, or Firm* — Hauptman Ham, LLP

(57) ABSTRACT

A method of forming an integrated circuit (IC) includes generating a netlist of a first circuit, generating a first cell layout of the first circuit, placing the first cell layout, by an automatic placement and routing (APR) tool, in a first region of a layout design. The first circuit is configured as a non-functional circuit. The first circuit includes a first pin and a second pin that are electrically disconnected from each other. Generating the netlist of the first circuit includes designating the first pin and the second pin as a first group of pins that are to be connected together. Placing the first cell layout by the APR tool includes connecting the first pin and the second pin in the first group of pins together thereby changing the first circuit to a second circuit. The second circuit is configured as a functional version of the first circuit.

20 Claims, 39 Drawing Sheets

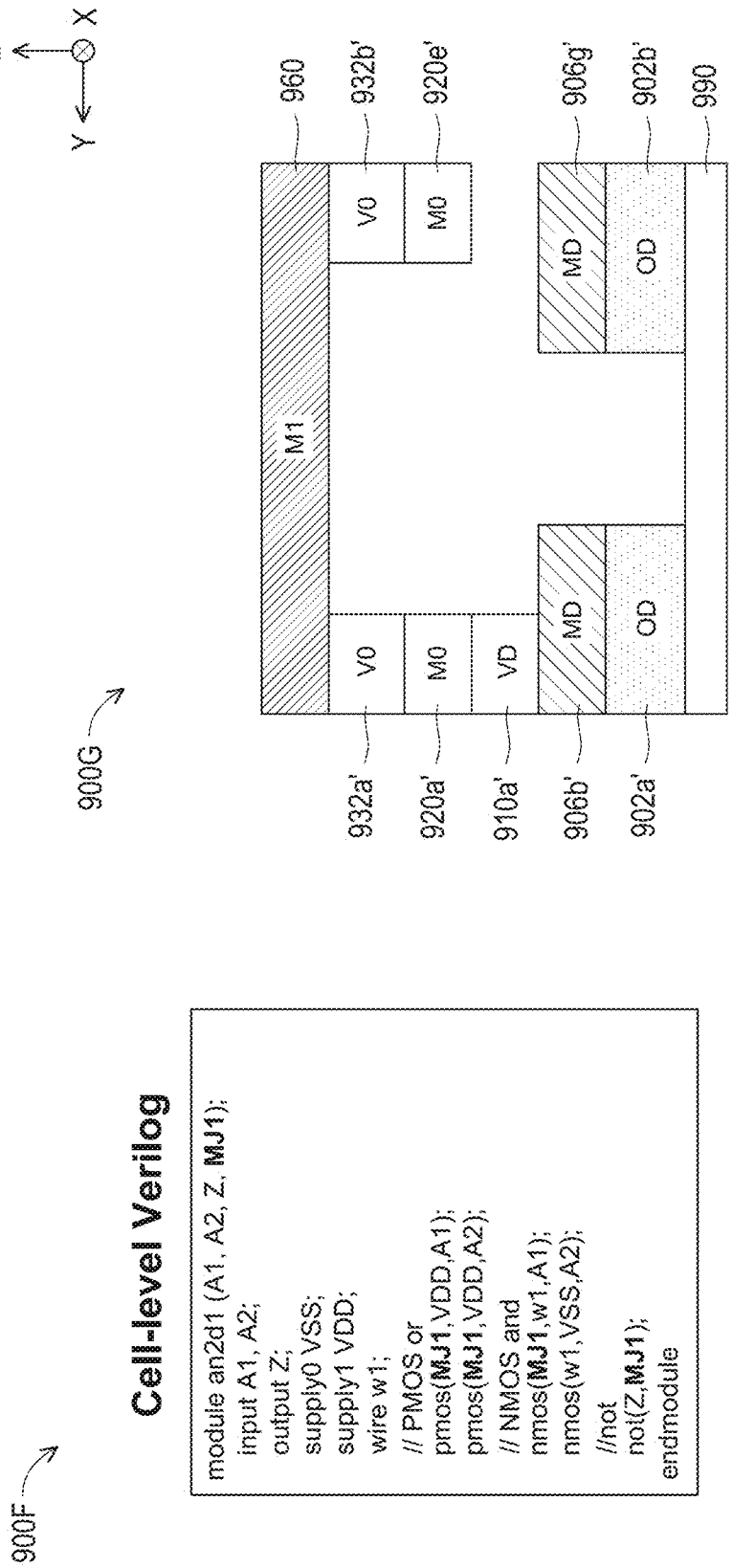

Cell-level Verilog

```
module an2d1 (A1, A2, Z, MJ1,MJ2);
input A1, A2;
output Z;
supply0 VSS;
supply1 VDD;
wire w1;
// PMOS or
pmos(MJ1,VDD,A1);
pmos(MJ1,VDD,A2);
// NMOS and
nmos(MJ2,w1,A1);
nmos(w1,VSS,A2);
//not
not(Z,MJ1);
endmodule
```

FIG. 10E

1000E

INTEGRATED CIRCUIT AND METHOD OF FORMING THE SAME

PRIORITY CLAIM

This application claims the benefit of U.S. Provisional Application No. 63/346,033, filed May 26, 2022, which is herein incorporated by reference in its entirety.

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9F is a diagram of a Verilog netlist of integrated circuit, in accordance with some embodiments.

FIG. 9G is a cross-sectional view of integrated circuit, in accordance with some embodiments.

FIG. 10E is a diagram of a Verilog netlist of integrated circuit, in accordance with some embodiments.

DETAILED DESCRIPTION

Figure 1:
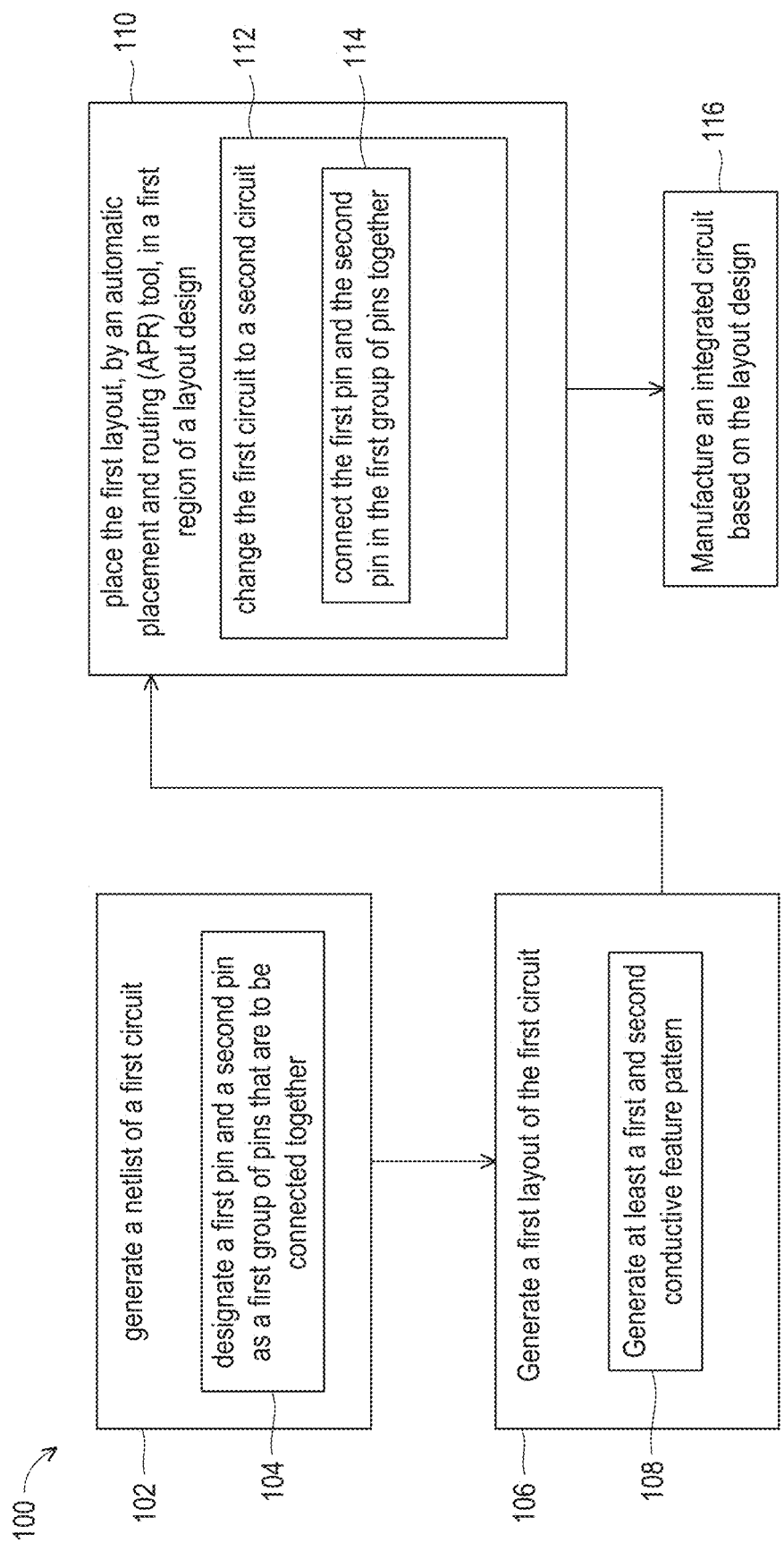
FIG. 1 is a flowchart of a method of manufacturing an integrated circuit in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a method of forming an integrated circuit includes generating a netlist of a first circuit. In some embodiments, the first circuit is configured as a non-functional circuit. In some embodiments, the first circuit includes a first pin and a second pin that are electrically disconnected from each other. In some embodiments, generating the netlist of the first circuit includes designating the first pin and the second pin as a first group of pins that are to be connected together.

In some embodiments, the method further includes generating a first cell layout of the first circuit, and placing the first cell layout, by an automatic placement and routing (APR) tool, in a first region of a layout design. In some embodiments, placing the first cell layout by the APR tool includes changing the first circuit to a second circuit. In some embodiments, the second circuit is configured as a functional version of the first circuit. In some embodiments, changing the first circuit to a second circuit includes connecting the first pin and the second pin in the first group of pins together.

In some embodiments, by connecting the first pin and the second pin in the first group of pins together by the APR tool results in a more flexible APR placement scheme and a more flexible layout design compared to other approaches.

FIG. 1 is a flowchart of a method 100 of manufacturing an integrated circuit in accordance with some embodiments. It is understood that additional operations may be performed before, during, and/or after the method 100 depicted in FIG. 1, and that some other processes may only be briefly described herein.

In some embodiments, other order of operations of one or more of methods 100, 200, 500, 600, 1600, 1700 or 1800 (FIG. 1, 2, 5-6 or 16-18) are within the scope of the present disclosure. One or more of methods 100, 200, 500, 600, 1600, 1700 or 1800 include exemplary operations, but the operations are not necessarily performed in the order shown. Operations may be added, replaced, changed order, and/or eliminated as appropriate, in accordance with the spirit and scope of disclosed embodiments.

Figure 20:
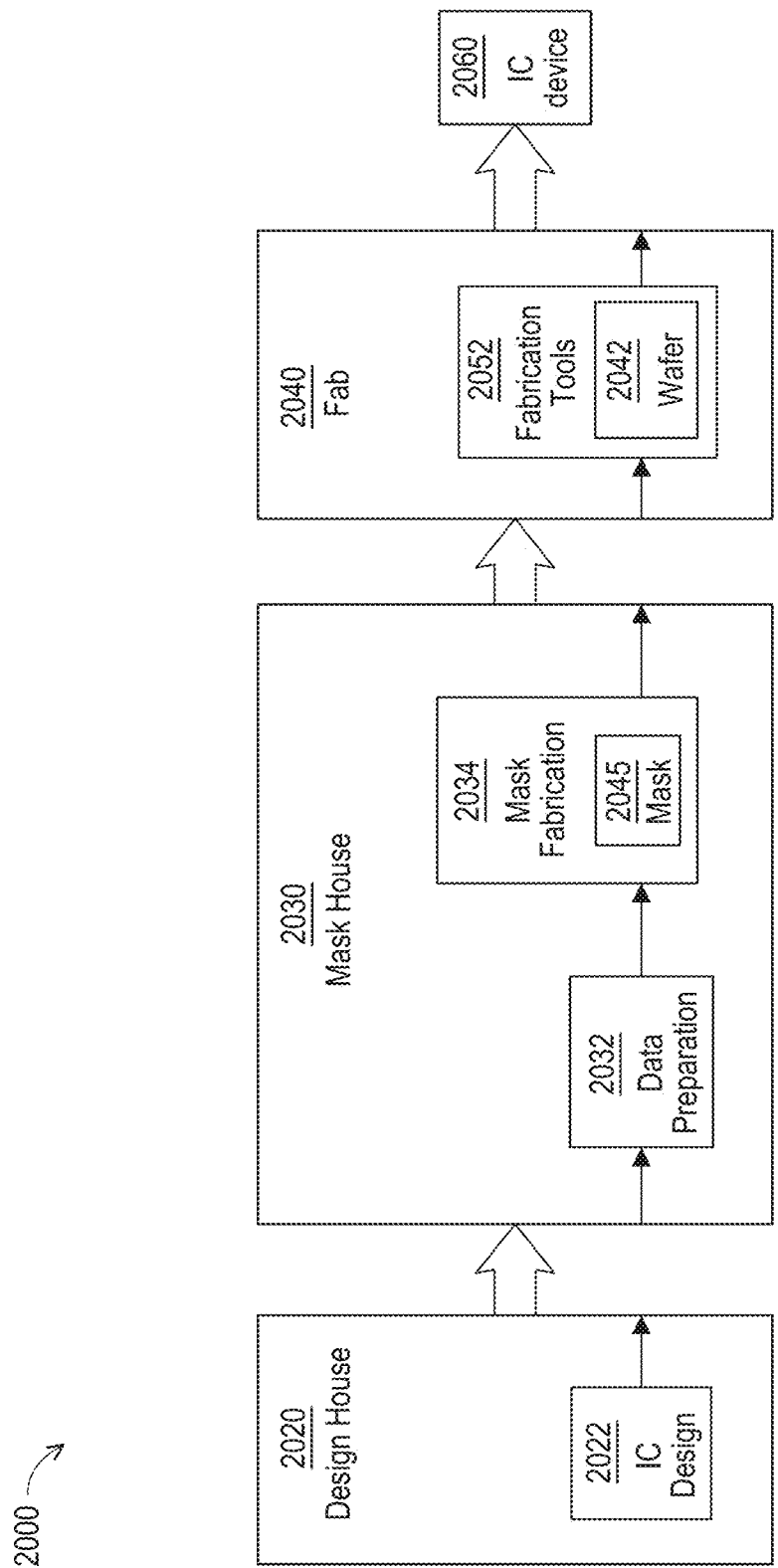
FIG. 20 is a block diagram of an IC manufacturing system, and an IC manufacturing flow associated therewith, in accordance with at least one embodiment of the present disclosure.

In some embodiments, the method 100 is usable to form integrated circuits, such as at least IC device 2060 (FIG. 20). In some embodiments, the method 100 is usable to form integrated circuits having similar structural relationships as one or more of layout 300 of FIG. 3 or layout 400 of FIG. 4, cells 320A1, 320A2, 320B-320E of FIG. 3, cells 400A-400B or 440A-440E of FIG. 4, layouts 700A-700C of FIGS. 7A-7C, layout 800 of FIG. 8, layouts 900C-900D of FIGS. 9C-9D, layouts 1000B-1000C of FIGS. 10B-10C, layouts 1100B-1100C of FIGS. 11B-11C, layouts 1200B-1200C of FIGS. 12B-12C, layouts 1300B of FIG. 13B, layouts 1400B of FIG. 14B or layouts 1500B-1500C of FIGS. 15B-15C.

In operation 102 of method 100, a netlist of a first circuit is generated. In some embodiments, the netlist includes a list of the components in the first circuit, and a list of nodes that are connected in the first circuit. In some embodiments, the netlist corresponds to a hardware description language, such as Verilog, VHDL or the like.

Figure 19:
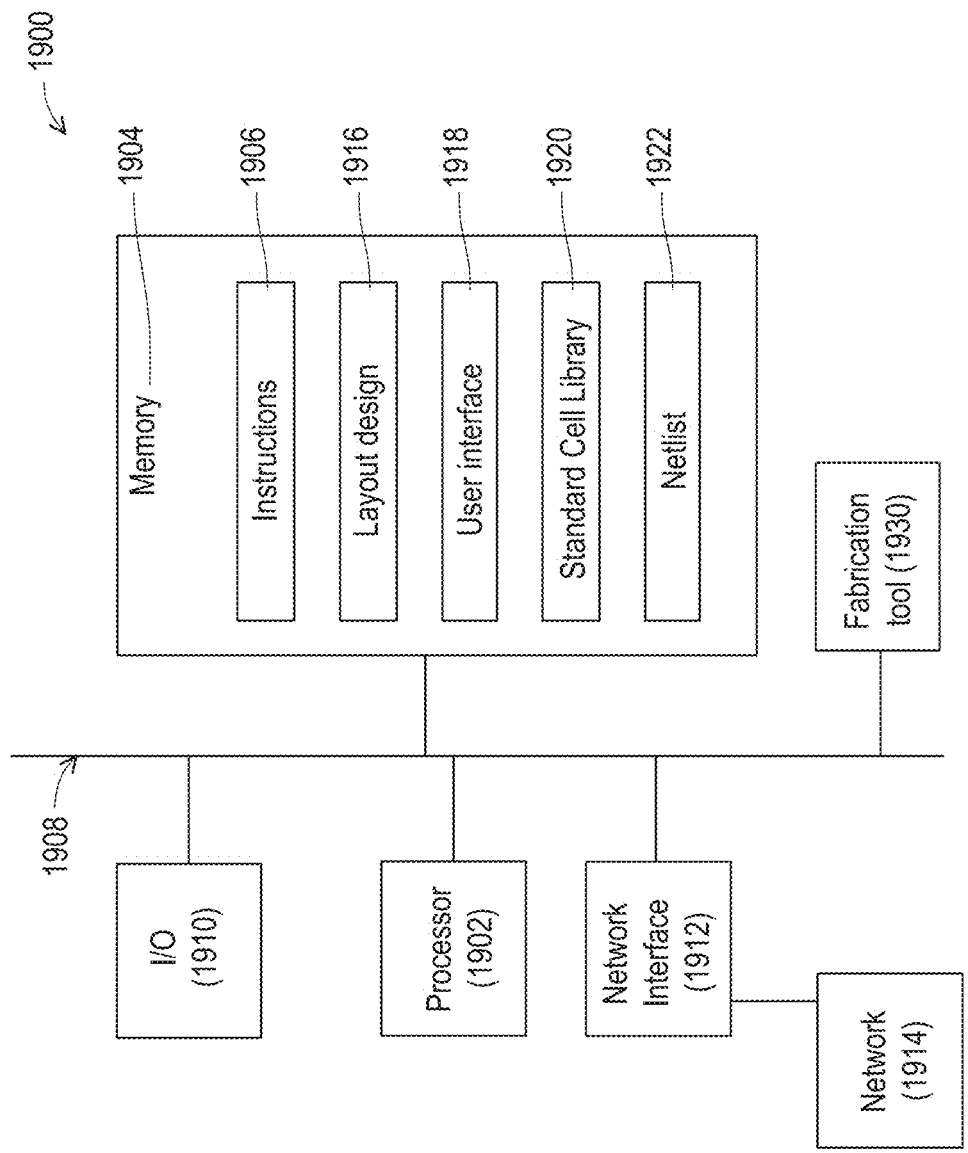
FIG. 19 is a schematic view of a system for designing an IC layout design and manufacturing an IC circuit in accordance with some embodiments.

In some embodiments, the netlist of method 100 includes at least netlist 1922 of FIG. 19. In some embodiments, the netlist of method 100 includes at least one of Verilog netlist 900F (FIG. 9F) or Verilog netlist 1000E (FIG. 10E).

In some embodiments, the netlist is created based on a schematic design of the first circuit. In some embodiments, the netlist is generated by one or more hardware simulators or hardware compiler, such as Simulation Program with Integrated Circuit Emphasis (SPICE). In some embodiments, the netlist of the first circuit is utilized by one or more EDA tools that generate a corresponding circuit schematic of the first circuit based on the netlist. In some embodiments, the circuit schematic of the first circuit is utilized by one or more EDA tools that generate the corresponding netlist of the first circuit. Non-limiting examples of circuit schematics are shown as at least one of circuit 900A of FIG. 9A, circuit 900B of FIG. 9B, circuit 900E of FIG. 9E, circuit 1000A of FIG. 10A, circuit 1000D of FIG. 10D, circuit 1100A of FIG. 11A, circuit 1100D of FIG. 11D, circuit 1200A of FIG. 12A, circuit 1200D of FIG. 12D, circuit 1300A of FIG. 13A, circuit 1400A of FIG. 14A, circuit 1500A of FIG. 15A or circuit 1500D of FIG. 15D.

In some embodiments, operation 102 of method 100 is performed by a processing device (e.g., processor 1902 (FIG. 19)) configured to execute instructions for generating the netlist of the first circuit. In some embodiments, operation 102 is implemented as a software application that is a portion of an EDA tool.

In some embodiments, the first circuit is configured as a non-functional circuit. In some embodiments, the non-functional circuit corresponds to a logic circuit that is part of a standard cell. In some embodiments, the non-functional circuit is a circuit that includes two or more pins or nodes disconnected from each other thereby causing the circuit to be non-functional, whereas if the two or more pins or nodes were connected to each other, then the circuit would be functional. For example, if the first circuit corresponds to an AND logic gate, one or more internal connections within the AND logic gate are disconnected, thereby causing the first circuit to not function as an AND logic gate, in accordance with some embodiments. In some embodiments, once the disconnected internal connections are connected, then the first circuit is transformed into a second circuit that is an AND logic gate (e.g., as shown in operation 112). In some embodiments, the first circuit is not limited to logic circuits, and includes other types of circuits that correspond to standard cells. For example, in some embodiments, the first circuit includes one or more memory cells.

In some embodiments, the first circuit includes one or more internal pins (e.g., first pin, second pin, etc.) that are disconnected from each other, thereby causing the first circuit to be a non-functional circuit.

In some embodiments, each pin is associated with one or more transistor devices or circuit components. In some embodiments, internal connections between two or more transistor devices correspond to the connections between the first pin and the second pin. In some embodiments, internal connections between at least one transistor device and another circuit component correspond to the connections between the first pin and the second pin.

In some embodiments, the first circuit corresponds to a standard cell that is stored in a standard cell library, such as standard cell library 1920 in FIG. 19. In some embodiments, the first circuit includes a first pin and a second pin that are electrically disconnected from each other. In some embodiments, the first pin and the second pin of the first circuit are electrically connected to each other in operation 110 by an APR tool during the APR stage of the design.

Figures 9A, 9B:
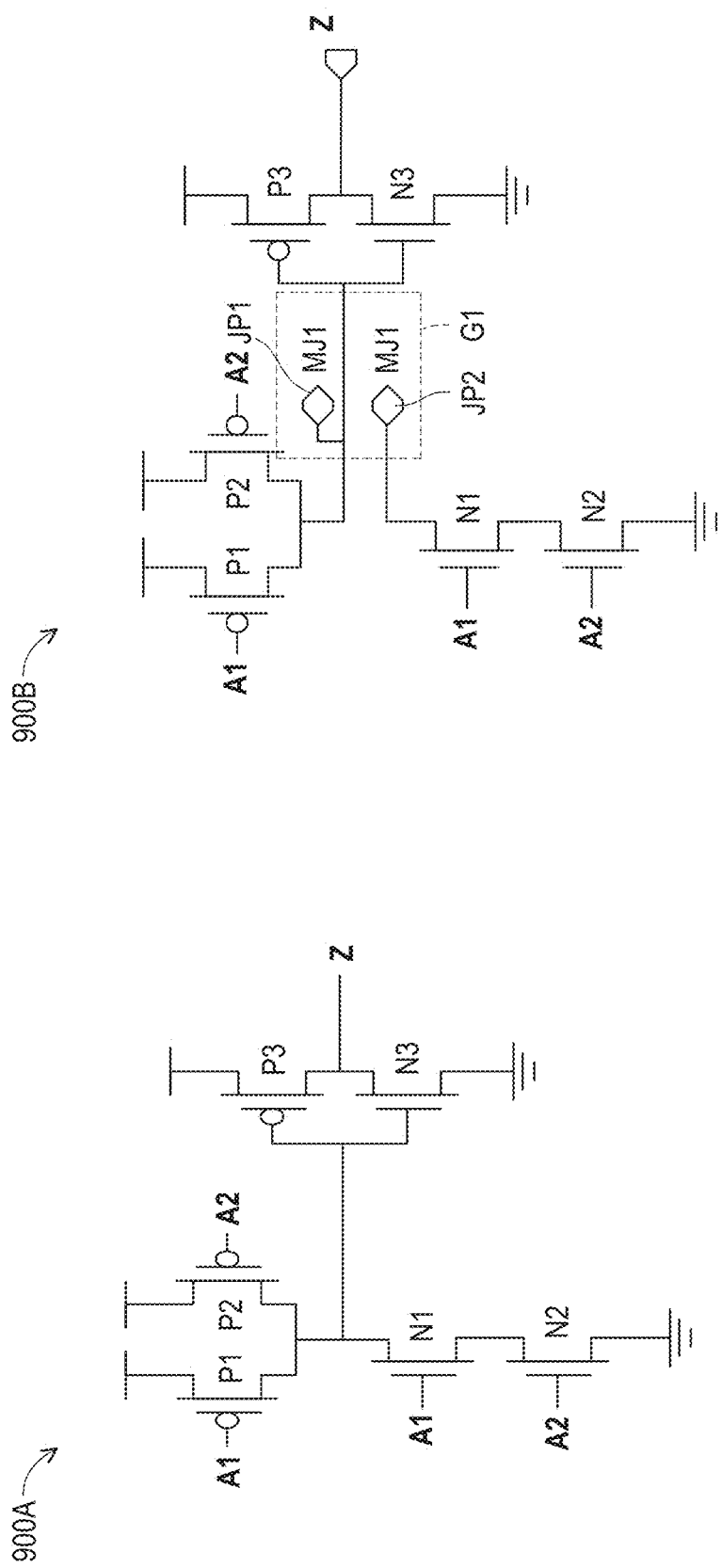
FIG. 9A is a circuit diagram of an integrated circuit, in accordance with some embodiments.
FIG. 9B is a circuit diagram of an integrated circuit, in accordance with some embodiments.
Figure 10A:
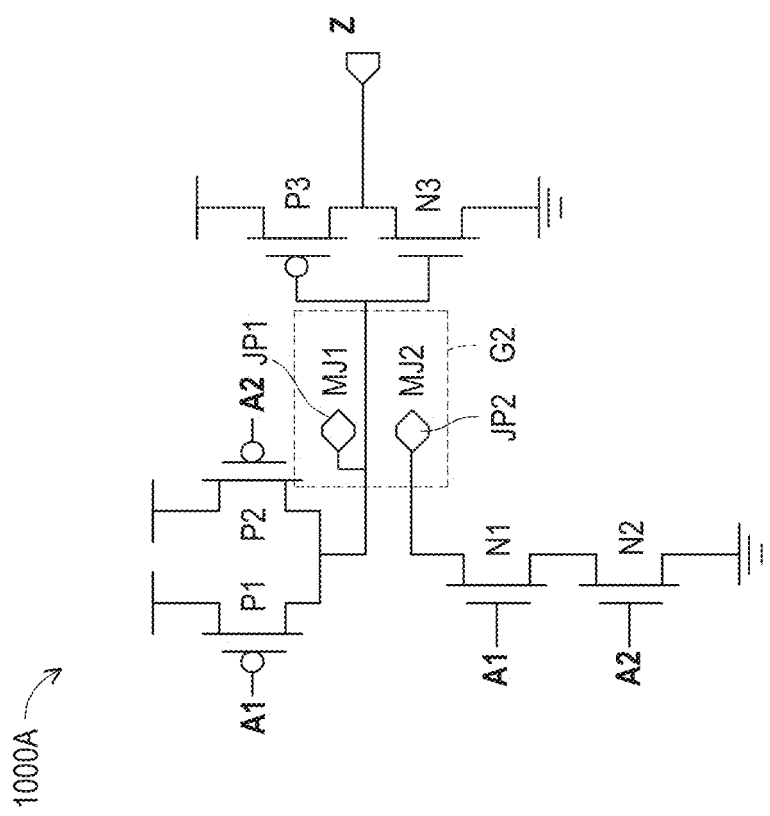
FIG. 10A is a circuit diagram of an integrated circuit, in accordance with some embodiments.
Figure 11A:
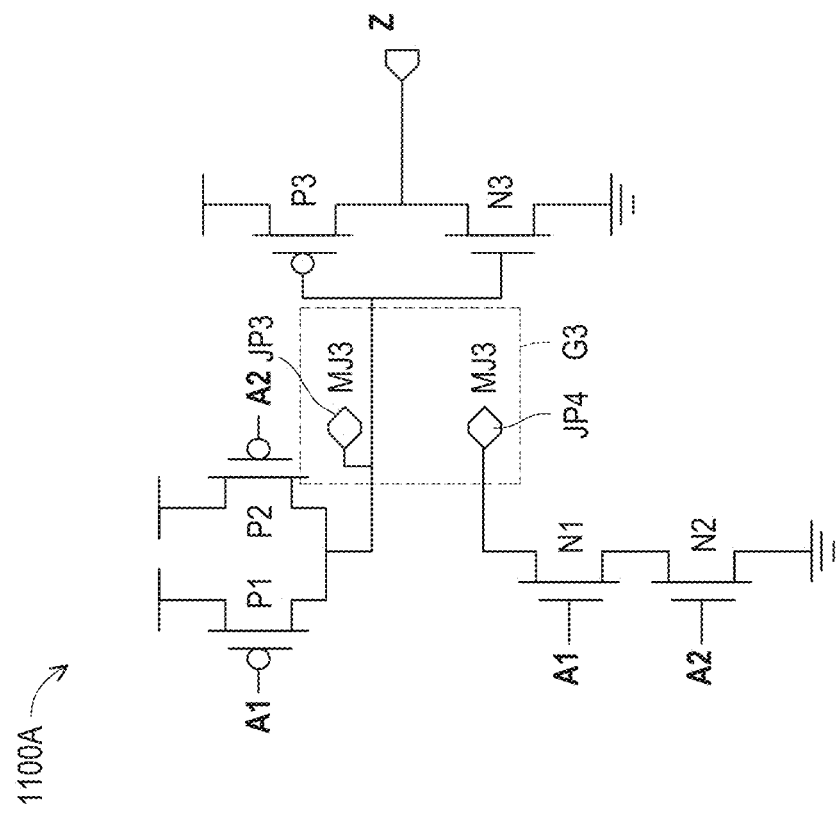
FIG. 11A is a circuit diagram of an integrated circuit, in accordance with some embodiments.
Figure 12A:
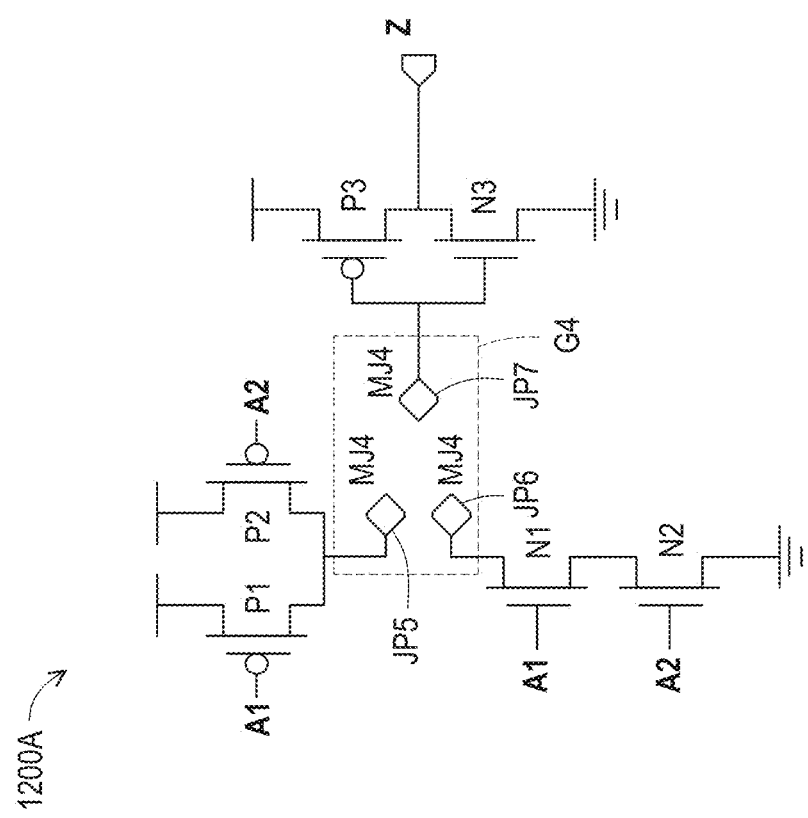
FIG. 12A is a circuit diagram of an integrated circuit, in accordance with some embodiments.
Figure 15A:
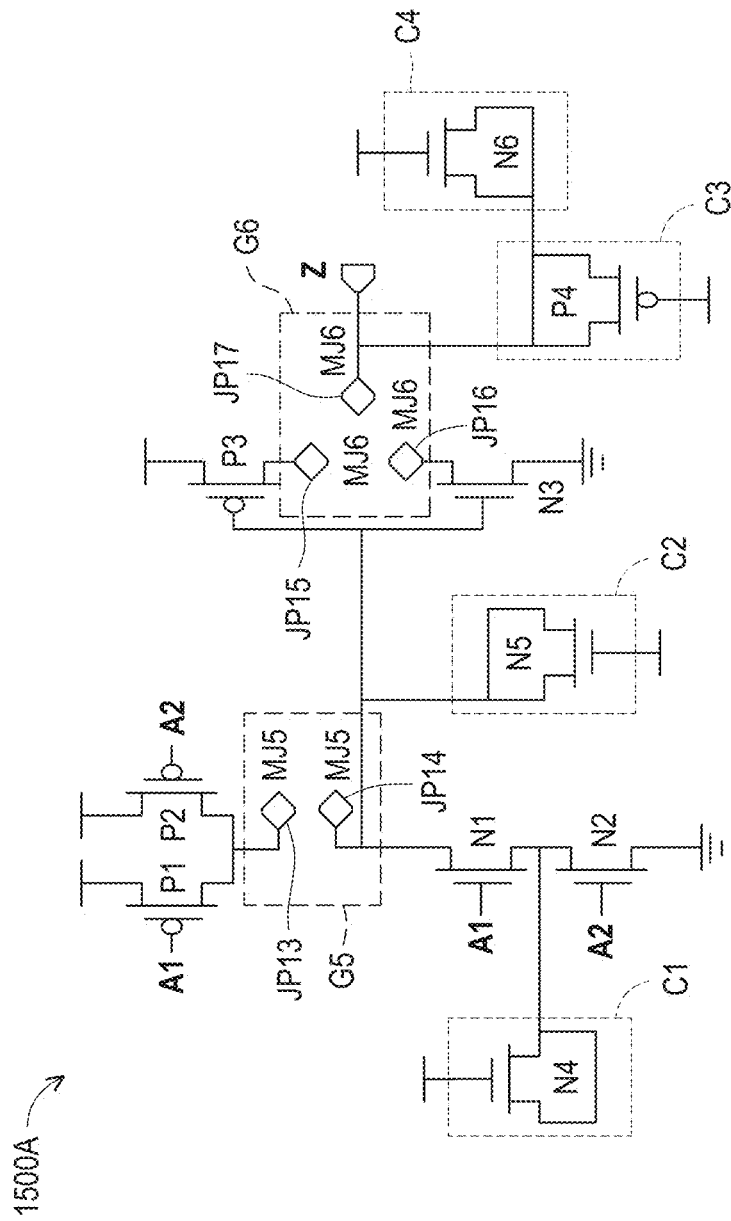
FIG. 15A is a circuit diagram of an integrated circuit, in accordance with some embodiments.

In some embodiments, the first circuit of method 100 includes at least one of circuit 900B of FIG. 9B, circuit 1000A of FIG. 10A, circuit 1100A of FIG. 11A, circuit 1200A of FIG. 12A or circuit 1500A of FIG. 15A.

Figure 3:
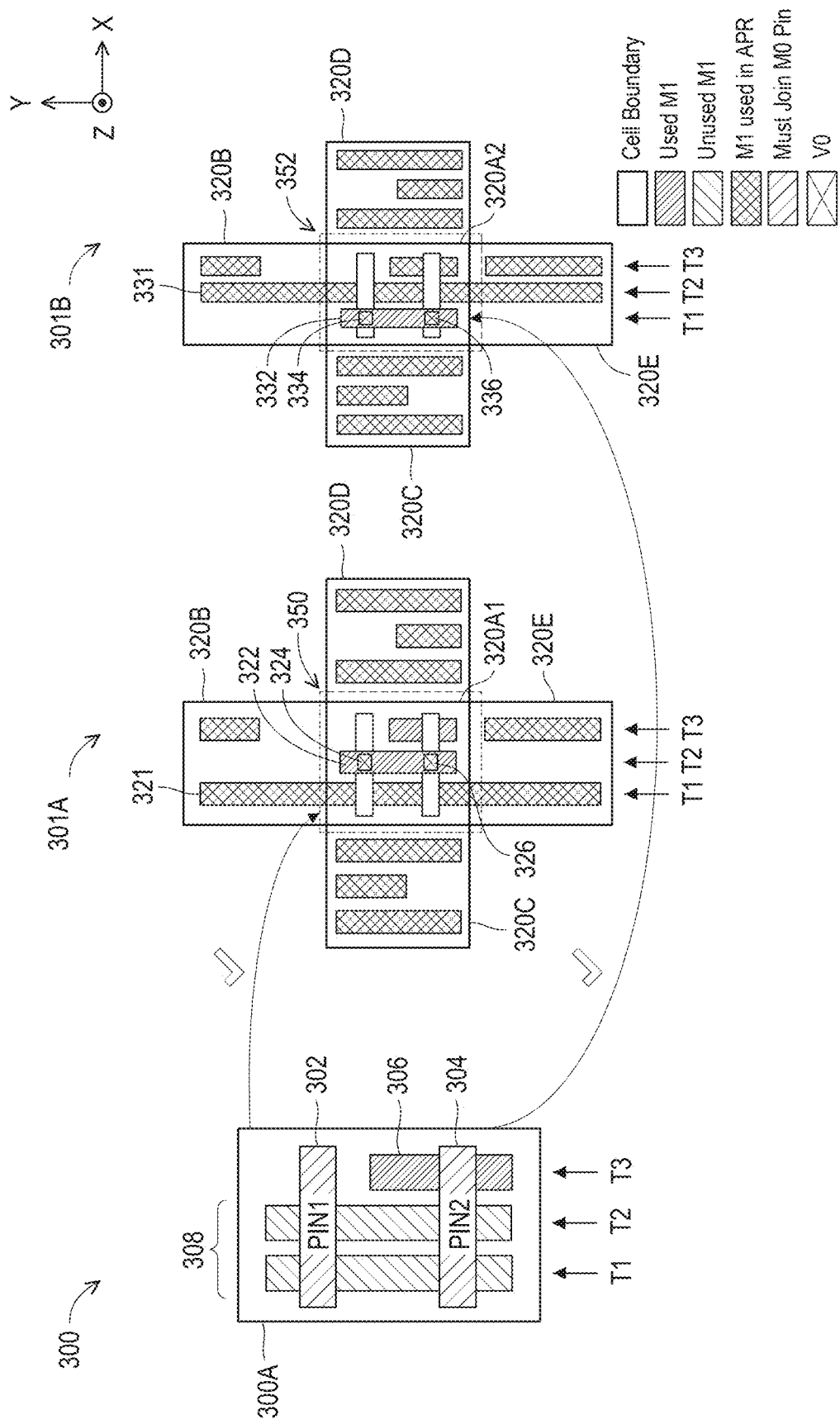
FIG. 3 is a diagram of a corresponding layout of an integrated circuit, in accordance with some embodiments.
Figure 7:
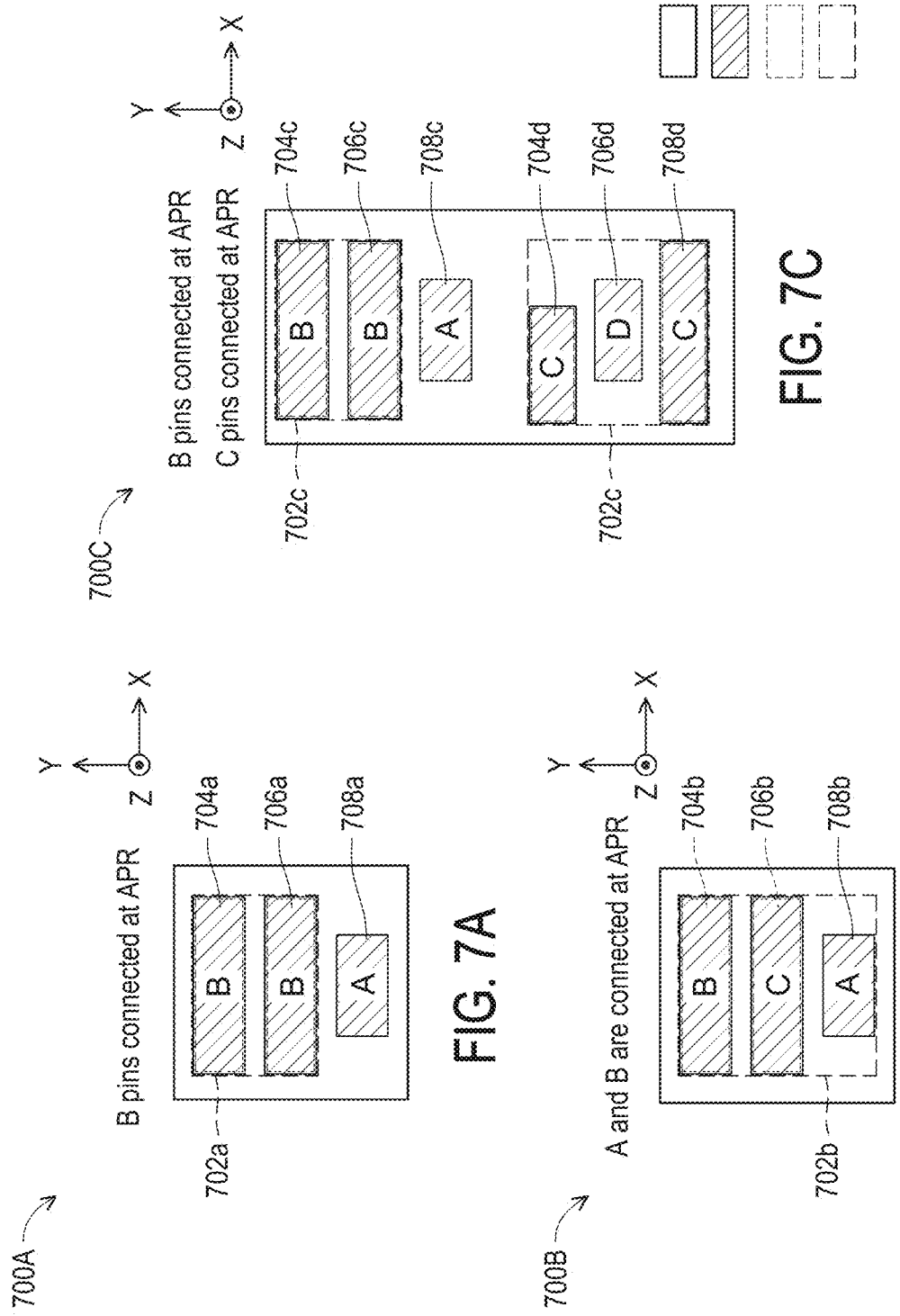
FIGS. 7A-7C are corresponding diagrams of a corresponding layouts of an integrated circuit, in accordance with some embodiments.
Figure 8:
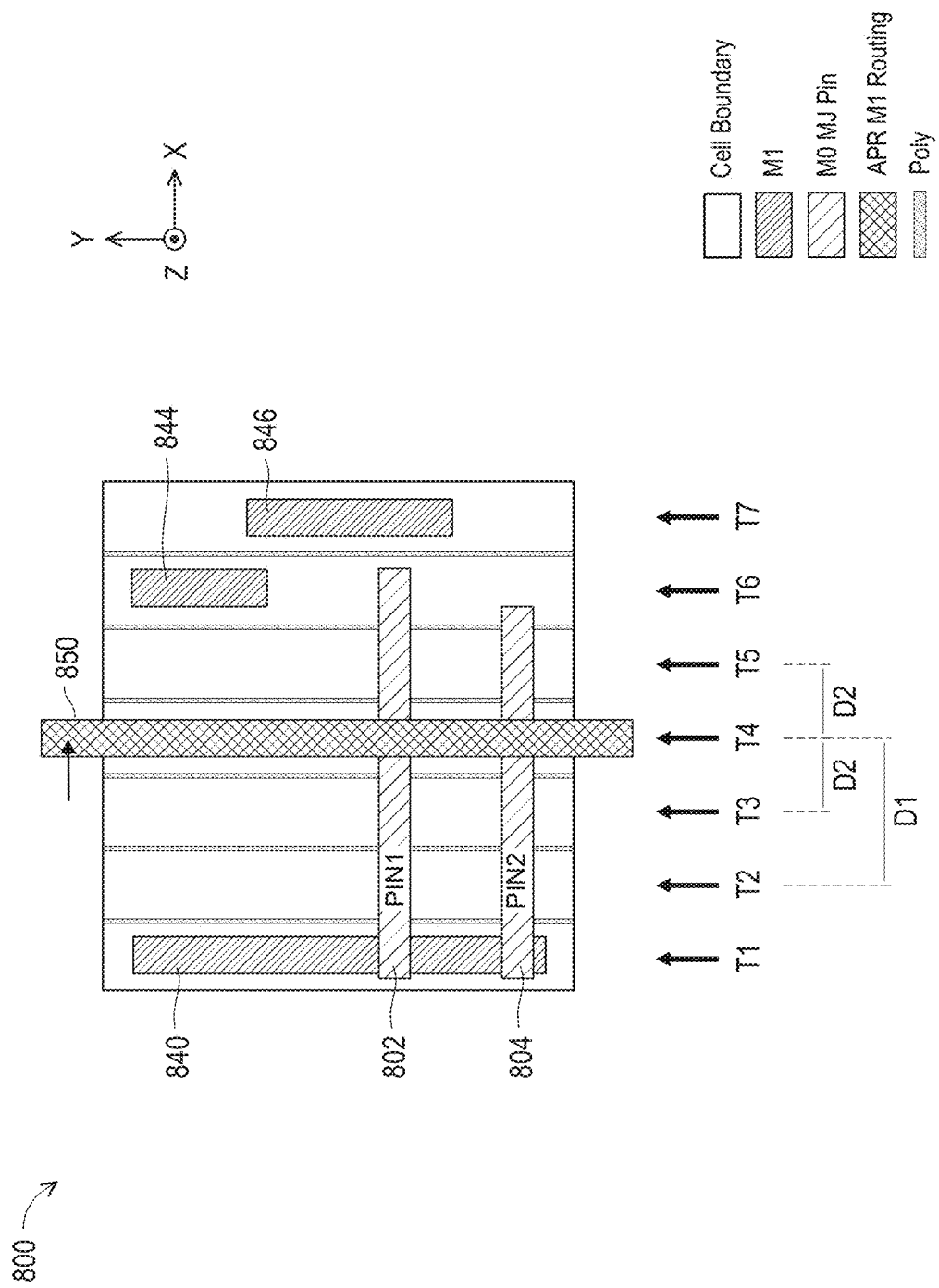
FIG. 8 is a diagram of a layout of an integrated circuit, in accordance with some embodiments.
Figure 11B:
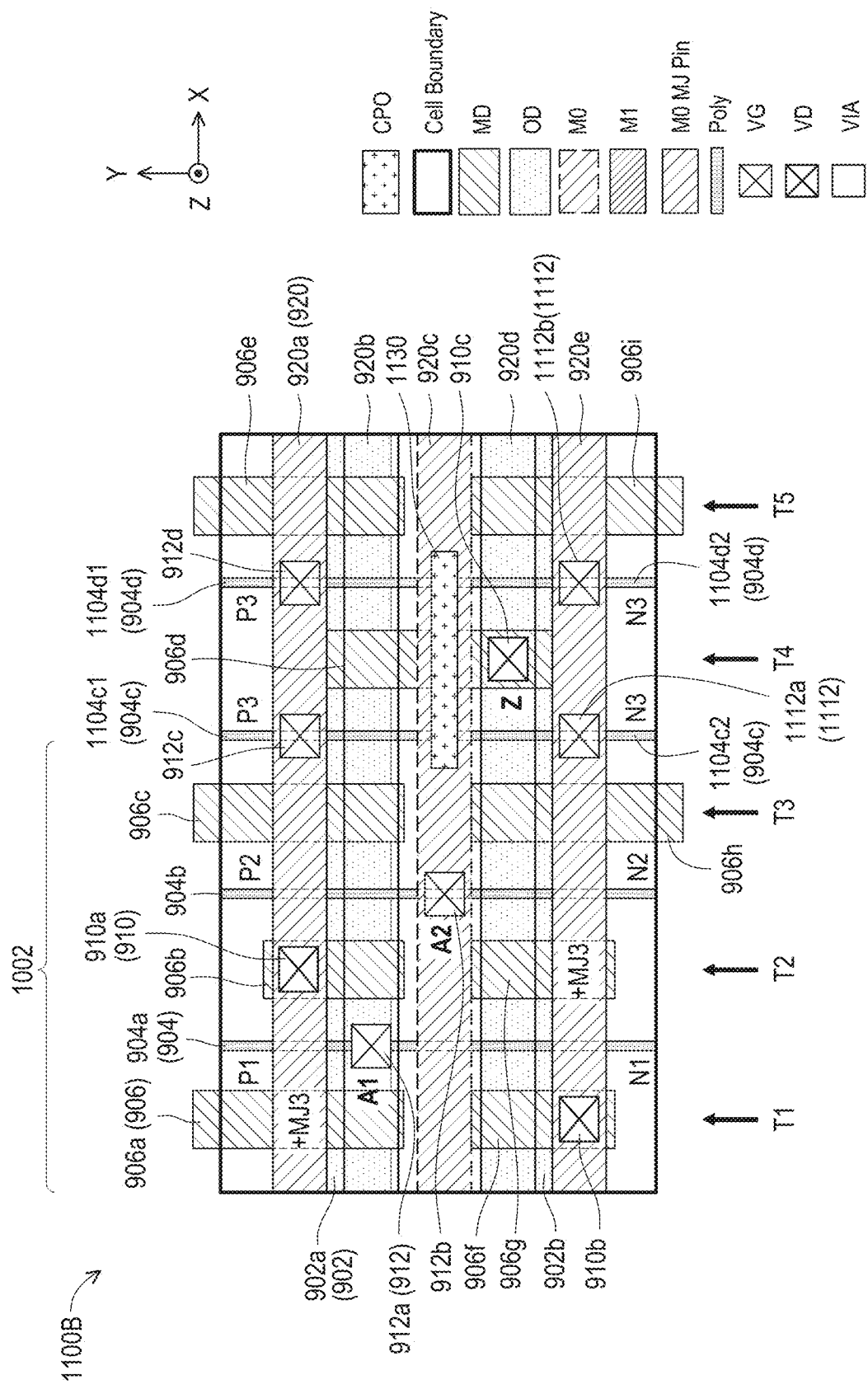
FIG. 11B is a diagram of a layout of integrated circuit, in accordance with some embodiments.
Figure 11C:
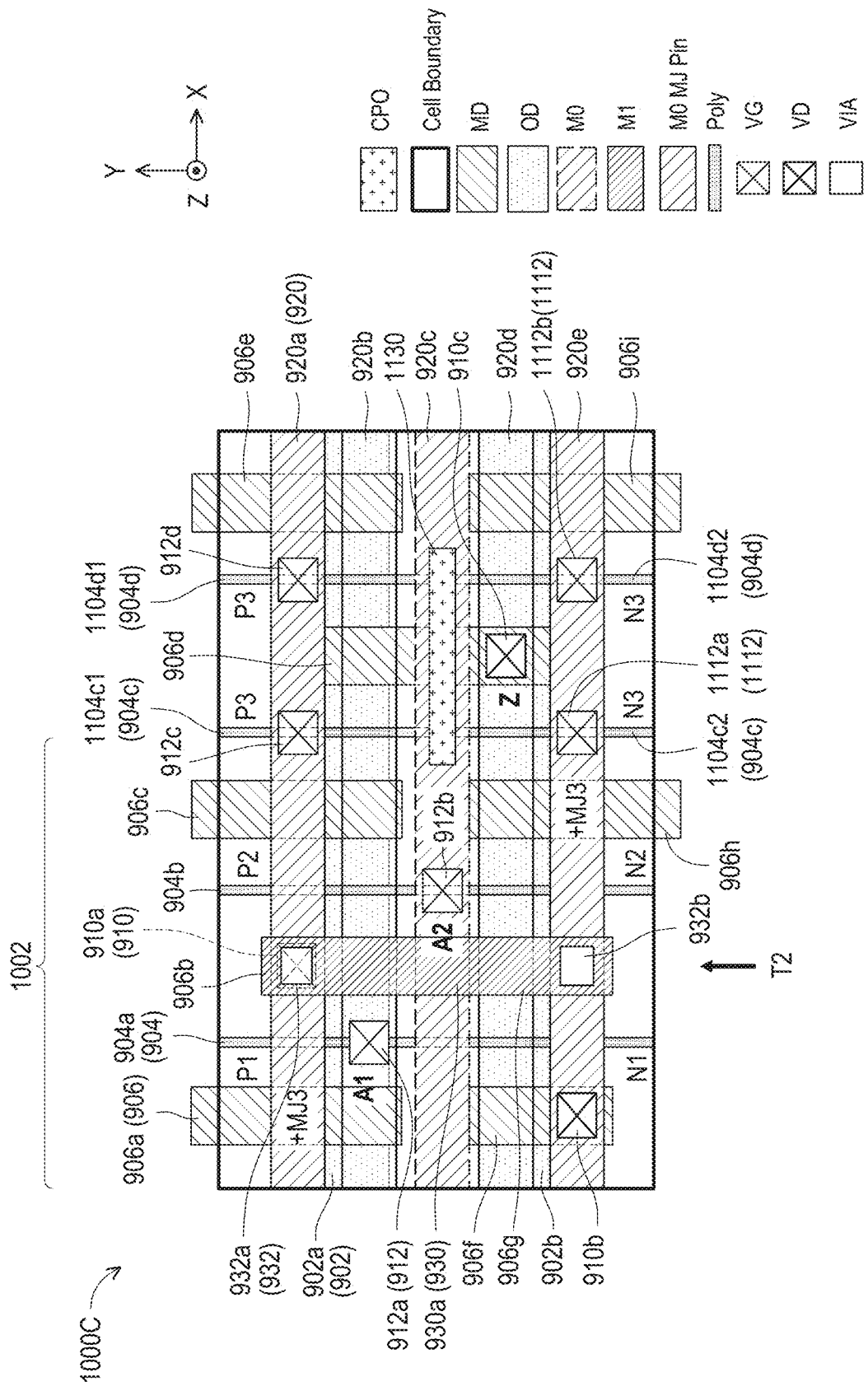
FIG. 11C is a diagram of a layout of an integrated circuit, in accordance with some embodiments.
Figure 11D:
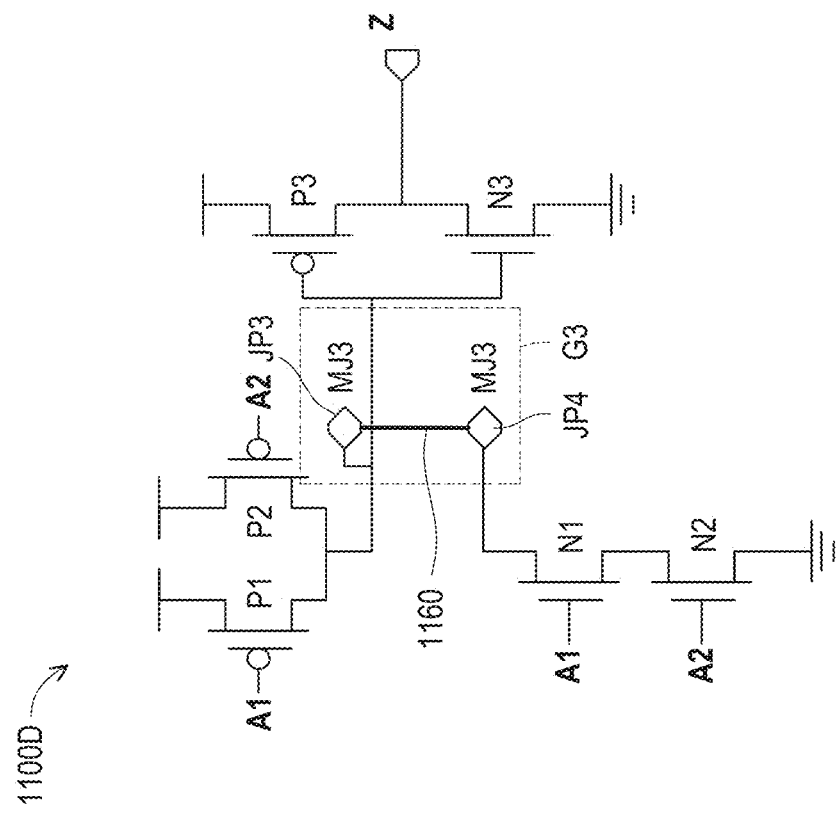
FIG. 11D is a circuit diagram of integrated circuit, in accordance with some embodiments.
Figure 12B:
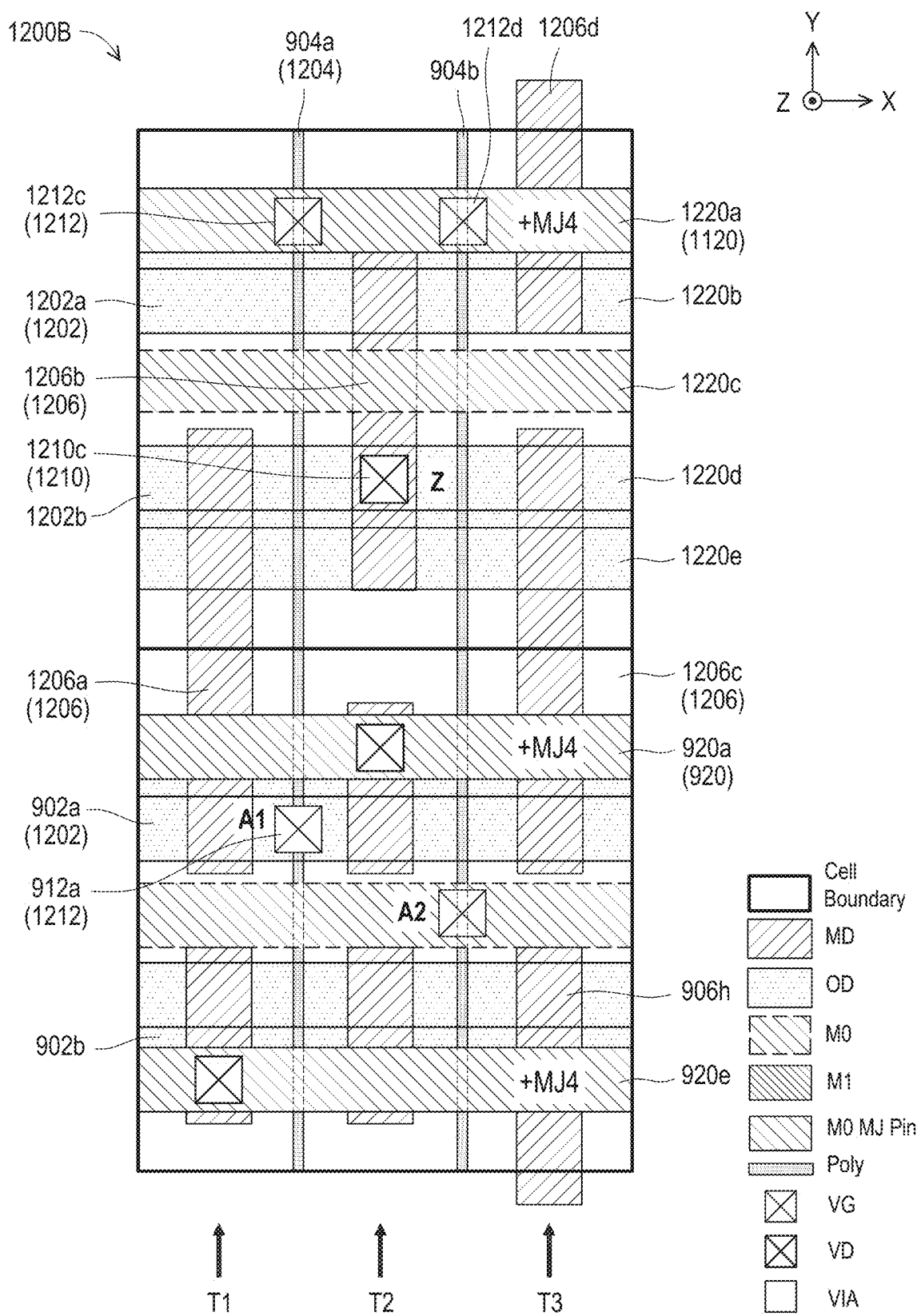
FIG. 12B is a diagram of a layout of integrated circuit, in accordance with some embodiments.
Figure 12C:
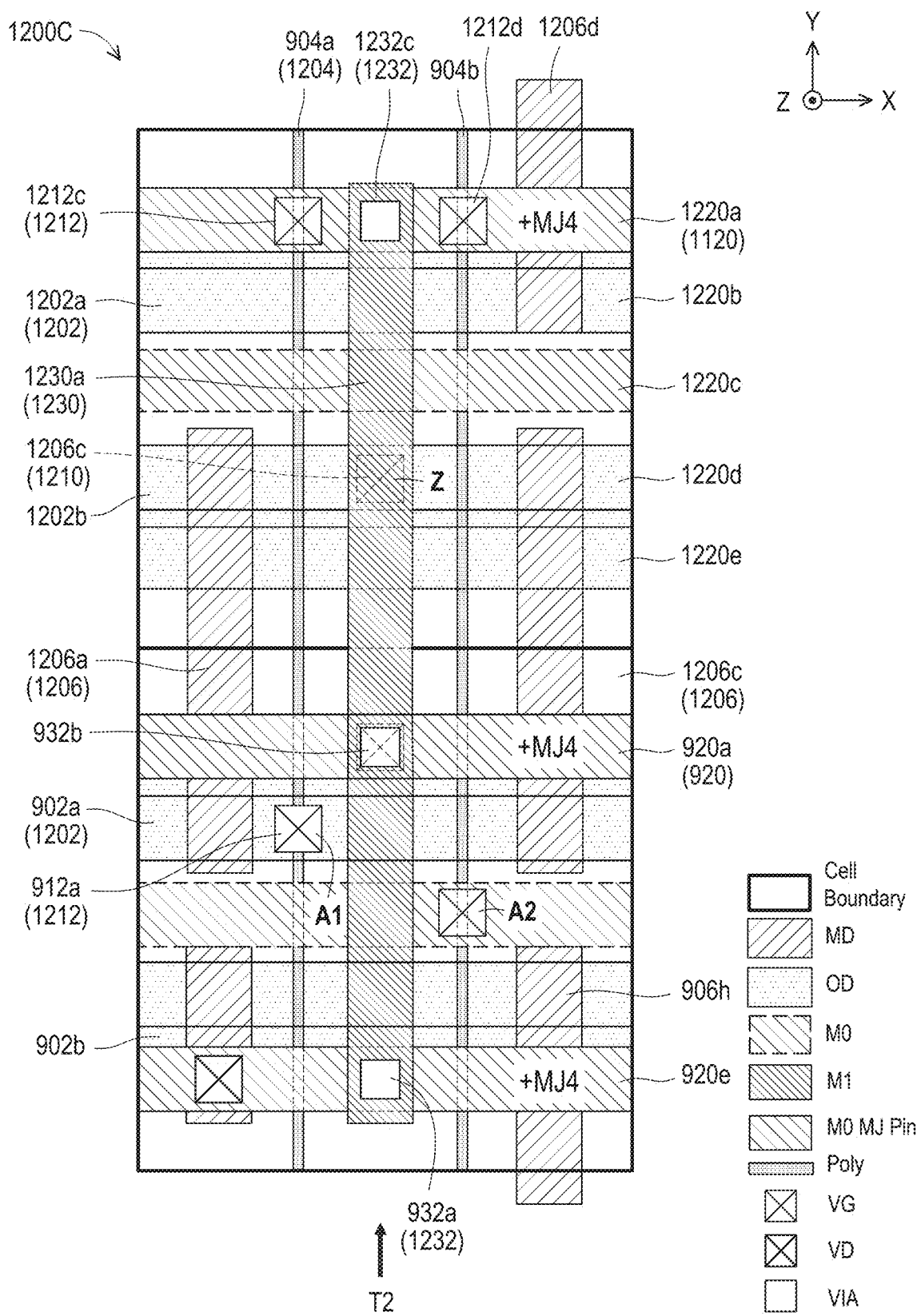
FIG. 12C is a diagram of a layout of an integrated circuit, in accordance with some embodiments.
Figure 12D:
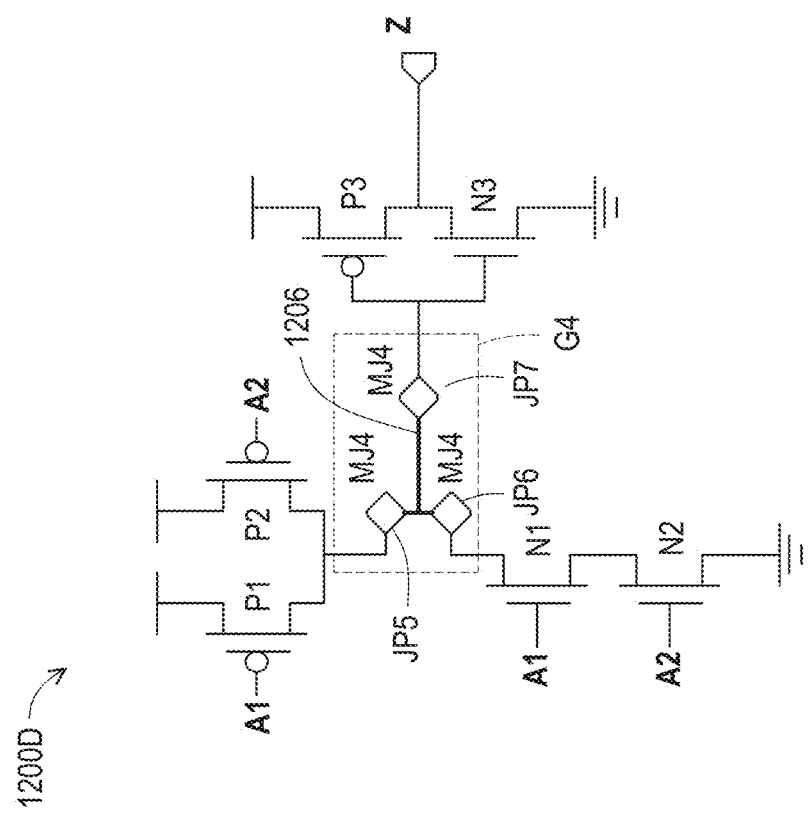
FIG. 12D is a circuit diagram of integrated circuit, in accordance with some embodiments.
Figure 13A:
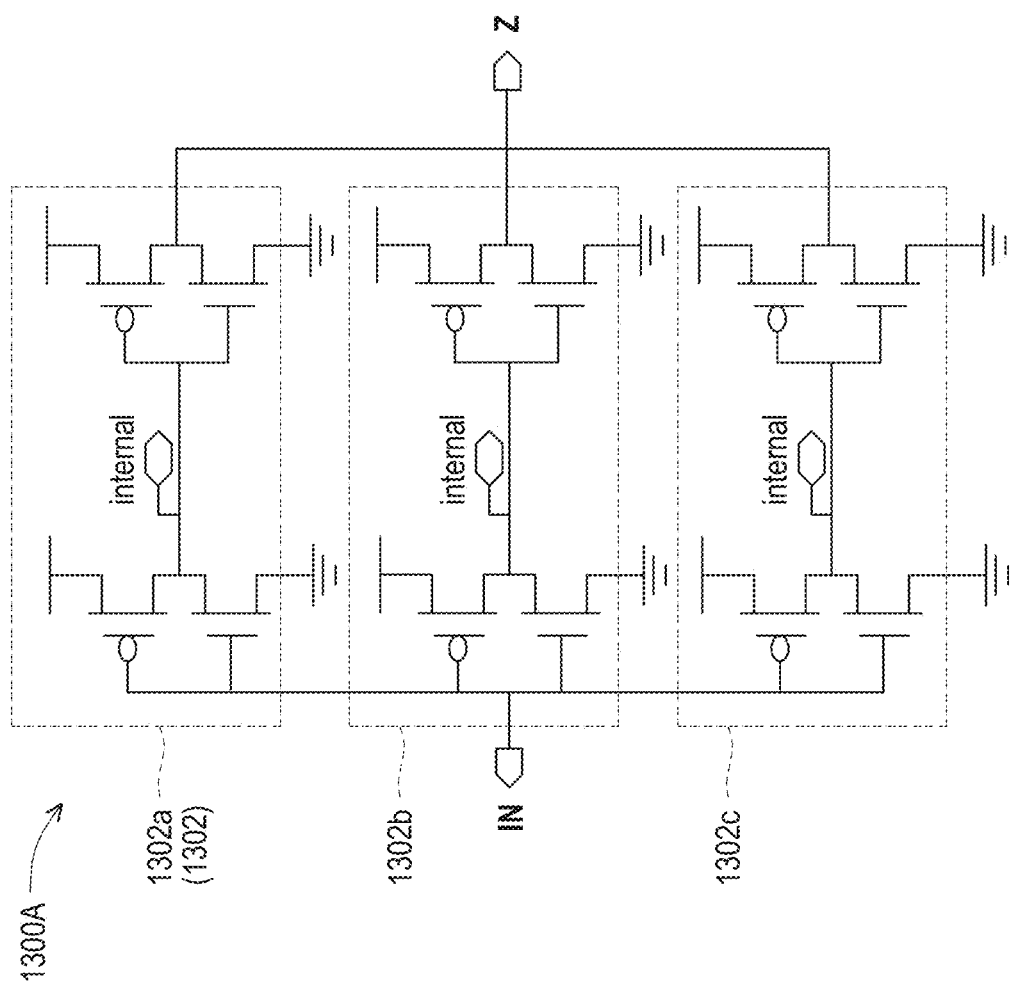
FIG. 13A is a circuit diagram of an integrated circuit, in accordance with some embodiments.
Figure 13B:
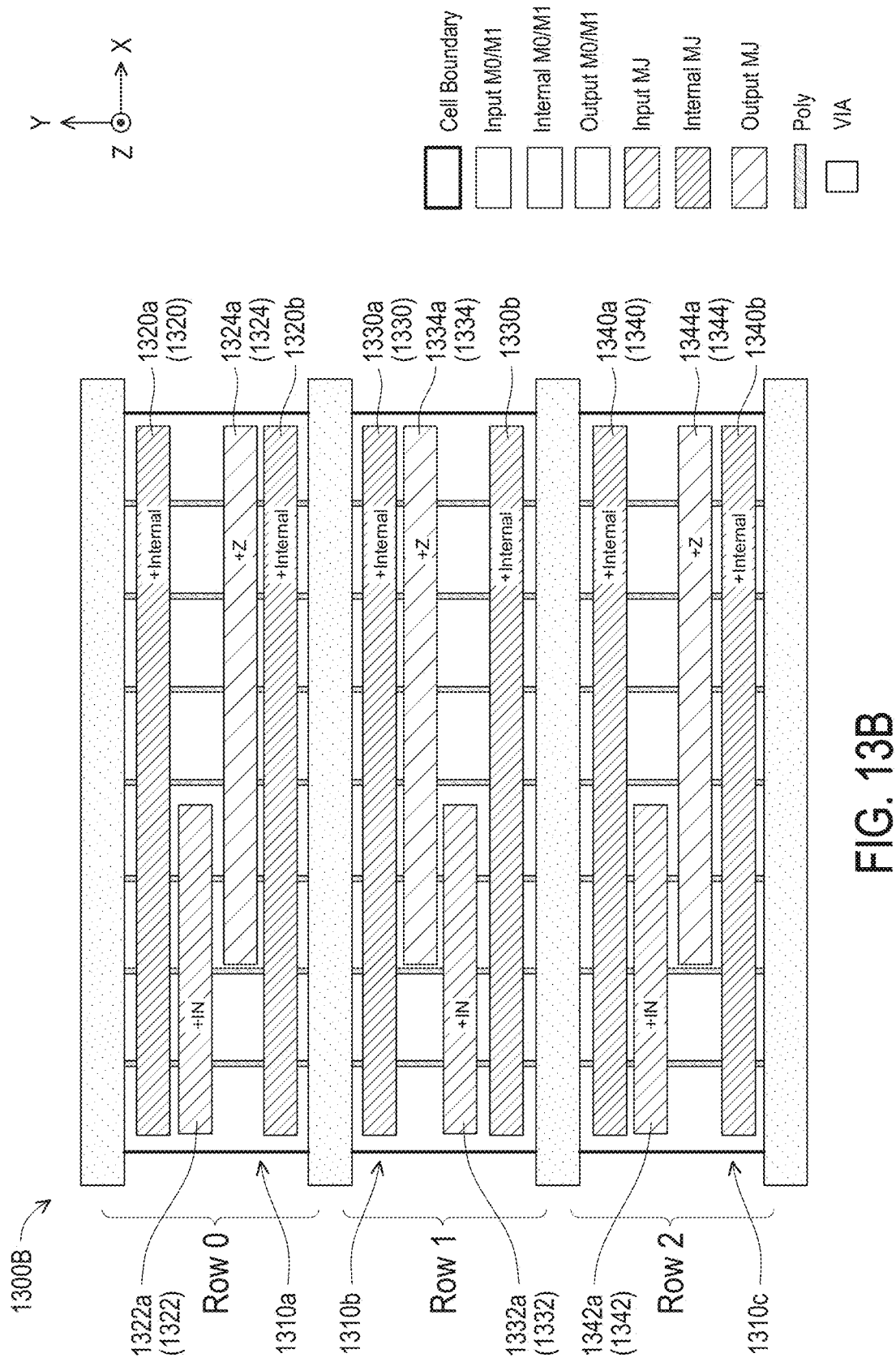
FIG. 13B is a diagram of a layout of integrated circuit, in accordance with some embodiments.
Figure 14A:
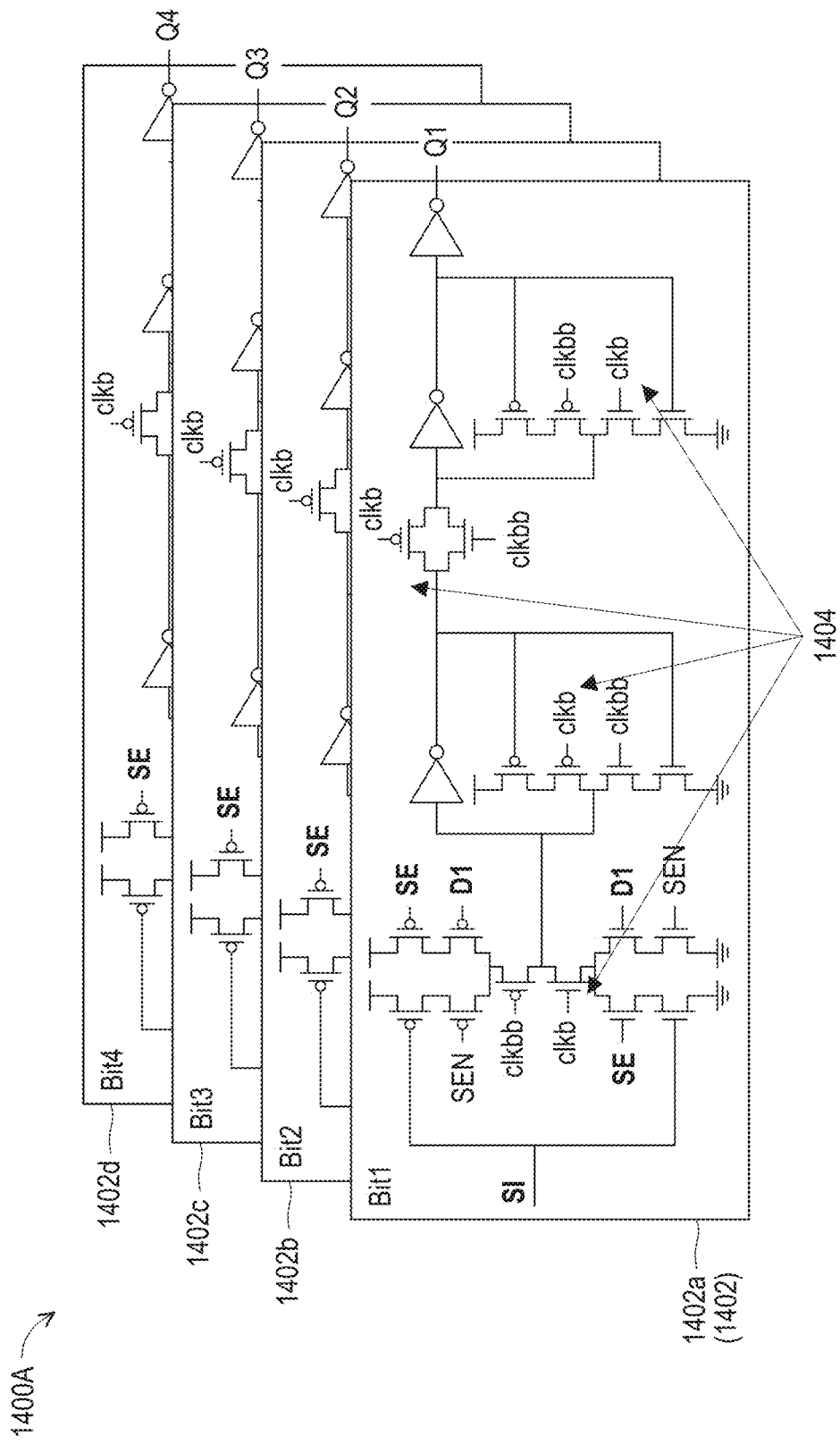
FIG. 14A is a circuit diagram of an integrated circuit, in accordance with some embodiments.
Figure 14B:
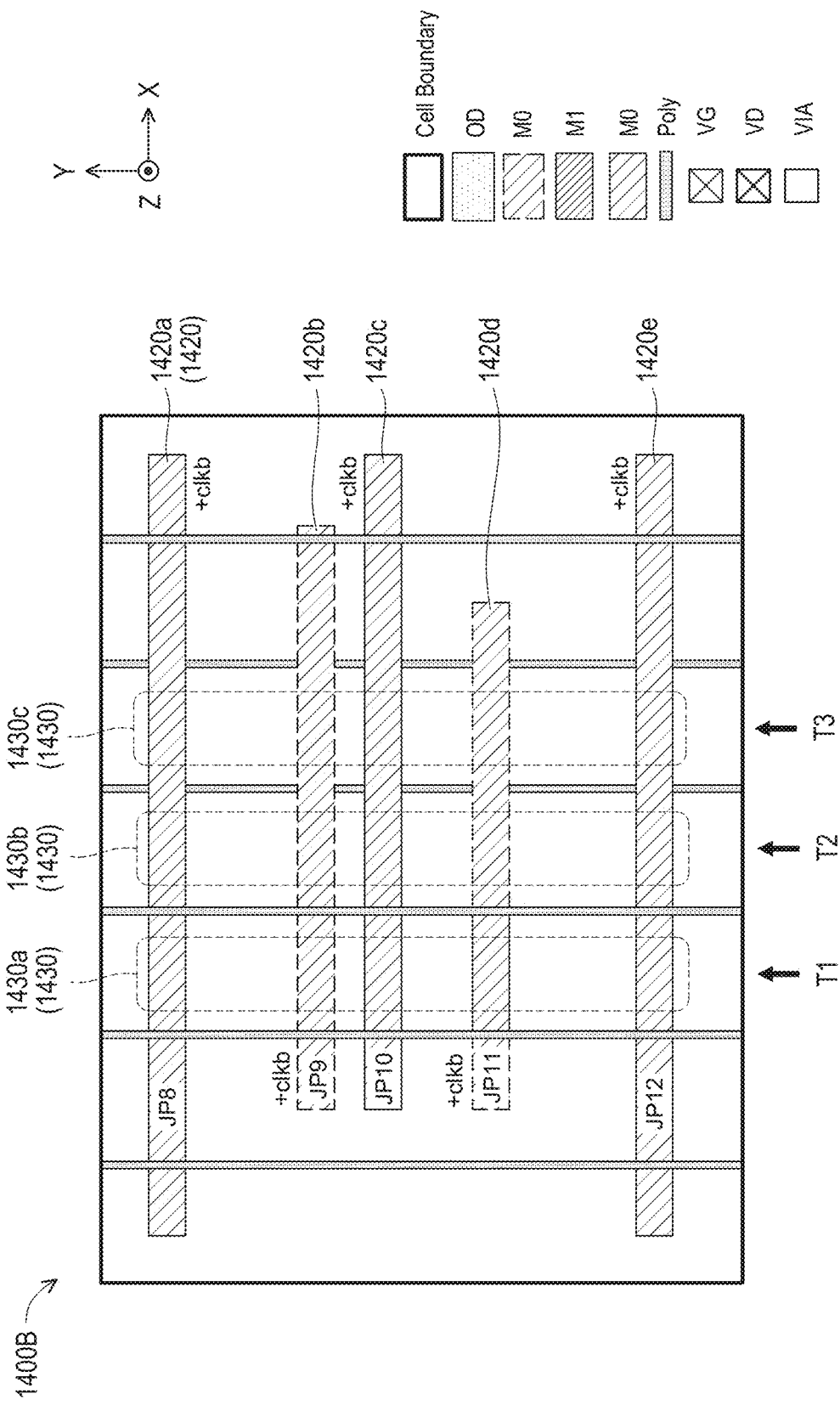
FIG. 14B is a diagram of a layout of integrated circuit, in accordance with some embodiments.

In some embodiments, the first pin of method 100 includes at least one of pin PIN1 or PIN2 of FIG. 3 or 8, pins A-D of FIGS. 7A-7C, pins JP1-JP2 of FIGS. 9B-9E, pins JP1-JP2 of FIGS. 10A-10D, pins JP3-JP4 of FIGS. 11A-11D, pins JP5-JP7 of FIGS. 12A-12D, pins +IN, +Internal and +Z of FIGS. 13A-13B, pins JP8-JP12 of FIG. 14B or pins JP13-JP17 of FIGS. 15A-15D.

In some embodiments, the second pin of method 100 includes at least one of pin PIN1 or PIN2 of FIG. 3 or 8, pins A-D of FIGS. 7A-7C, pins JP1-JP2 of FIGS. 9B-9E, pins JP1-JP2 of FIGS. 10A-10D, pins JP3-JP4 of FIGS. 11A-11D, pins JP5-JP7 of FIGS. 12A-12D, pins +IN, +Internal and +Z of FIGS. 13A-13B, pins JP8-JP12 of FIG. 14B or pins JP13-JP17 of FIGS. 15A-15D.

In some embodiments, the first circuit includes a first pin, a second pin and a third pin that are electrically disconnected from each other. In some embodiments, the first pin, the second pin and the third pin of the first circuit are electrically connected to each other in operation 110 by an APR tool.

In some embodiments, the first circuit further includes a third pin and a fourth pin that are electrically disconnected from each other. In some embodiments, the third pin and the fourth pin of the first circuit are electrically connected to each other in operation 110 by an APR tool.

In some embodiments, the third pin of method 100 includes at least one of pin JP5-JP7 of FIGS. 12A-12D, pins +IN, +Internal and +Z of FIGS. 13A-13B, pins JP8-JP12 of FIGS. 14B and 15A-15D or pins JP13-JP17 of FIGS. 15A-15D.

In some embodiments, the fourth pin of method 100 includes at least one of pin JP5-JP7 of FIGS. 12A-12D, pins +IN, +Internal and +Z of FIGS. 13A-13B, pins JP8-JP12 of FIGS. 14B and 15A-15D or pins JP13-JP17 of FIGS. 15A-15D.

In some embodiments, operation 102 further includes operation 104.

In operation 104 of method 100, the first pin and the second pin are designated as a first group of pins that are to be connected together. In some embodiments, first group of pins (e.g., the first pin and the second pin) are connected together by an APR tool in operation 110. In some embodiments, by designating the first pin and the second pin as the first group of pins, the APR tool (e.g., operation 110) knows which pins should be connected together in the APR stage.

In some embodiments, the first group of pins of method 100 includes at least one of group 702a, 702b, 702c or 702d of FIGS. 7A-7C. In some embodiments, the first group of method 100 includes at least one of group G1 of FIGS. 9B and 9E, group G2 of FIGS. 10A and 10D, group G3 of FIGS. 11A and 11D, group G4 of FIGS. 12A and 12D or groups G5 and G6 of FIGS. 15A and 15D.

In some embodiments, operation 104 of method 100 is performed by a processing device (e.g., processor 1902 (FIG. 19)) configured to execute instructions for designating the first pin and the second pin are designated a first group of pins that are to be connected together.

In some embodiments, the first circuit includes the first pin, the second pin and the third pin. In some embodiments, the first pin, the second pin and the third pin of the first circuit are designated as a first group of pins that are to be connected together. In some embodiments, operation 104 of method 100 is performed by a processing device (e.g., processor 1902 (FIG. 19)) configured to execute instructions for designating the first pin, the second pin and the third pin are designated a first group of pins that are to be connected together.

In some embodiments, the first circuit further includes the third pin and the fourth pin. In some embodiments, the third pin and the fourth pin of the first circuit are designated as a second group of pins that are to be connected together. In some embodiments, operation 104 of method 100 is performed by a processing device (e.g., processor 1902 (FIG. 19)) configured to execute instructions for designating the third pin and the fourth pin are designated a second group of pins that are to be connected together.

In some embodiments, the second group of method 100 includes at least one of group 702c or 702d of FIGS. 7A-7C. In some embodiments, the second group of method 100 includes at least one of group G5 or G6 of FIGS. 15A and 15D.

In operation 106 of method 100, a first layout of the first circuit is generated. In some embodiments, the first layout of method 100 corresponds to a layout design of a standard cell.

In some embodiments, the standard cell of the present disclosure includes a logic gate cell or a memory cell. In some embodiments, a logic gate cell includes an AND, OR, NAND, NOR, XOR, INV, AND-OR-Invert (AOI), OR-AND-Invert (OAI), MUX, Flip-flop, BUFF, Latch, delay, or clock cells. In some embodiments, a memory cell includes a static random access memory (SRAM), a dynamic RAM (DRAM), a resistive RAM (RRAM), a magnetoresistive RAM (MRAM) or read only memory (ROM). In some embodiments, the standard cell of at least method 100 includes one or more active or passive elements. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), or the like), FinFETs, nanosheet transistors, nanowire transistors, complementary FETs (CFETs) and planar MOS transistors with raised source/drain. Examples of passive elements include, but are not limited to, capacitors, inductors, fuses, and resistors.

In some embodiments, operations 106 and 108 are referred to as "a cell level stage" as each operation corresponds to the layout design of individual cells and the internal patterns within the corresponding cell. In some embodiments, the layout design of the present application is in a graphic database system (GDSII) file format.

In some embodiments, the first layout of the present disclosure includes layout 300A of FIG. 3. In some embodiments, the first layout of the present disclosure includes one or more patterns or layouts, such as one or more of cell 320A1, 320A2, 320B-320E of FIG. 3, cell 400A-400B or 440A-440E of FIG. 4, layout 700A-700C of FIGS. 7A-7C, layout 800 of FIG. 8, layout 900C-900D of FIGS. 9C-9D, layout 1000B-1000C of FIGS. 10B-10C, layout 1100B-1100C of FIGS. 11B-11C, layout 1200B-1200C of FIGS. 12B-12C, layout 1300B of FIG. 13B, layout 1400B of FIG. 14B or layout 1500B-1500C of FIGS. 15B-15C.

In some embodiments, operation 106 of method 100 is performed by a processing device (e.g., processor 1902 (FIG. 19)) configured to execute instructions for generating the first layout.

In some embodiments, operation 106 further includes operation 108.

In operation 108 of method 100, at least a first conductive feature pattern and a second conductive feature pattern are generated.

In some embodiments, the first conductive feature pattern and the second conductive feature pattern extend in a first direction X, are on a first layout level, and are separated from each other in a second direction Y different from the first direction. In some embodiments, the first layout level of method 100 includes metal-0 (M0). Other layout levels are within the scope of the present disclosure. In some embodiments, the first conductive feature pattern and the second conductive feature pattern are not coupled together. In some embodiments, the first conductive feature pattern corresponds to the first pin, and the second conductive feature pattern corresponds to the second pin. In some embodiments, the first conductive feature pattern and the second conductive feature pattern are part of the first layout.

Figure 4:
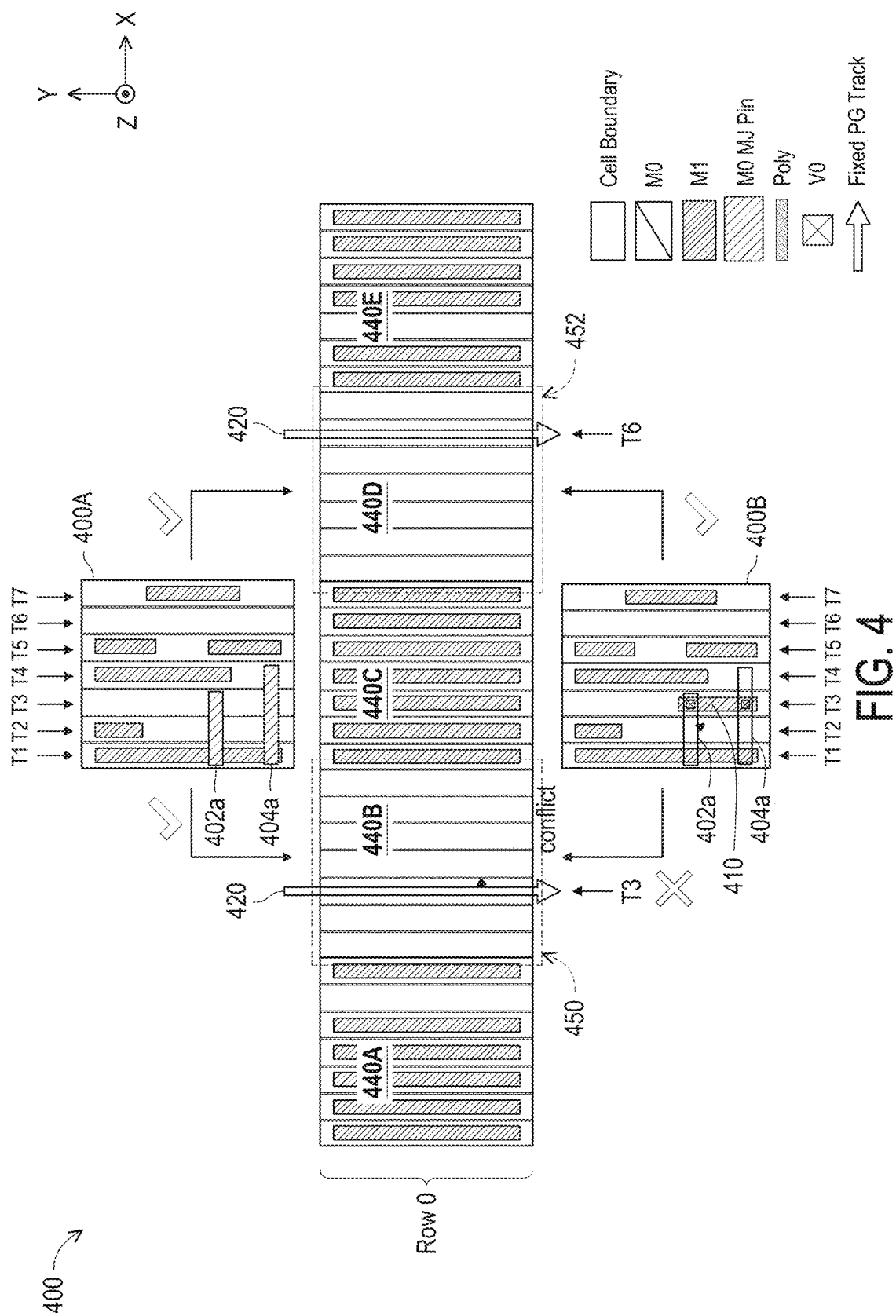
FIG. 4 is a diagram of a corresponding layout of an integrated circuit, in accordance with some embodiments.
Figure 10B:
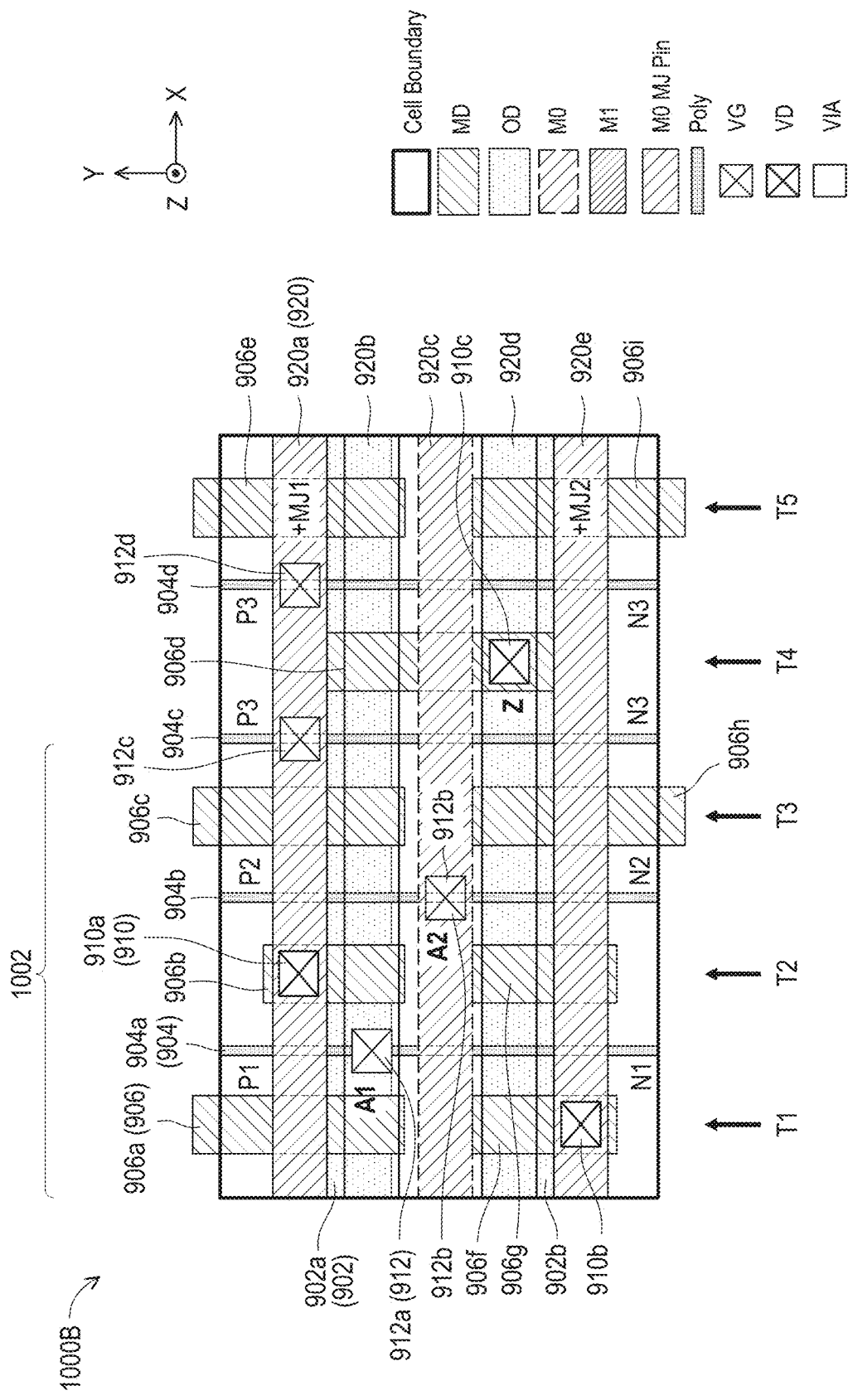
FIG. 10B is a diagram of a layout of integrated circuit, in accordance with some embodiments.
Figure 10C:
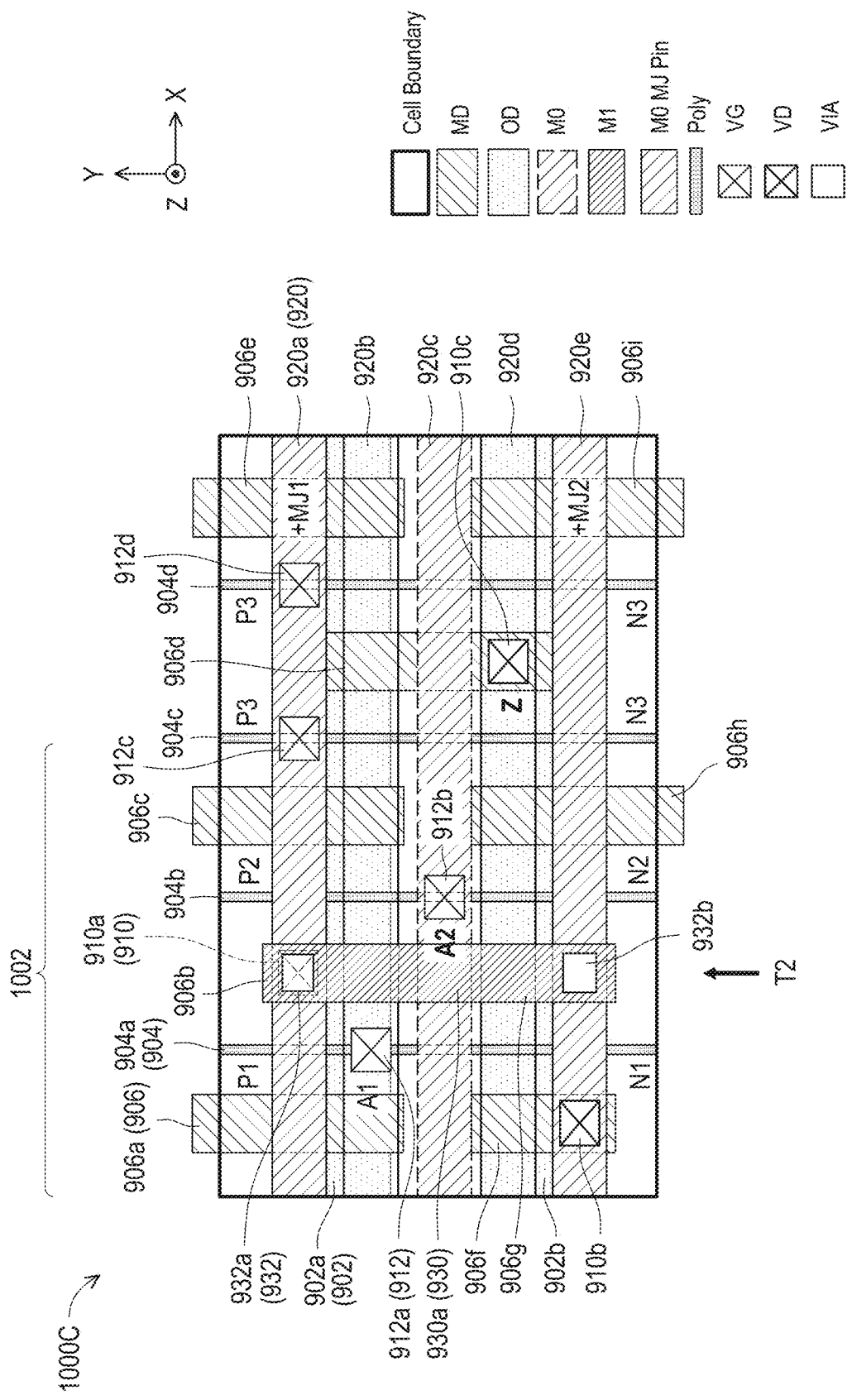
FIG. 10C is a diagram of a layout of an integrated circuit, in accordance with some embodiments.
Figure 15B:
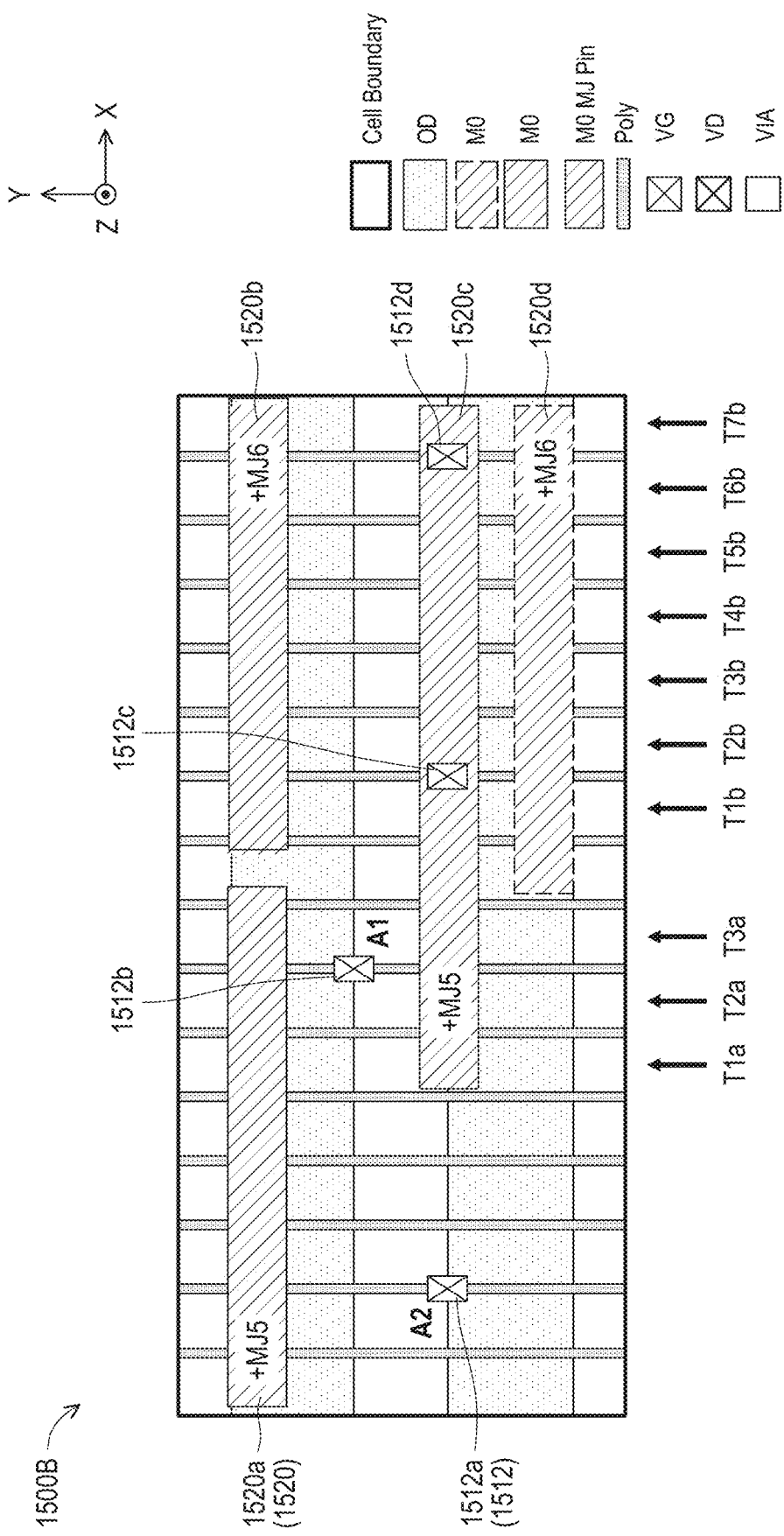
FIG. 15B is a diagram of a layout of integrated circuit, in accordance with some embodiments.
Figure 15C:
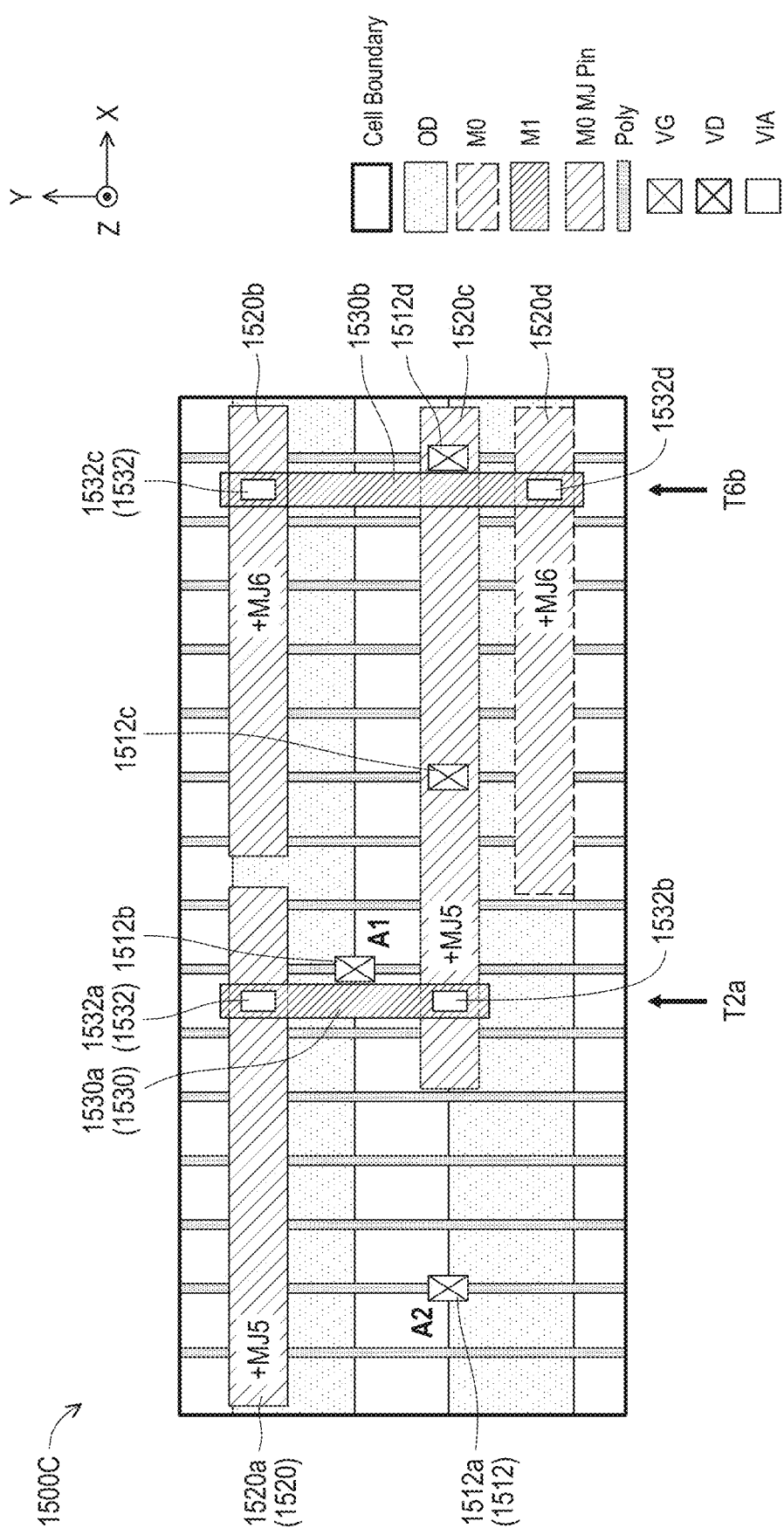
FIG. 15C is a diagram of a layout of an integrated circuit, in accordance with some embodiments.

In some embodiments, the first conductive feature pattern of the present disclosure includes at least one of conductive feature pattern 302 or 304 of FIG. 3, conductive feature pattern 402 or 404 of FIG. 4, conductive feature pattern 402 or 404 of FIG. 4, conductive feature patterns 704a-704d, 706a-706d or 708a-708d of FIGS. 7A-7C, conductive feature patterns 802 and 804 of FIG. 8, conductive feature patterns 920a-920e of FIGS. 9C-9D, 10B-10C, 11B-11C, 12B-12C, conductive feature pattern 1220a-1220e of FIGS. 12B-12C, conductive feature patterns 1320a-1320b, 1322a, 1324a, 1330a-1330b, 1332a, 1334a, 1340a-1340b, 1342a, 1344a of FIGS. 13A-13B, conductive feature patterns 1420a-1420e of FIG. 14B or conductive feature patterns 1520a-1520d of FIGS. 15B-15C.

In some embodiments, the second conductive feature pattern of the present disclosure includes another of at least one of conductive feature pattern 302 or 304 of FIG. 3, conductive feature pattern 402 or 404 of FIG. 4, conductive feature pattern 402 or 404 of FIG. 4, conductive feature patterns 704a-704d, 706a-706d or 708a-708d of FIGS. 7A-7C, conductive feature patterns 802 and 804 of FIG. 8, conductive feature patterns 920a-920e of FIGS. 9C-9D, 10B-10C, 11B-11C, 12B-12C, conductive feature pattern 1220a-1220e of FIGS. 12B-12C, conductive feature patterns 1320a-1320b, 1322a, 1324a, 1330a-1330b, 1332a, 1334a, 1340a-1340b, 1342a, 1344a of FIGS. 13A-13B, conductive feature patterns 1420a-1420e of FIG. 14B or conductive feature patterns 1520a-1520d of FIGS. 15B-15C.

In some embodiments, operation 108 further includes generating a third conductive feature pattern. In some embodiments, the third conductive feature pattern corresponds to the third pin.

In some embodiments, operation 108 further includes generating a fourth conductive feature pattern. In some embodiments, the fourth conductive feature pattern corresponds to the fourth pin.

In some embodiments, at least one of the third conductive feature pattern or the fourth conductive feature pattern of method 100 includes yet another of at least one of conductive feature pattern 302 or 304 of FIG. 3, conductive feature pattern 402 or 404 of FIG. 4, conductive feature pattern 402 or 404 of FIG. 4, conductive feature patterns 704a-704d, 706a-706d or 708a-708d of FIGS. 7A-7C, conductive feature patterns 802 and 804 of FIG. 8, conductive feature patterns 920a-920e of FIGS. 9C-9D, 10B-10C, 11B-11C, 12B-12C, conductive feature pattern 1220a-1220e of FIGS. 12B-12C, conductive feature patterns 1320a-1320b, 1322a, 1324a, 1330a-1330b, 1332a, 1334a, 1340a-1340b, 1342a, 1344a of FIGS. 13A-13B, conductive feature patterns 1420a-1420e of FIG. 14B or conductive feature patterns 1520a-1520d of FIGS. 15B-15C.

In some embodiments, operation 108 of method 100 is performed by a processing device (e.g., processor 1902 (FIG. 19)) configured to execute instructions for generating at least one of the first conductive feature pattern, the second conductive feature pattern, the third conductive feature pattern or the fourth conductive feature pattern.

In operation 110 of method 100, the first layout is placed in a first region of a layout design by the APR tool. In some embodiments, the APR tool includes system 19 of FIG. 19.

In some embodiments, the layout design of the present disclosure includes layout 300 of FIG. 3 or layout 400 of FIG. 4.

In some embodiments, the first region of the layout design of the present disclosure includes at least one of region 350 or 352 of FIG. 3 or region 450 or 452 of FIG. 4.

In some embodiments, operation 110 of method 100 is performed by a processing device (e.g., processor 1902 (FIG. 19)) configured to execute instructions for placing the first layout in the first region of the layout design.

In some embodiments, operation 110 further includes operation 112.

In operation 112 of method 100, the first circuit is changed to a second circuit.

In some embodiments, the second circuit is a functional version of the first circuit. In some embodiments, one or more disconnected pins in the first circuit are coupled together in the second circuit thereby changing the non-functional circuit (e.g., first circuit) to a functional circuit (e.g., second circuit). For example, if the first circuit is a non-functional AND logic gate, then the second circuit is an AND logic gate.

Figure 9C:
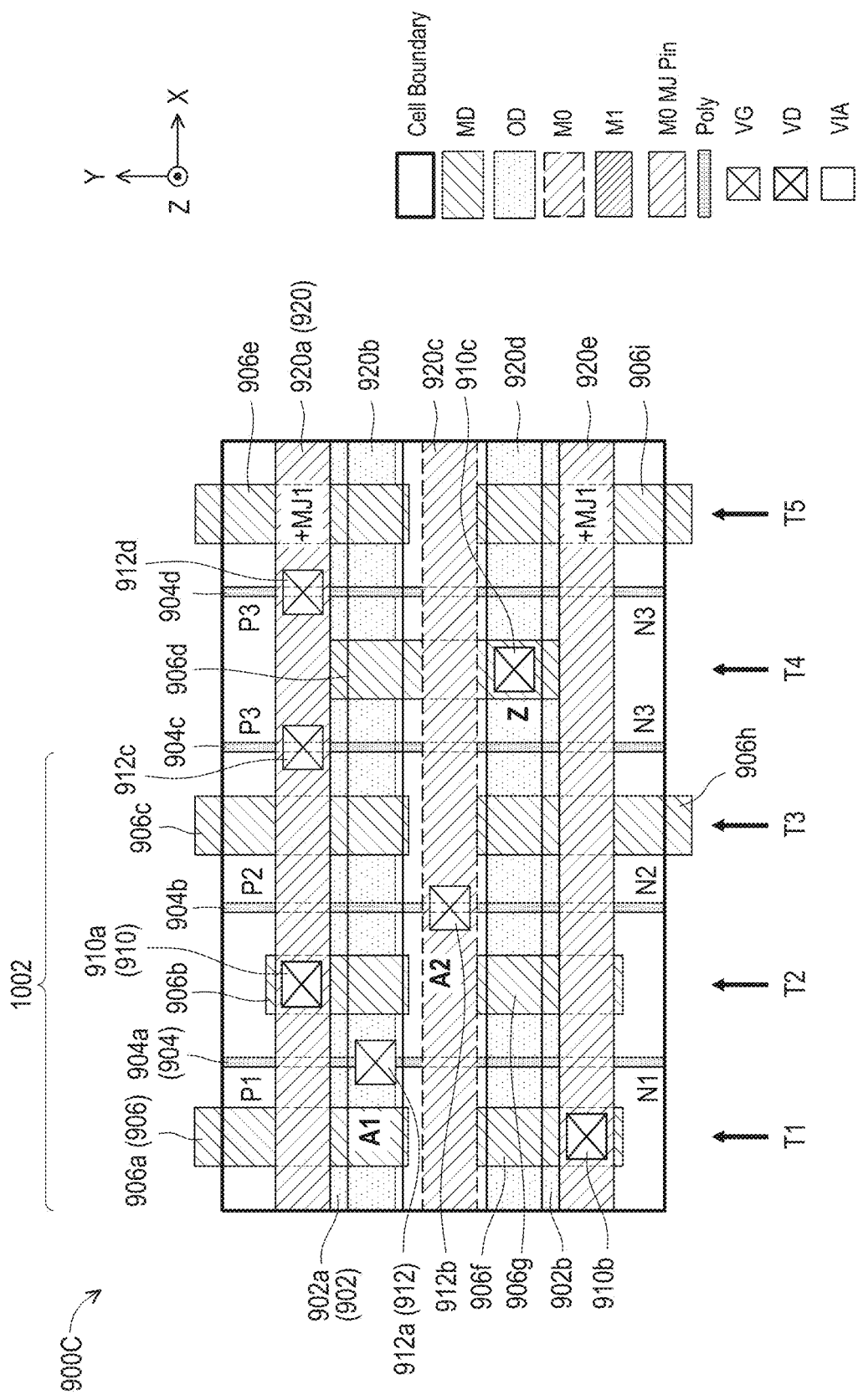
FIG. 9C is a diagram of a layout of integrated circuit, in accordance with some embodiments.
Figure 9D:
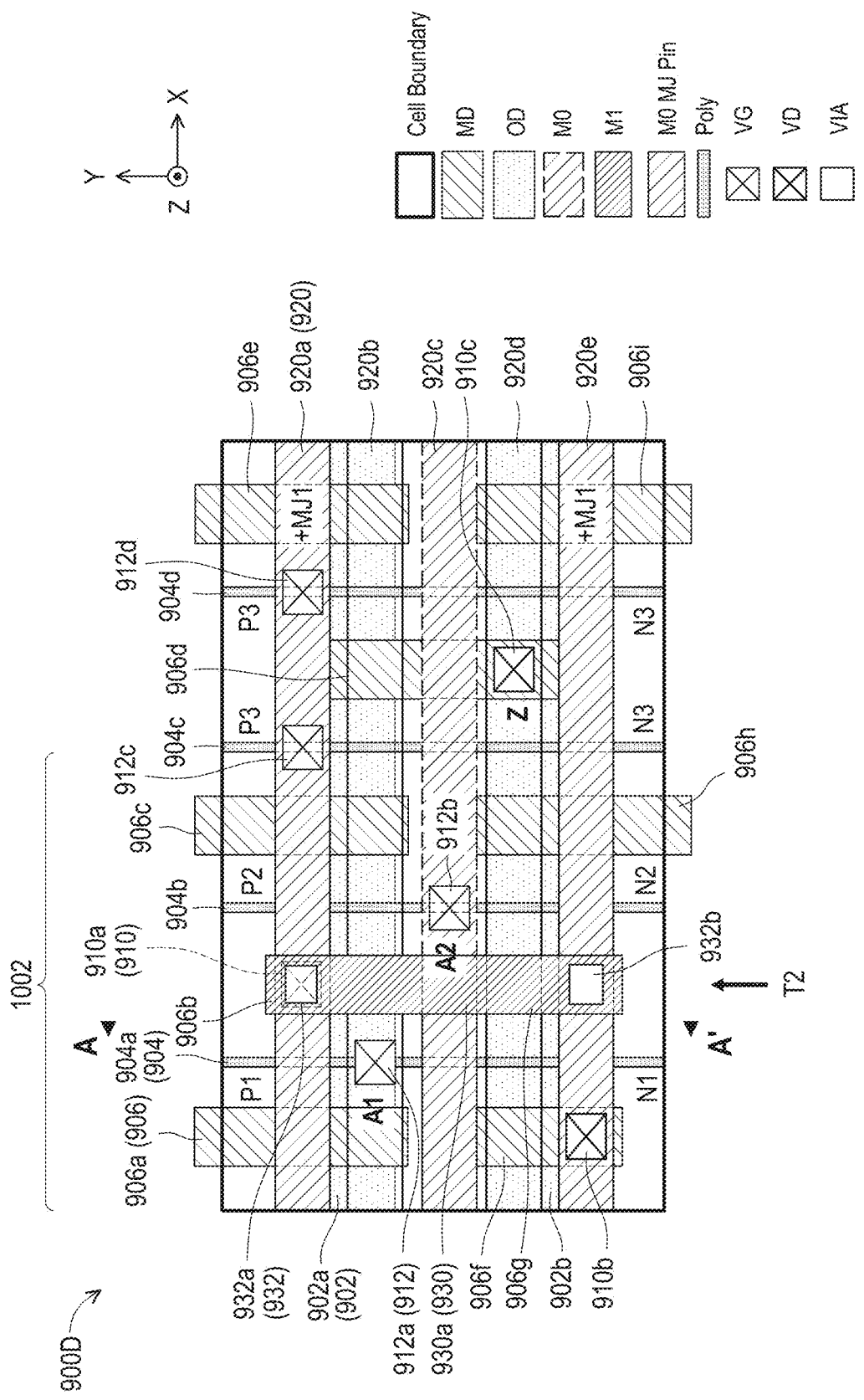
FIG. 9D is a diagram of a layout of an integrated circuit, in accordance with some embodiments.
Figure 9E:
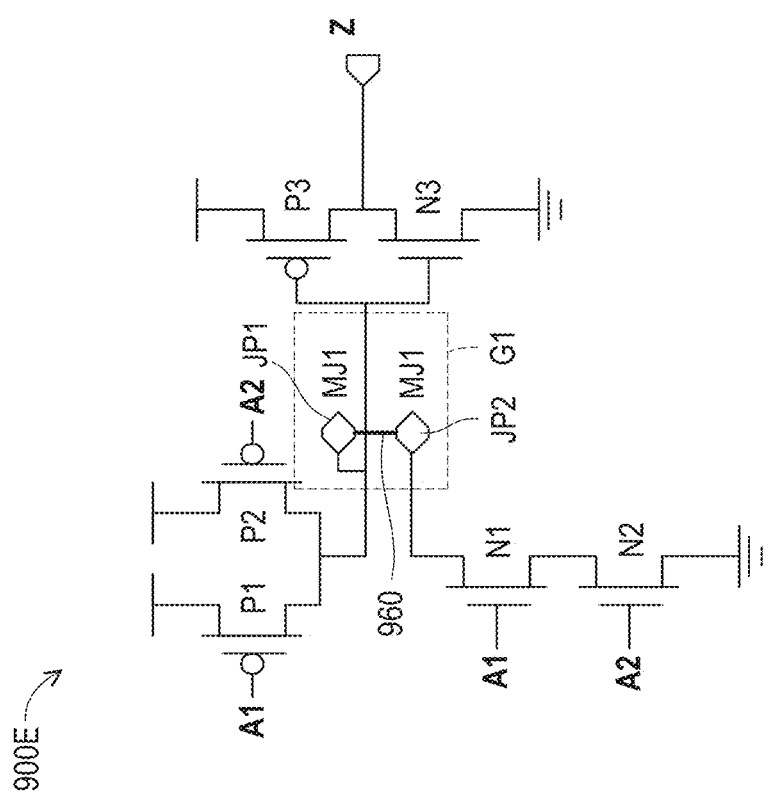
FIG. 9E is a circuit diagram of integrated circuit, in accordance with some embodiments.
Figure 10D:
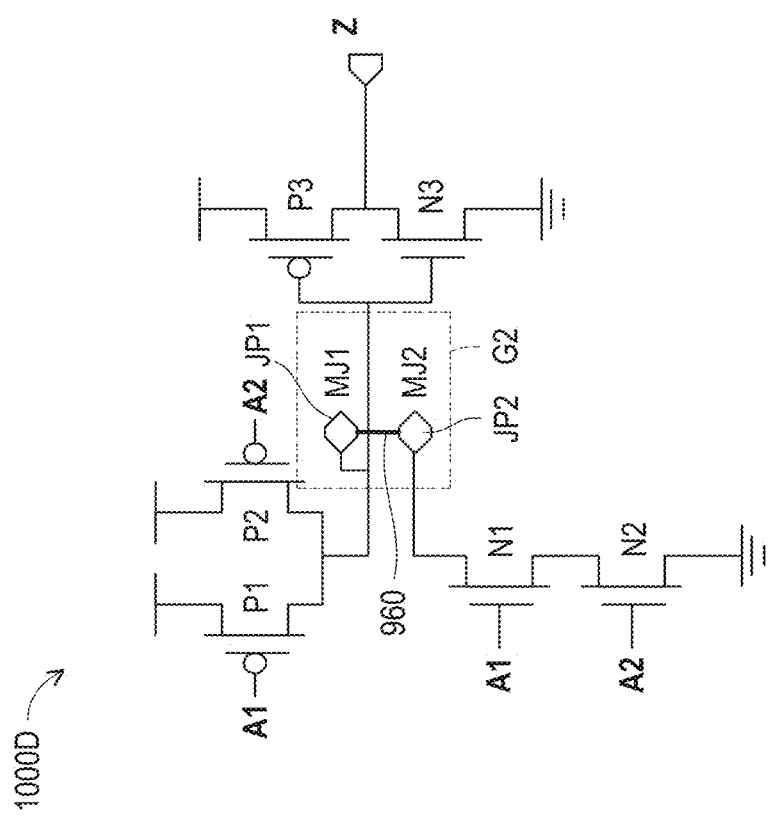
FIG. 10D is a circuit diagram of integrated circuit, in accordance with some embodiments.
Figure 15D:
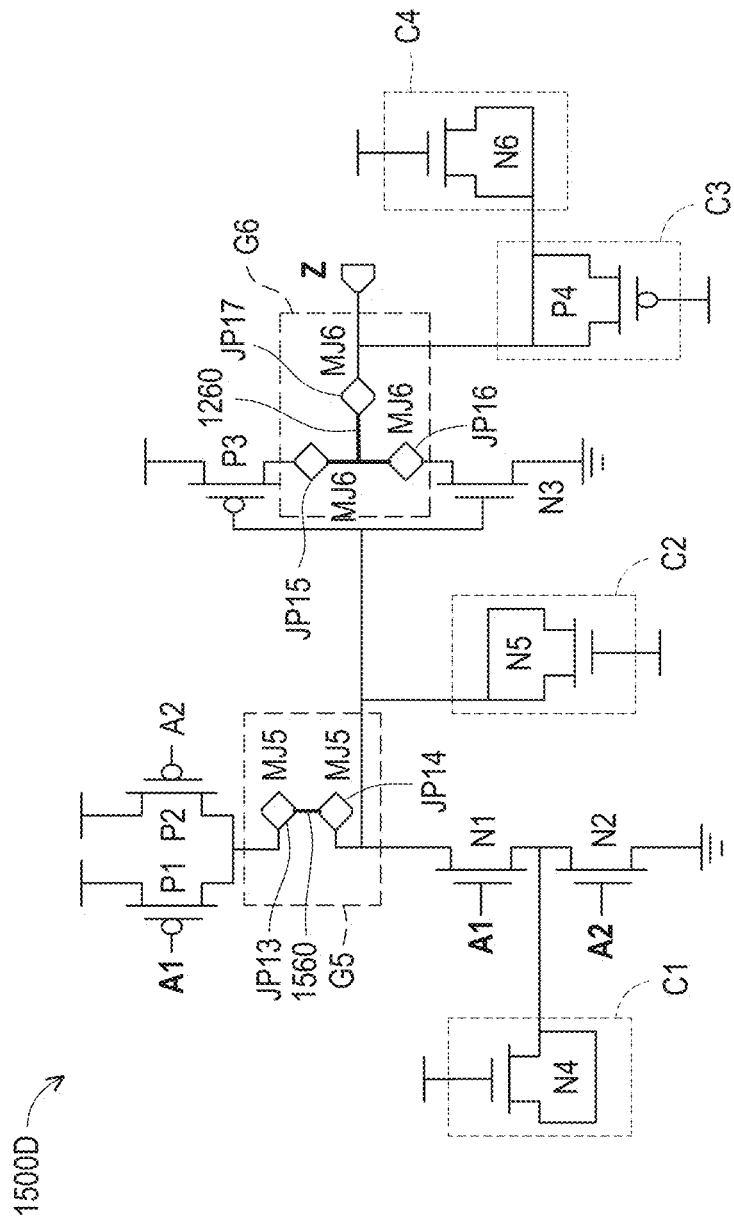
FIG. 15D is a circuit diagram of integrated circuit, in accordance with some embodiments.

In some embodiments, the second circuit of method 100 includes at least one of circuit 900E of FIG. 9E, circuit 1000D of FIG. 10D, circuit 1100D of FIG. 11D, circuit 1200D of FIG. 12D or circuit 1500D of FIG. 15D.

In some embodiments, operation 112 of method 100 is performed by a processing device (e.g., processor 1902 (FIG. 19)) configured to execute instructions for changing the first circuit to the second circuit.

In some embodiments, operation 112 further includes operation 114.

In operation 114 of method 100, the first pin and the second pin in the first group of pins are connected together.

In some embodiments, the first pin and the second pin in the first group of pins are connected together by at least one or more conductive feature patterns located in a second layout level different from the first layout level. In some embodiments, the second layout level of method 100 includes metal-1 (M1). Other layout levels are within the scope of the present disclosure. For example, as shown in FIG. 3, pin PIN1 and pin PIN2 are connected together by a conductive feature pattern 322, a via pattern 324, and a via pattern 326. For example, as shown in FIG. 3, pin PIN1 and pin PIN2 are connected together by a conductive feature pattern 332, a via pattern 334, and a via pattern 336.

In some embodiments, operation 114 of method 100 is performed by a processing device (e.g., processor 1902 (FIG. 19)) configured to execute instructions for connecting the first pin and the second pin together.

In some embodiments, the first circuit includes a first pin, a second pin and a third pin that are electrically disconnected from each other. In some embodiments, operation 114 includes at least connecting the first pin, the second pin and the third pin of the first circuit to each other. In some embodiments, operation 104 of method 100 is performed by a processing device (e.g., processor 1902 (FIG. 19)) configured to execute instructions for connecting the first pin, the second pin and the third pin together.

In some embodiments, the first circuit further includes a third pin and a fourth pin that are electrically disconnected from each other. In some embodiments, operation 114 includes connecting the third pin and the fourth pin of the first circuit to each other. In some embodiments, operation 104 of method 100 is performed by a processing device (e.g., processor 1902 (FIG. 19)) configured to execute instructions for connecting the third pin and the fourth pin together.

Figure 18:
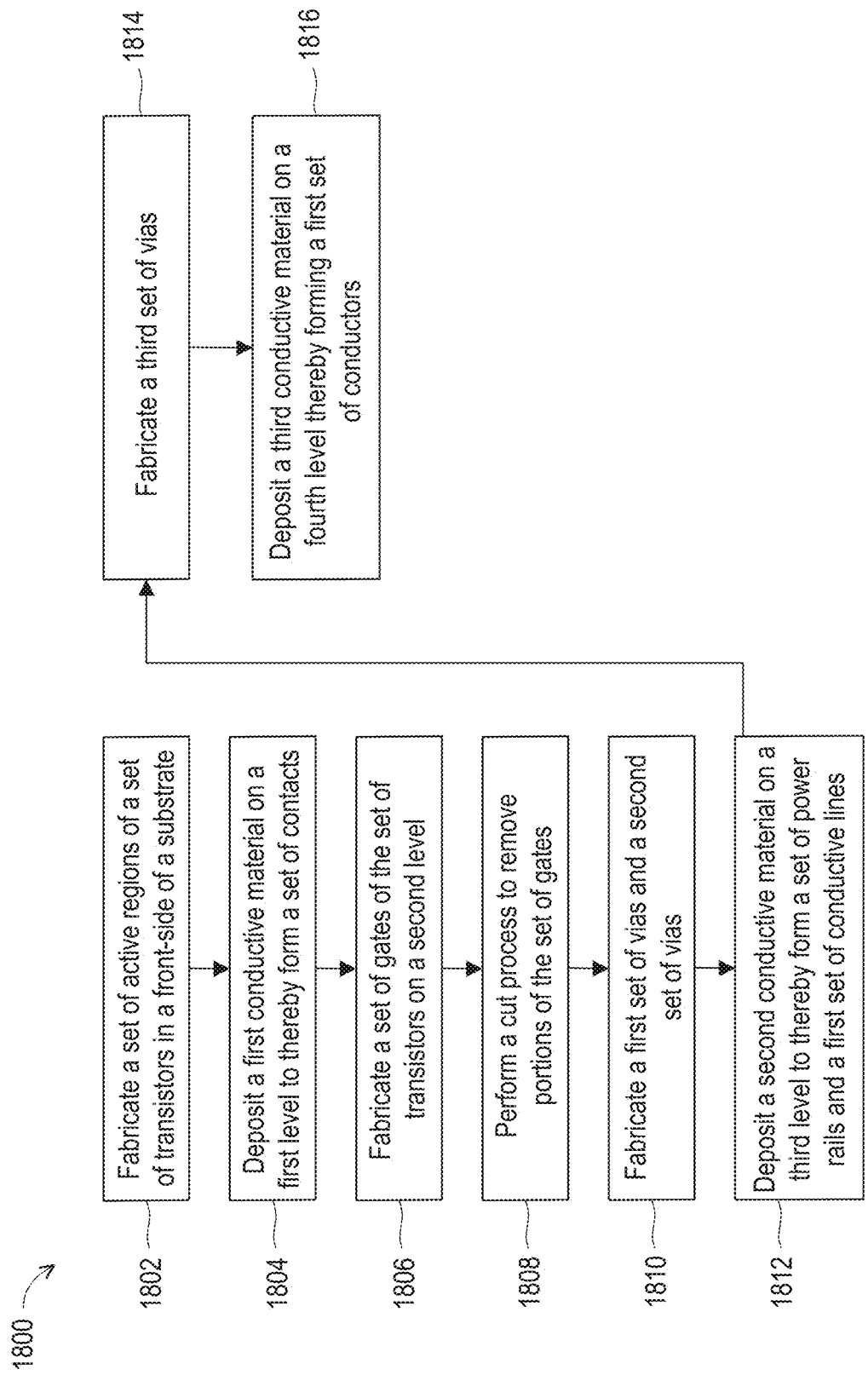
FIG. 18 is a corresponding functional flow charts of method of manufacturing an IC device, in accordance with some embodiments.

In operation 116 of method 100, a whole integrated circuit is manufactured based on at least the layout design. In some embodiments, operation 116 of method 100 comprises manufacturing at least one mask based on the layout design, and manufacturing the integrated circuit based on the at least one mask. In some embodiments, operation 116 is an embodiment of method 1800 (FIG. 18).

In some embodiments, the whole integrated circuit of the present disclosure includes at least IC device 2060 in FIG. 20.

While method 100 is described as connecting at least one of the first pin, the second pin, the third pin or the fourth pin together, other numbers of pins that are connected together are within the scope of the present disclosure.

In some embodiments, one or more of operations 102, 104, 106, 108, 110, 112 or 116 is not performed.

In some embodiments, by using method 100, placing the first layout into the layout design is a more flexible APR placement scheme compared to other approaches.

Figure 2:
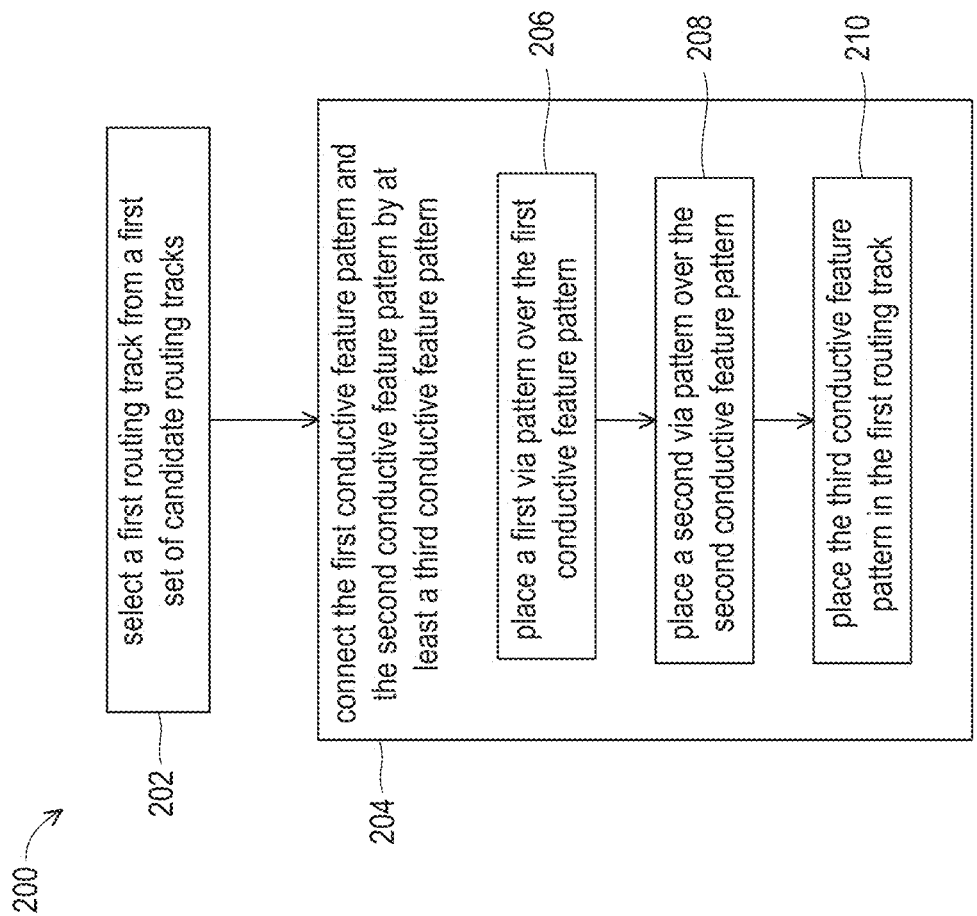
FIG. 2 is a flowchart of a method of changing the first circuit to the second circuit in accordance with some embodiments.

FIG. 2 is a flowchart of a method 200 of changing the first circuit to the second circuit in accordance with some embodiments.

It is understood that additional operations may be performed before, during, and/or after the method 200 depicted in FIG. 2, and that some other processes may only be briefly described herein. In some embodiments, the method 200 is usable to generate one or more layouts, such as layout 800 of FIG. 8, layout 900D of FIG. 9D, layout 1000C of FIG. 10C, layout 1100C of FIG. 11C, layout 1200C of FIG. 12C, layout 1300B of FIG. 13B, layout 1400B of FIG. 14B or layout 1500C of FIG. 15C.

Method 200 is an embodiment of operations 112 and 114 of method 100 (FIG. 1).

In operation 202 of method 200, a first routing track is selected from a first set of candidate routing tracks.

In some embodiments, the first set of candidate routing tracks is in the second layout level. Other layout levels are within the scope of the present disclosure. In some embodiments, the first set of candidate routing tracks are not occupied by a corresponding conductive feature pattern in the second layout level.

In some embodiments, the first set of candidate routing tracks extend in the second direction Y. In some embodiments, each routing track of the first set of candidate routing tracks is separated from one another in the first direction X.

In some embodiments, the first set of candidate routing tracks of the present disclosure includes at least one of routing tracks T1-T3 in FIGS. 3, 12B-12C and 14B, routing tracks T1-T7 in FIGS. 4 and 8, routing tracks T1-T5 in FIGS. 9C-9D, 10B-10C and 11B-11C or routing tracks T1-T10 in FIGS. 15B-15C.

In operation 204 of method 200, the first conductive feature pattern and the second conductive feature pattern are connected together by at least a third conductive feature pattern.

In some embodiments, operation 204 is an embodiment of operation 114 of method 100.

In some embodiments, the third conductive feature pattern extends in the second direction Y, overlaps the first conductive feature pattern and the second conductive feature pattern, and is on the second layout level.

In some embodiments, the third conductive feature pattern of method 200 includes at least one of conductive feature pattern 322 or 332 of FIG. 3, conductive feature pattern 930a of FIGS. 9E, 10C and 11C, conductive feature pattern 1230a of FIG. 12C, conductive feature patterns 1430a, 1430b and 1430c of FIG. 14B or conductive feature patterns 1530a and 1530b of FIG. 15C.

In some embodiments, operation 204 includes at least one of operation 206, 208 or 210.

In operation 206 of method 200, a first via pattern is placed over the first conductive feature pattern.

In some embodiments, the first via pattern of method 200 includes at least one of via pattern 324 or 334 of FIG. 3, via pattern 932a of FIGS. 9E, 10C and 11C, via pattern 1232c of FIG. 12C or via patterns 1532a and 1532c of FIG. 15C.

In operation 208 of method 200, a second via pattern is placed over the second conductive feature pattern.

In some embodiments, the second via pattern of method 200 includes at least one of via pattern 326 or 336 of FIG. 3, via pattern 932b of FIGS. 9E, 10C and 11C, via pattern 1232c of FIG. 12C or via patterns 1532b and 1532d of FIG. 15C.

At least one of the first via pattern or the second via pattern of method 200 is positioned at a via-0 (V0) level. In some embodiments, the V0 level is between the first layout level and the second layout level. In some embodiments, the V0 level is between the M0 level and the M1 level.

In operation 210 of method 200, the third conductive feature pattern is placed in the first routing track of the first set of candidate routing tracks. In some embodiments, the third conductive feature pattern overlaps the first conductive feature pattern and the second conductive feature pattern.

In some embodiments, the first via pattern is between the first conductive feature pattern and the third conductive feature pattern. In some embodiments, the first via pattern couples the first conductive feature pattern and the third conductive feature pattern together.

In some embodiments, the second via pattern is between the second conductive feature pattern and the third conductive feature pattern. In some embodiments, the second via pattern couples the second conductive feature pattern and the third conductive feature pattern together.

In some embodiments, the third conductive feature pattern is placed in the first routing track of the first set of candidate routing tracks. In some embodiments, by placing the third conductive feature pattern in the first routing track, the third conductive feature pattern is successfully placed in an unoccupied routing track in the second layout level since no conflict exists with another conductive feature pattern (discussed in more detail in FIGS. 3-4) that is already in the first routing track, and on the second layout level thereby reducing the need to perform rerouting when placing the cell in the layout design.

In some embodiments, by using methods 100-200, placing the first layout into the layout design is a more flexible APR placement scheme compared to other approaches.

In some embodiments, method 200 is repeated for connecting the third pin and fourth pin of the first circuit to each other (as discussed above for operation 114).

While method 200 is described as connecting at least one of the first conductive feature pattern (e.g., first pin) and the second conductive feature pattern (e.g., second pin) together, connecting other numbers of conductive feature patterns (e.g., pins) together are within the scope of the present disclosure. For example, in some embodiments, operation 114 includes at least connecting the first pin, the second pin and the third pin of the first circuit to each other. In these embodiments, method 200 further includes placing a third via pattern, such as via pattern 1232c in FIG. 12C.

In some embodiments, one or more of operations 202, 204, 206, 208 or 210 is not performed. In some embodiments, other order of operations of method 200 is within the scope of the present disclosure. Method 200 includes exemplary operations, but the operations are not necessarily performed in the order shown. Operations may be combined, divided, added, replaced, changed order, and/or eliminated as appropriate, in accordance with the spirit and scope of disclosed embodiments.

In some embodiments, one or more operations of 202-210 of method 200 is performed by a processing device (e.g., processor 1902 (FIG. 19)) configured to execute instructions for changing the first circuit to the second circuit.

FIG. 3 is a diagram of a corresponding layout 300 of an integrated circuit, in accordance with some embodiments.

In some embodiments, layout 300 is a non-limiting example of one or more operations of methods 100-200.

In some embodiments, layout 300 is a non-limiting example of operations 106 and 110 of method 100. For example, a layout 300A is placed into region 350 of portion 301A by operation 110 of method 100, and layout 300A is placed into region 352 of portion 301B by operation 110 of method 100, in accordance with some embodiments.

In some embodiments, layout 300A corresponds to the first layout after operation 106 of method 100, and each of portions 301A-301B correspond to the layout design after operation 110 of method 100.

Layout 300 includes a layout 300A, and portions 301A and 301B. Portion 301A includes cells 320A1 and 320B-320E. Portion 301B includes cells 320A2 and 320B-320E.

Layout 300A includes a conductive feature pattern 302 and a conductive feature pattern 304 extending in the first direction X, and being separated from each other in the second direction Y. Conductive feature patterns 302 and 304 are on the first layout level.

Conductive feature pattern 302 is the first conductive feature pattern of methods 100-200, and similar detailed description is therefore omitted. Conductive feature pattern 302 corresponds to the first pin of methods 100-200, and similar detailed description is therefore omitted.

Conductive feature pattern 304 is the second conductive feature pattern of methods 100-200, and similar detailed description is therefore omitted. Conductive feature pattern 304 corresponds to the second pin of methods 100-200, and similar detailed description is therefore omitted.

Layout 300A further includes a conductive feature pattern 306 extending in the second direction Y, and overlaps the conductive feature pattern 304. Conductive feature layout pattern 306 is on the second layout level, and is in routing track T3.

Layout 300A further includes regions 308 where additional conductive feature patterns can be placed in routing tracks T1-T2. In some embodiments, regions 308 correspond to regions where one or more disconnected pins of method 100-200 would be located. In some embodiments, regions 308 are also referred to as unused M1 regions.

In some embodiments, each of cells 320A1, 320A2 and 320B-320E correspond to standard cell regions of the layout design after operation 110 of method 100. Cells 320B-320E are adjacent to cells 320A1 and 320A2. Cells 320A1 and 320A2 are in a central region of cells 320B-320E. Stated differently, cells 320A1 and 320A2 are surrounded or encapsulated by cells 320B-320E.

Conductive feature patterns 322 and 332 are the third conductive feature pattern of method 200, and similar detailed description is therefore omitted. Via patterns 324 and 334 are the first via pattern of method 200, and similar detailed description is therefore omitted. Via patterns 326 and 336 are the second via pattern of method 200, and similar detailed description is therefore omitted.

During execution of methods 100 and 200, layout 300A is generated as the first layout after operation 106 of method 100. Afterwards, in operation 110, layout 300A is placed into region 350 of portion 301A by the APR tool, and layout 300A is placed into region 352 of portion 301B by the APR tool.

Portion 301A includes a conductive feature pattern 321 that extends in the second direction Y and is on the second layout level. Conductive feature pattern 321 is similar to conductive feature pattern 322, and similar detailed description is therefore omitted. Conductive feature pattern 321 extends through cells 320B, 320E and 320A1. In some embodiments, during placement and routing, the APR tool is configured to automatically place the conductive feature pattern 321 in routing track T1 of portion 301A. During execution of operation 202, routing track T2 is selected as the first routing track from the set of candidate routing tracks T1-T3 since routing track T2 in portion 301A is not occupied by a conductive feature pattern. During execution of operation 202, routing track T1 is not selected as the first routing track from the set of candidate routing tracks T1-T3 since routing track T1 in portion 301A is occupied by conductive feature pattern 321.

Afterwards, in operation 206, via pattern 324 is placed over the conductive feature pattern 322. Afterwards, in operation 208, via pattern 326 is placed over the conductive feature pattern 322. Afterwards, in operation 210, conductive feature pattern 322 is placed in routing track T2.

Portion 301B includes a conductive feature pattern 331 that extends in the second direction Y and is on the second layout level. Conductive feature pattern 331 is similar to conductive feature pattern 332, and similar detailed description is therefore omitted. Conductive feature pattern 331 extends through cells 320B, 320E and 320A2. In some embodiments, during placement and routing, the APR tool is configured to automatically place the conductive feature pattern 331 in routing track T2 of Portion 301B. During execution of operation 202, routing track T1 is selected as the first routing track from the set of candidate routing tracks T1-T3 since routing track T1 in portion 301B is not occupied by a conductive feature pattern. During execution of operation 202, routing track T2 is not selected as the first routing track from the set of candidate routing tracks T1-T3 since routing track T2 in portion 301B is occupied by conductive feature pattern 331.

Afterwards, in operation 206, via pattern 334 is placed over the conductive feature pattern 322. Afterwards, in operation 208, via pattern 336 is placed over the conductive feature pattern 322. Afterwards, in operation 210, conductive feature pattern 332 is placed in routing track T1.

In some embodiments, layout 300A increases routing flexibility and has a more flexible design because the candidate routing track that is used for conductive feature 322 or 332 is able to be adjusted based on the available or unoccupied routing tracks compared to other approaches that have fixed conductive feature patterns in the second layout level and use different layout designs for each different occupied routing track.

In some embodiments, by leaving the first pin and the second pin disconnected within the first circuit, the first layout of the first circuit is more flexible since during the APR stage of operation 110, the third conductive feature pattern that connects the first pin and the second pin together can be placed in a number of unoccupied routing tracks compared to other approaches where a conductive feature pattern that connects the first pin and the second pin together is in a fixed routing track that may conflict with another conductive feature pattern that is already in the fixed routing track thereby causing rerouting when placing the cell in the layout design.

Other variations of the execution of methods 100-200 are within the scope of the present disclosure.

In some embodiments, layout 300 achieves one or more of the benefits discussed above.

Other configurations, arrangements on other layout levels or quantities of elements in layout 300 are within the scope of the present disclosure.

FIG. 4 is a diagram of a corresponding layout 400 of an integrated circuit, in accordance with some embodiments.

In some embodiments, layout 400 is yet another non-limiting example of one or more operations of methods 100-200.

In some embodiments, layout 400 is a non-limiting example of operations 106 and 110 of method 100. For example, a layout 400A is placed into region 450 of cell 440B by operation 110 of method 100, and layout 400A is placed into region 452 of cell 440D by operation 110 of method 100, in accordance with some embodiments.

In some embodiments, layout 400A corresponds to the first layout after operation 106 of method 100. Layout 400B corresponds to a layout that is not generated by method 100. For example, layout 400B includes a first pin (e.g., conductive feature pattern 402a) and a second pin (e.g., conductive feature pattern 404b) that are connected together.

Layout 400 includes a layout 400A, layout 400B, and cells 440A-440E.

Layout 400A includes conductive feature pattern 402a and conductive feature pattern 404a.

Layout 400B includes conductive feature pattern 402b, conductive feature pattern 404b and conductive feature pattern 410.

Conductive feature patterns 402a and 402b are similar to conductive feature pattern 302, conductive feature patterns 404a and 404b are similar to conductive feature pattern 304, and conductive feature pattern 410 is similar to conductive feature pattern 322, and similar detailed description is therefore omitted.

Conductive feature pattern 402a or 402b is the first conductive feature pattern of methods 100-200, and conductive feature pattern 404a or 404b is the second conductive feature pattern of methods 100-200, and similar detailed description is therefore omitted. Conductive feature pattern 402a or 402b corresponds to the first pin of methods 100-200, conductive feature pattern 404a or 404b corresponds to the second pin of methods 100-200, and similar detailed description is therefore omitted.

Layout 400A further includes regions where additional conductive feature patterns can be placed in routing tracks T1-T7.

Layout 400B further includes regions where additional conductive feature patterns can be placed in routing tracks T1-T2 and T4-T7. Conductive feature layout pattern 410 is on the second layout level, and is in routing track T3.

In some embodiments, each of cells 440A-440E correspond to standard cell regions of the layout design after operation 110 of method 100.

Cell 440B includes a fixed power rail pattern 420 in track T3. Cell 440D includes a fixed power rail pattern 420 in track T6.

During execution of methods 100 and 200, layout 400A is generated as the first layout after operation 106 of method 100.

Afterwards, in operation 110, layout 400A is placed into region 450 of cell 440B by the APR tool since the fixed power rail pattern 420 in track T3 does not conflict with other conductive feature patterns in the second layout level of layout 400A. Stated differently, layout 400A does not include conductive feature patterns in the second layout level that are positioned within routing tracks T1-T7, and therefore no conductive feature patterns in the second layout level of layout 400A conflict with the fixed power rail pattern 420 in track T3.

Afterwards, in operation 110, layout 400A is placed into region 452 of cell 440D by the APR tool since the fixed power rail pattern 420 in track T6 does not conflict with other conductive feature patterns in the second layout level of layout 400A. Stated differently, layout 400A does not include conductive feature patterns in the second layout level that are positioned within routing tracks T1-T7, and therefore no conductive feature patterns in the second layout level of layout 400A conflict with the fixed power rail pattern 420 in track T6.

Layout 400B can be placed into region 452 of cell 440B since the fixed power rail pattern 420 in track T6 does not conflict with conductive feature pattern 410 of layout 400B. However, layout 400B cannot be placed into region 450 of cell 440B since the fixed power rail pattern 420 in track T3 conflicts with conductive feature pattern 410 of layout 400B. In these approaches, in order to overcome conflicts between occupied routing tracks in the second layout level and conductive feature patterns in layout 400B, electrical equivalence (EEQ) cells are generated to mimic the function of layout 400B, but the conductive feature pattern 410 is shifted into another routing track in the first direction X. However, the use of EEQ cells drastically increases the size of the standard cell library.

In some embodiments, by using methods 100-200, the present disclosure does not generate EEQ cells thereby reducing the size of the standard cell library. In some embodiments, by reducing the size of the standard cell library, causes the standard cell library to occupy less memory (e.g., memory 1904 of FIG. 19) compared to other approaches. In some embodiments, by occupying less memory, system 19 of FIG. 19 has improved performance compared to other approaches since system 19 of FIG. 19 has more available memory for other applications. In some embodiments, the time to generate each standard cell in the standard cell library is reduced since the size of the standard cell library is reduced thereby improving the performance of the system 19 of FIG. 19 compared to other approaches.

In some embodiments, layout 400A of layout 400 increases routing flexibility and has a more flexible design because the conductive feature pattern that connects conductive feature patterns 402a and 404a can be adjusted based on the available or unoccupied routing tracks compared to layout 400B that has a fixed conductive feature pattern 410 and would use different layout designs/EEQs for each different occupied routing track. In some embodiments, layout 400A can achieve 100% placement flexibility without the use of additional EEQ cells.

In some embodiments, layout 400A of layout 400 achieves one or more of the benefits discussed above.

Other configurations, arrangements on other layout levels or quantities of elements in layout 400 are within the scope of the present disclosure.

Figure 5:
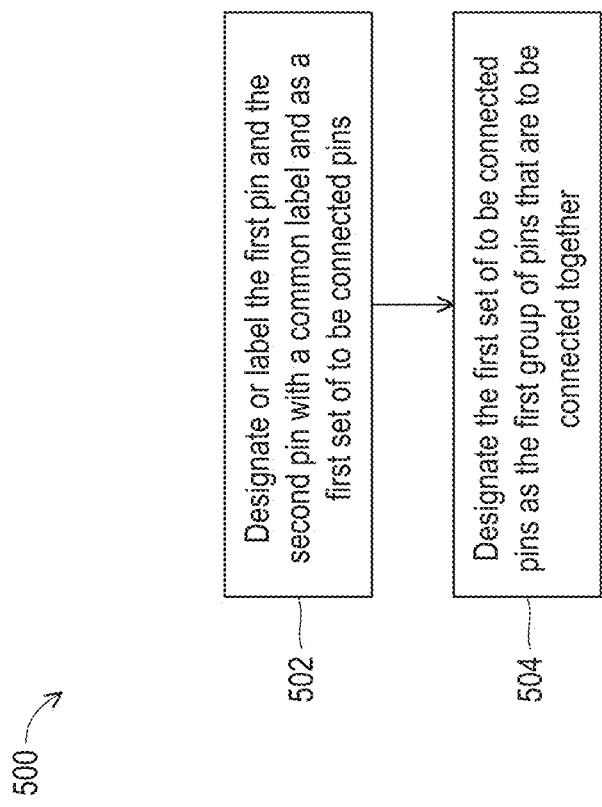
FIG. 5 is a flowchart of a method of designating the first pin and the second pin as the first group of pins that are to be connected together, in accordance with some embodiments.

FIG. 5 is a flowchart of a method 500 of designating the first pin and the second pin as the first group of pins that are to be connected together, in accordance with some embodiments.

Method 500 is an embodiment of operation 104 of method 100 (FIG. 1).

It is understood that additional operations may be performed before, during, and/or after the method 500 depicted in FIG. 5, and that some other processes may only be briefly described herein. In some embodiments, the method 500 is usable to designate the first pin and the second pin as the first group of pins that are to be connected together, such as at least one of group 702a, 702b, 702c or 702d of FIGS. 7A-7C, group G1 of FIGS. 9B and 9E, group G2 of FIGS. 10A and 10D, group G3 of FIGS. 11A and 11D, group G4 of FIGS. 12A and 12D or groups G5 and G6 of FIGS. 15A and 15D.

In operation 502 of method 500, the first pin and the second pin are designated or labelled with a common label and as a first set of to be connected pins. In some embodiments, the first pin and the second pin are designated or labelled with the common label and as the first set of to be connected pins so that the APR tool in operation 110 knows which pins should be connected together.

In some embodiments, the common label of method 500 includes at least one of pin label B in FIGS. 7A and 7C, pin label C in FIGS. 7A and 7C, pin label MJ1 in FIGS. 9B-9E, pin label MJ3 in FIGS. 11A-11D, pin label MJ4 in FIGS. 12A-12D or pin label MJ5 or MJ6 in FIGS. 15A-15D.

In some embodiments, the first set of to be connected pins of method 500 includes at least one of pins 704a and 706a of FIG. 7A, pins 704c and 706c of FIG. 7C, pins 704d and 706d of FIG. 7C, pins JP1-JP2 of FIGS. 9B-9E, pins JP3-JP4 of FIGS. 11A-11D, pins JP5-JP7 of FIGS. 12A-12D, pins +IN, +Internal and +Z of FIGS. 13A-13B, or pins JP13-JP17 of FIGS. 15A-15D.

In operation 504 of method 500, the first set of to be connected pins is designated as the first group of pins that are to be connected together. In some embodiments, the first set of to be connected pins is designated as the first group of pins that are to be connected together so that the APR tool in operation 110 knows which pins should be connected together.

In some embodiments, layout 700A of FIG. 7A and layout 700C of FIG. 7C illustrate non-limiting examples of method 500.

While method 500 is described as designating the first pin and the second pin as the first group of pins that are to be connected together, other numbers of pins can be designated as the first group of pins that are to be connected together and are within the scope of the present disclosure.

In some embodiments, method 500 achieves one or more of the benefits discussed within the present disclosure.

Figure 6:
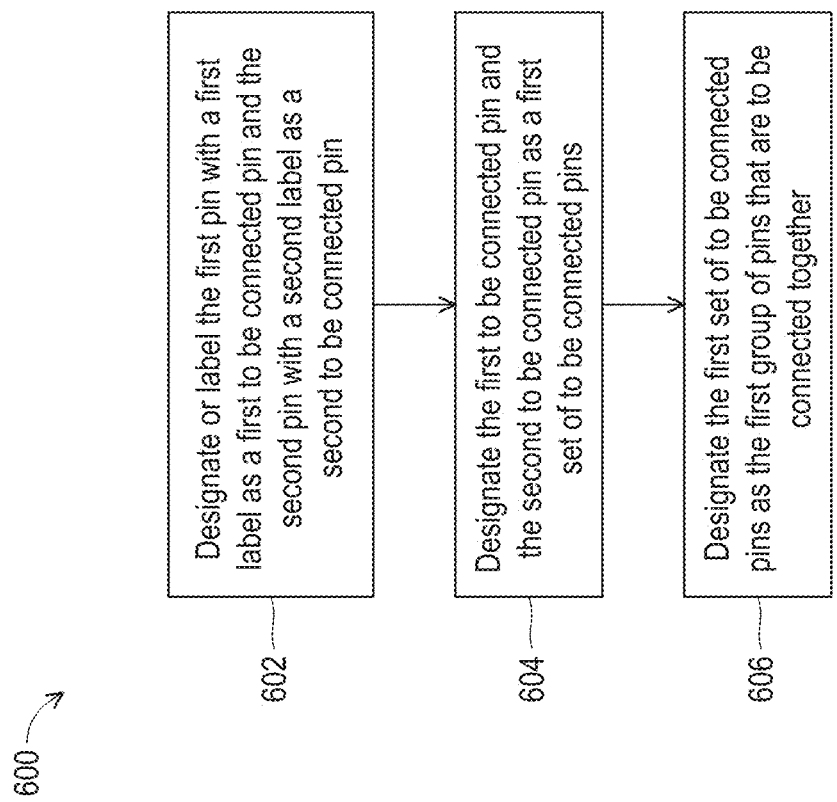
FIG. 6 is a flowchart of a method of designating the first pin and the second pin as the first group of pins that are to be connected together, in accordance with some embodiments.

FIG. 6 is a flowchart of a method 600 of designating the first pin and the second pin as the first group of pins that are to be connected together, in accordance with some embodiments.

Method 600 is an embodiment of operation 104 of method 100 (FIG. 1).

It is understood that additional operations may be performed before, during, and/or after the method 600 depicted in FIG. 6, and that some other processes may only be briefly described herein. In some embodiments, the method 600 is usable to designate the first pin and the second pin as the first group of pins that are to be connected together, such as at least one of group 702a, 702b, 702c or 702d of FIGS. 7A-7C, group G1 of FIGS. 9B and 9E, group G2 of FIGS. 10A and 10D, group G3 of FIGS. 11A and 11D, group G4 of FIGS. 12A and 12D or groups G5 and G6 of FIGS. 15A and 15D.

In operation 602 of method 600, the first pin is designated or labelled with a first label as a first to be connected pin and the second pin is designated or labelled with a second label as a second to be connected pin.

In some embodiments, the first pin is designated or labelled with a first label, and the second pin is designated or labelled with the second label so that the APR tool in operation 110 knows the labels or names of pins that should be connected together.

In some embodiments, the first label of method 500 includes at least one of pin label B in FIG. 7B, pin label MJ1 in FIGS. 10A-10E, at least one of pin label JP8, JP9, JP10, JP11, or JP12 in FIG. 14B.

In some embodiments, the second label of method 500 includes at least one of pin label C in FIG. 7B, pin label MJ2 in FIGS. 10A-10E or at least another of pin label JP8, JP9, JP10, JP11, or JP12 in FIG. 14B.

In operation 604 of method 600, the first to be connected pin and the second to be connected pin are designed as a first set of to be connected pins. In some embodiments, the first to be connected pin and the second to be connected pin are designed as a first set of to be connected pins so that the APR tool in operation 110 knows which region of the layout includes pins should be connected together.

In some embodiments, the first set of to be connected pins of method 600 includes at least one of pins 704b and 706b of FIG. 7B, pins JP1-JP2 of FIGS. 10A-10E, or pins JP8, JP9, JP10, JP11, and JP12 in FIG. 14B.

In operation 606 of method 600, designating the first set of to be connected pins as the first group of pins that are to be connected together. In some embodiments, the first set of to be connected pins is designated as the first group of pins that are to be connected together so that the APR tool in operation 110 knows which pins should be connected together.

In some embodiments, layout 700B of FIG. 7B illustrate a non-limiting example of method 600.

While method 600 is described as designating the first pin and the second pin as the first group of pins that are to be connected together, other numbers of pins can be designated as the first group of pins that are to be connected together and are within the scope of the present disclosure.

In some embodiments, method 600 achieves one or more of the benefits discussed within the present disclosure.

FIGS. 7A-7C are corresponding diagrams of a corresponding layouts 700A-700C of an integrated circuit, in accordance with some embodiments.

In some embodiments, layout 700A-700C are non-limiting examples of one or more operations of methods 500-600.

In some embodiments, layout 700A is a non-limiting example of method 500. For example, layout 700A corresponds to a layout of the first group of pins that are to be connected together after operation 504 of method 500, in accordance with some embodiments.

In some embodiments, layout 700B is a non-limiting example of method 600. For example, layout 700B corresponds to a layout of the first group of pins that are to be connected together after operation 506 of method 500, in accordance with some embodiments.

In some embodiments, layout 700C is a non-limiting example of methods 500 and 600. For example, layout 700C corresponds to a layout of a first group of pins that are to be connected together after operation 504 of method 500, and a layout of a second group of pins that are to be connected together after operation 606 of method 600, in accordance with some embodiments.

Layout 700A includes a conductive feature pattern 704a, a conductive feature pattern 706a and conductive feature pattern 708a. In some embodiments, conductive feature patterns 704a, 706a and 708a are similar to conductive feature pattern 302 or 304, and similar detailed description is therefore omitted.

Conductive feature pattern 704a corresponds to the first pin of methods 100-200 and 500, conductive feature pattern 706a corresponds to the second pin of methods 100-200 and 500, and similar detailed description is therefore omitted. Conductive feature pattern 704a is the first conductive feature pattern of methods 100-200 and 500, and conductive feature pattern 706a is the second conductive feature pattern of methods 100-200 and 500, and similar detailed description is therefore omitted.

During execution of method 500, in operation 502, conductive feature pattern 704a (e.g., first pin) and conductive feature pattern 704a (e.g., second pin) are designated or labelled with a common label (e.g., "B") and as a first set of to be connected pins. Afterwards, in operation 504, the first set of to be connected pins is designated as the first group of pins 702a that are to be connected together.

Layout 700B includes a conductive feature pattern 704b, a conductive feature pattern 706b and conductive feature pattern 708b. In some embodiments, conductive feature patterns 704b, 706b and 708b are similar to conductive feature pattern 302 or 304, and similar detailed description is therefore omitted.

Conductive feature pattern 704b corresponds to the first pin of methods 100-200 and 600, conductive feature pattern 706b corresponds to the second pin of methods 100-200 and 600, conductive feature pattern 708b corresponds to the third pin of methods 100-200 and 600, and similar detailed description is therefore omitted. Conductive feature pattern 704b is the first conductive feature pattern of methods 100-200 and 600, conductive feature pattern 706b is the second conductive feature pattern of methods 100-200 and 600, and conductive feature pattern 708b is the third conductive feature pattern of methods 100-200 and 600, and similar detailed description is therefore omitted.

During execution of method 600, in operation 602, conductive feature pattern 704b (e.g., first pin) is designated or labelled with a label (e.g., "B") as a first to be connected pin, conductive feature pattern 706b (e.g., second pin) is designated or labelled with a label (e.g., "C") as a second to be connected pin, and conductive feature pattern 708b (e.g., third pin) is designated or labelled with a label (e.g., "A") as a third to be connected pin. Afterwards, in operation 604 of method 600, the first to be connected pin, the second to be connected pin and the third to be connected pin are designed as a first set of to be connected pins. Afterwards, in operation 606, the first set of to be connected pins is designated as the first group of pins 702b that are to be connected together.

Layout 700C includes a conductive feature pattern 704c, a conductive feature pattern 706c and conductive feature pattern 708c. In some embodiments, conductive feature patterns 704c, 706c and 708c are similar to conductive feature pattern 302 or 304, and similar detailed description is therefore omitted.

Conductive feature pattern 704c corresponds to the first pin of methods 100-200 and 500, conductive feature pattern 706c corresponds to the second pin of methods 100-200 and 500, and similar detailed description is therefore omitted. Conductive feature pattern 704c is the first conductive feature pattern of methods 100-200 and 500, and conductive feature pattern 706c is the second conductive feature pattern of methods 100-200 and 500, and similar detailed description is therefore omitted.

During execution of method 500, in operation 502, conductive feature pattern 704c (e.g., first pin) and conductive feature pattern 704c (e.g., second pin) are designated or labelled with a common label (e.g., "B") and as a first set of to be connected pins. Afterwards, in operation 504, the first set of to be connected pins is designated as the first group of pins 702c that are to be connected together.

Layout 700C further includes a conductive feature pattern 704d, a conductive feature pattern 706d and conductive feature pattern 708d. In some embodiments, conductive feature patterns 704d, 706d and 708d are similar to conductive feature pattern 302 or 304, and similar detailed description is therefore omitted.

Conductive feature pattern 704d corresponds to the first pin of methods 100-200 and 600, conductive feature pattern 706d corresponds to the second pin of methods 100-200 and 600, conductive feature pattern 708d corresponds to the third pin of methods 100-200 and 600, and similar detailed description is therefore omitted. Conductive feature pattern 704d is the first conductive feature pattern of methods 100-200 and 600, conductive feature pattern 706d is the second conductive feature pattern of methods 100-200 and 600, and conductive feature pattern 708d is the third conductive feature pattern of methods 100-200 and 600, and similar detailed description is therefore omitted.

During execution of method 600, in operation 602, conductive feature pattern 704d (e.g., first pin) is designated or labelled with a label (e.g., "C") as a first to be connected pin, conductive feature pattern 706d (e.g., second pin) is designated or labelled with a label (e.g., "D") as a second to be connected pin, and conductive feature pattern 708d (e.g., third pin) is designated or labelled with a label (e.g., "C") as a third to be connected pin. Afterwards, in operation 604 of method 600, the first to be connected pin, the second to be connected pin and the third to be connected pin are designed as a second set of to be connected pins. Afterwards, in operation 606, the second set of to be connected pins is designated as the second group of pins 702d that are to be connected together.

Other configurations of layout 700A-700C are within the scope of the present disclosure.

In some embodiments, layout 700A-700C achieves one or more of the benefits discussed within the present disclosure.

FIG. 8 is a diagram of a layout 800 of an integrated circuit, in accordance with some embodiments.

In some embodiments, layout 800 is yet another non-limiting example of one or more operations of methods 100-200.

In some embodiments, layout 800 corresponds to the first layout after operation 106 of method 100.

In some embodiments, layout 800 is a non-limiting example of selecting the first routing track of the first set of candidate routing tracks of operation 202 of method 200, and similar detailed description is therefore omitted. For example, layout 800 corresponds to the first layout after operation 106 of method 100, the APR tool then selects a first routing track of the first set of candidate routing tracks as a selected routing track according to design criteria in operation 202 of method 200, and then the APR tool places a third conductive feature pattern in operation 210 of method 200 into the selected routing track, in accordance with some embodiments.

Layout 800 includes a conductive feature pattern 802, a conductive feature pattern 804, a conductive feature pattern 840, a conductive feature pattern 844, a conductive feature pattern 846 and a conductive feature pattern 850.

Conductive feature patterns 802 and 804 are similar to conductive feature patterns 404a and 404b of FIG. 4, conductive feature layout patterns 840, 844, 846 and 850 are similar to conductive feature layout pattern 420 in FIG. 4, and similar detailed description is therefore omitted.

Conductive feature pattern 802 is the first conductive feature pattern of methods 100-200, and conductive feature pattern 804 is the second conductive feature pattern of methods 100-200, and similar detailed description is therefore omitted. Conductive feature pattern 802 corresponds to the first pin of methods 100-200, conductive feature pattern 804 corresponds to the second pin of methods 100-200, and similar detailed description is therefore omitted.

Layout 800 further includes routing tracks T1-T7. In some embodiments, routing tracks T2-T3 and T5 correspond to the first set of candidate routing tracks of method 200, and similar detailed description is therefore omitted.

Conductive feature layout pattern 850 is on the second layout level, and is in routing track T4. Conductive feature layout pattern 840 is on the second layout level, and is in routing track T1. Conductive feature layout pattern 844 is on the second layout level, and is in routing track T6. Conductive feature layout pattern 846 is on the second layout level, and is in routing track T7.

Additional conductive feature patterns in the second layout level can be placed in routing tracks T2-T3 and T5 since they are not occupied by conductive feature patterns in the second layout level. However, selecting the first routing track of the first set of candidate routing tracks in operation 202 of method 200 is based on design criteria. In some embodiments, the design criteria includes the APR tool being configured to choose performance, power, area (PPA) or routability based on cell usage. In other words, the APR tool is configured to conduct a tradeoff between PPA and routability of the layout, in accordance with some embodiments.

For example, if layout 800 includes a low number LN of occupied M1 routing tracks, then a larger number of unoccupied M1 routing tracks are available for selecting the first routing track of the first set of candidate routing tracks in operation 202, and then during operation 202, the EDA tool is configured to prioritize PPA over routability in order to optimize APR. In some embodiments, a low number LN of occupied M1 routing tracks are cells with less than half of the total number of routing tracks as being occupied M1 routing tracks.

In some embodiments, when PPA is prioritized over routability by the EDA tool, then the EDA tool is configured to select routing tracks that reduce capacitance in the M1 layer by maximizing a distance between the placed conductive feature pattern (e.g., third conductive feature pattern) in operation 210 and existing conductive feature patterns (e.g., conductive feature pattern 850) in the second layout level. For example, as shown in FIG. 8, a distance D1 between routing track T2 and occupied routing track T4 is greater than a distance D2 between occupied routing track T4 and routing tracks T3 and T5. Thus, in this non-limiting example, if PPA is prioritized over routability by the EDA tool for layout 800, then the EDA tool is configured to select routing track T2 in order to optimize PPA and reduce the capacitance between conductive feature pattern 850 and the conductive feature pattern (e.g., third conductive feature pattern) that will be placed in routing track T2, in accordance with some embodiments.

For example, in some embodiments, when PPA is prioritized over routability by the EDA tool, then the EDA tool is configured to select routing tracks that are not directly next to occupied routing tracks (e.g., existing conductive feature patterns (e.g., conductive feature pattern 850)) in the M1 layer.

For example, if layout 800 includes a high number HN of occupied M1 routing tracks, then a smaller number of unoccupied M1 routing tracks are available for selecting the first routing track of the first set of candidate routing tracks in operation 202, and then during operation 202, the EDA tool is configured to prioritize routability over PPA in order to ensure sufficient routing of the layout. In some embodiments, a high number HN of occupied M1 routing tracks are cells with more than half of the total number of routing tracks as being occupied M1 routing tracks. In some embodiments, the high number HN of occupied M1 routing tracks is greater than the low number LN of occupied M1 routing tracks.

In some embodiments, when routability is prioritized over PPA by the EDA tool, then the EDA tool is configured to select routing tracks that are directly next to occupied routing tracks (e.g., existing conductive feature patterns (e.g., conductive feature pattern 850)) in the M1 layer. In these embodiments, when routability is prioritized over PPA by the EDA tool, routability of conductive feature patterns in the M1 layer is prioritized over the capacitance from M1 layers. For example, if routability is prioritized over PPA by the EDA tool for layout 800, then the EDA tool is configured to select routing tracks T3 or T5 over routing track T2 in order to provide more M1 layer routing options in layout 800, and the conductive feature pattern (e.g., third conductive feature pattern) will be placed in routing track T3 or T5, in accordance with some embodiments.

In some embodiments, by utilizing ten features of layout 800 and methods 100-200, the present disclosure is able to choose PPA or routability based on cell usage compared to other approaches where M1 placement with optimal PPA is selected at the cell level thereby making routing more difficult at the APR level than with the present disclosure.

Other configurations of layout 800 is within the scope of the present disclosure.

In some embodiments, layout 800 achieves one or more of the benefits discussed within the present disclosure.

FIG. 9A is a circuit diagram of an integrated circuit 900A, in accordance with some embodiments. FIG. 9B is a circuit diagram of an integrated circuit 900B, in accordance with some embodiments. FIG. 9C is a diagram of a layout 900C of integrated circuit 900B, in accordance with some embodiments. FIG. 9D is a diagram of a layout 900D of an integrated circuit 900E, in accordance with some embodiments. FIG. 9E is a circuit diagram of integrated circuit 900E, in accordance with some embodiments. FIG. 9F is a diagram of a Verilog netlist 900F of integrated circuit 900B, in accordance with some embodiments. FIG. 9G is a cross-sectional view of integrated circuit 900D, in accordance with some embodiments.

FIG. 9A is a circuit diagram of an integrated circuit 900A, in accordance with some embodiments.

In some embodiments, integrated circuit 900A is an AND gate. An AND gate is used for illustration, other types of circuits are within the scope of the present disclosure.

Integrated circuit 900A includes PMOS transistors P1, P2 and P3 coupled to NMOS transistors N1, N2 and N3.

A gate terminal of PMOS transistor P1 and NMOS transistor N1 are coupled together, and are configured as an input node A1. A gate terminal of PMOS transistor P2 and NMOS transistor N2 are coupled together, and are configured as an input node A2.

A source terminal of PMOS transistor P1 and a source terminal of PMOS transistor P2 are coupled to the voltage supply VDD. A source terminal of NMOS transistor N2 is coupled to the reference voltage supply VSS. A source terminal of NMOS transistor N1 and a drain terminal of NMOS transistor N2 are coupled to each other.

Each of a drain terminal of PMOS transistor P1, a drain terminal of PMOS transistor P2, a drain terminal of NMOS transistor N1, a gate terminal of PMOS transistor P3 and a gate terminal of NMOS transistor N3 are coupled together.

A drain terminal of PMOS transistor P3 and a drain terminal of NMOS transistor N3 are coupled together, and are configured as an output node Z. A source terminal of PMOS transistor P3 is coupled to voltage supply VDD. A source terminal of NMOS transistor N3 is coupled to reference voltage supply VSS.

PMOS transistor P3 and NMOS transistor N3 are coupled to an output node Z. PMOS transistor P3 and NMOS transistor N3 is an inverter (not labelled). The gate terminal of PMOS transistor P3 and the gate terminal of NMOS transistor N3 are coupled together, and are configured as an input node of the inverter.

In some embodiments, one or more of the drains or sources are flipped with the other.

FIG. 9B is a circuit diagram of an integrated circuit 900B, in accordance with some embodiments.

Integrated circuit 900B is a non-functional representation of the AND gate of FIG. 9A. Integrated circuit 900B is an embodiment of the first circuit of method 100-200 of FIGS. 1-2. In some embodiments, integrated circuit 900B is generated by Verilog netlist 900E of FIG. 9E.

Integrated circuit 900B includes PMOS transistors P1, P2 and P3, NMOS transistors N1, N2 and N3, pins JP1-JP2, group G1 and pin label MJ1.

Integrated circuit 900B is a variation of integrated circuit 900A of FIG. 9A, and similar detailed description is therefore omitted. In comparison with integrated circuit 900A of FIG. 9A, the drain of NMOS transistor N1 in FIG. 9B is not connected to the drain terminal of PMOS transistor P1, the drain terminal of PMOS transistor P2, the gate terminal of PMOS transistor P3 and the gate terminal of NMOS transistor N3.

Integrated circuit 900B corresponds to the first circuit of method 100 of FIG. 1 after operation 104, and similar detailed description is therefore omitted. Integrated circuit 900B corresponds to the first circuit of method 500 of FIG. 5 after operation 504, and similar detailed description is therefore omitted.

Pin JP1 corresponds to the first pin of methods 100-200 and 500, and is the pin or node of the drain terminal of PMOS transistor P1, the drain terminal of PMOS transistor P2, the gate terminal of PMOS transistor P3 and the gate terminal of NMOS transistor N3.

Pin JP2 corresponds to the second pin of methods 100-200 and 500, and is the pin or node of drain of NMOS transistor N1.

Pin label MJ1 corresponds to the common label of method 500, and similar detailed description is therefore omitted.

Group G1 corresponds to the first group of pins of methods 100 and 500, and similar detailed description is therefore omitted.

During execution of method 500, in operation 502, pins JP1 and JP2 are designated or labelled with a common label (e.g., pin label MJ1) and as the first set of to be connected pins. Afterwards, in operation 504, the first set of to be connected pins is designated as the first group of pins (e.g., group G1) that are to be connected together.

FIG. 9C is a diagram of a layout 900C of integrated circuit 900B, in accordance with some embodiments.

Layout 900C is an embodiment of the first layout of method 100-200 of FIGS. 1-2. In some embodiments, layout 900C is generated based on the schematic of integrated circuit 900B or the Verilog netlist 900E of FIG. 9E. In some embodiments, layout 900C is stored in standard cell library 1920 in FIG. 19.

Layout 900C corresponds to the first layout of method 100 of FIG. 1 after at least one of operation 106 or 108, and similar detailed description is therefore omitted.

In some embodiments, layout 900C is usable to manufacture an integrated circuit such as integrated circuit 900G of FIG. 9G or IC device 2060 of FIG. 20.

Layout 900C includes one or more features of a oxide diffusion (OD) level or the active level, a gate (POLY) level, a metal over diffusion (MD) level, a metal 0 (M0) level, a via over gate (VG) level or a via over diffusion (VD) level. Features from other levels are not shown for ease of illustration.

Layout 900C includes one or more active region patterns 902a or 902b (collectively referred to as a "set of active region patterns 902") extending in the first direction X.

Active region patterns 902a, 902b of the set of active region patterns 902 are separated from one another in the second direction Y. In some embodiments, the set of active region patterns 902 is usable to manufacture a corresponding set of active regions. Active patterns 902a, 902b are usable to manufacture corresponding active regions 902a', 902b' of integrated circuit 900E.

In some embodiments, the set of active region patterns 902 is referred to as an oxide diffusion (OD) region which defines the source or drain diffusion regions of the integrated circuit.

In some embodiments, active region pattern 902a of the set of active region patterns 902 is usable to manufacture source and drain regions of PMOS transistors of integrated circuits 900B, 900E, 1000A, 1000D, 1100A, 1100D, 1200A, 1200D, 1500A or 1500D, and active region pattern 902b of the set of active region patterns 902 is usable to manufacture source and drain regions of NMOS transistors of integrated circuits 900B, 900E, 1000A, 1000D, 1100A, 1100D, 1200A, 1200D, 1500A or 1500D.

In some embodiments, active region pattern 902b of the set of active region patterns 902 is usable to manufacture source and drain regions of PMOS transistors of integrated circuits 900B, 900E, 1000A, 1000D, 1100A, 1100D, 1200A, 1200D, 1500A or 1500D, and active region pattern 902a of the set of active region patterns 902 is usable to manufacture source and drain regions of NMOS transistors of integrated circuits 900B, 900E, 1000A, 1000D, 1100A, 1100D, 1200A, 1200D, 1500A or 1500D.

In some embodiments, the set of active region patterns 902 is located on a third layout level. In some embodiments, the third layout level corresponds to an active level or an OD level. In some embodiments, the third layout level is below the first and second layout level.

In some embodiments, active region pattern 902a is usable to manufacture source and drain regions of one or more p-type finFET transistors, p-type nanosheet transistors or p-type nanowire transistors, and active region layout pattern 902b is usable to manufacture source and drain regions of one or more n-type finFET transistors, n-type nanosheet transistors or n-type nanowire transistors.

In some embodiments, active region pattern 902b is usable to manufacture source and drain regions of one or more n-type finFET transistors, n-type nanosheet transistors or n-type nanowire transistors, and active region layout pattern 902a is usable to manufacture source and drain regions of one or more p-type finFET transistors, p-type nanosheet transistors or p-type nanowire transistors.

Other configurations, arrangements on other layout levels or quantities of patterns in the set of active region patterns 902 are within the scope of the present disclosure.

Layout 900C further includes one or more gate patterns 904a, 904b, 904c or 904d (collectively referred to as a "set of gate patterns 904") extending in the second direction Y. Each of the gate patterns of the set of gate patterns 904 is separated from an adjacent gate pattern of the set of gate patterns 904 in the first direction X by a pitch (not labelled).

The set of gate patterns 904 is usable to manufacture a corresponding set of gates of integrated circuit 900B, 900E, 1000A, 1000D, 1100A, 1100D, 1200A, 1200D, 1500A or 1500D.

In some embodiments, each of the gate patterns in the set of gate patterns 904 is shown in FIGS. 9C-9D, 10B-10C, 11B-11C, 12B-12C or, 15B-15C with labels "P1 through P3" and "N1 through N3" that identify corresponding transistors of FIGS. 9A-9B, 9E, 10A, 10D, 11A, 11D, 12A, 12D, 15A or 15D manufactured by the corresponding gate pattern in the set of gate patterns 904, and are omitted for brevity.

The set of gate patterns 904 are above the set of active region patterns 902. The set of gate patterns 904 is positioned on a fourth layout level different from the first layout level, the second layout level and the third layout level. In some embodiments, the fourth layout corresponds to the POLY level. In some embodiments, the POLY level is above the OD level.

Other configurations, arrangements on other layout levels or quantities of patterns in the set of gate patterns 904 are within the scope of the present disclosure.

Layout 900C further includes one or more contact patterns 906a, 906b, 906c, . . . , 906i (collectively referred to as a "set of contact patterns 906") extending in the second direction Y.

Each of the contact patterns of the set of contact patterns 906 is separated from an adjacent contact pattern of the set of contact patterns 906 in at least the first direction X or the second direction Y.

The set of contact patterns 906 is usable to manufacture a corresponding set of contacts of integrated circuit 900B, 900E, 1000A, 1000D, 1100A, 1100D, 1200A, 1200D, 1500A or 1500D. Contact patterns 906b, 906g are usable to manufacture corresponding contacts 906b', 906g' of integrated circuit 900E.

In some embodiments, the set of contact patterns 906 is also referred to as a set of metal over diffusion (MD) patterns.

In some embodiments, at least one of contact pattern 906a, 906b, 906c, . . . , 906j of the set of contact patterns 906 is usable to manufacture source or drain terminals of one of the NMOS or PMOS transistors of integrated circuit 100, 900B, 900E, 1000A, 1000D, 1100A, 1100D, 1200A, 1200D, 1500A or 1500D.

In some embodiments, the set of contact patterns 906 overlap the set of active region patterns 902. The set of contact patterns is located on a fifth layout level. In some embodiments, the fifth layout level corresponds to the contact level or an MD level. In some embodiments, the fifth layout level is the same as the fourth layout level. In some embodiments, the fifth layout level is different from the first layout level, the second layout level and the third layout level. Other configurations, arrangements on other layout levels or quantities of patterns in the set of contact patterns 906 are within the scope of the present disclosure.

Layout 900C further includes one or more conductive feature patterns 920a, 920b, 920c, 920d or 920e (collectively referred to as a "set of conductive feature patterns 920") extending in the first direction X, and being located on the first layout level.

In some embodiments, conductive feature pattern 920a corresponds to the first conductive feature pattern of methods 100-200, and conductive feature pattern 920e corresponds to the second conductive feature pattern of methods 100-200, and similar detailed description is therefore omitted.

In some embodiments, the set of conductive feature patterns 920 corresponds to conductive feature patterns 302, 304, 402a, 704a-704d, 706a-706d or 708a-708d, and similar detailed description is therefore omitted.

In some embodiments, conductive feature pattern 920a corresponds to pin JP1 in FIGS. 9B and 9E, and conductive feature pattern 920e corresponds to pin JP2 in FIGS. 9B and 9E, and similar detailed description is therefore omitted.

The set of conductive feature patterns 920 is usable to manufacture a corresponding set of conductors of integrated circuit 900B, 900E, 1000A, 1000D, 1100A, 1100D, 1200A, 1200D, 1500A or 1500D. Conductive feature patterns 920a, 920e are usable to manufacture corresponding conductors 920a', 920e' of integrated circuit 900E.

While each conductive feature pattern in the set of conductive feature patterns 920 is shown as one continuous pattern, in some embodiments, one or more conductive feature pattern in the set of conductive feature patterns 920 is divided into two or more discontinuous patterns.

The set of conductive feature patterns 920 overlaps at least the set of gate patterns 904, the set of active region patterns 902 and the set of conductive feature patterns 906. In some embodiments, the set of conductive feature patterns 920 overlaps other underlying patterns (not shown for ease of illustration) of other layout levels of layout 900C.

As shown in FIG. 9C, in some embodiments, the set of conductive feature patterns 920 have a corresponding color MOA or MOB. The color MOA or MOB indicates that conductive feature patterns 920 with a same color are to be formed on a same mask of a multiple mask set, and conductive feature patterns 920 with a different color are to be formed on a different mask of the multiple mask set. Two colors MOA and MOB are depicted in FIG. 9C as an example. In some embodiments, there are more or less than two colors in layout 900C.

In some embodiments, conductive feature patterns 920a, 920b, 920c, 920d or 920e correspond to 5 M0 routing tracks in layout 900C. Other numbers of M0 routing tracks are within the scope of the present disclosure.

Other widths for the set of conductive feature patterns 920 are within the scope of the present disclosure. Other configurations, arrangements on other layout levels or quantities of patterns in the set of conductive feature patterns 920 are within the scope of the present disclosure.

Layout 900C further includes a set of routing tracks T1-T5. The set of routing tracks T1-T5 extends in the second direction Y. The set of routing tracks T1-T5 includes at least routing tracks T1, T2, T3, T4 and T5. Each routing track of the set of routing tracks T1-T5 is separated from an adjacent routing tracks T1-T5 in the second direction Y by a pitch (not labelled).

In some embodiments, each routing track of the set of routing tracks T1-T5 defines regions where the set of conductive feature patterns 930 can be positioned in operation 110 of method 100. In some embodiments, the set of routing tracks T1-T5 are also referred to as a set of M1 routing tracks.

Layout 900C further includes one or more via patterns 910a, 910b or 910c (collectively referred to as a "set of via patterns 910").

The set of via patterns 910 is usable to manufacture a corresponding set of vias of integrated circuit 900B, 900E, 1000A, 1000D, 1100A, 1100D, 1200A, 1200D, 1500A or 1500D.

The set of via patterns 910 is positioned at a via over diffusion (VD) level. In some embodiments, the VD level is above the MD and the OD level. In some embodiments, the VD level is between the MD level and the M0 level. In some embodiments, the VD level is between the fifth layout level and the first layout level. Other layout levels are within the scope of the present disclosure.

In some embodiments, the set of via patterns 910 is between the set of contact patterns 906 and the set of conductive feature patterns 920. In some embodiments, the size of one or more via patterns in the set of vias patterns 910 can be increased thereby reducing resistance compared to other approaches.

Other configurations, arrangements on other layout levels or quantities of patterns in at least set of via patterns 910 are within the scope of the present disclosure.

Layout 900C further includes one or more via patterns 912a, 912b, . . . 912d (collectively referred to as a "set of via patterns 912").

The set of via patterns 912 is usable to manufacture a corresponding set of vias of integrated circuit 900B, 900E, 1000A, 1000D, 1100A, 1100D, 1200A, 1200D, 1500A or 1500D. Via pattern 910a is usable to manufacture corresponding via 910a' of integrated circuit 900E.

In some embodiments, the set of via patterns 912 are between the set of gate patterns 904 and the set of conductive feature patterns 910.

The set of via patterns 912 is positioned at a via over gate (VG) level. In some embodiments, the VG level is above the OD level, the MD level and the POLY level. In some embodiments, the VG level is between the POLY level and the M0 level. In some embodiments, the VG level is between the fourth layout level and the first layout level. Other layout levels are within the scope of the present disclosure.

Other configurations, arrangements on other layout levels or quantities of patterns in at least set of via patterns 912 are within the scope of the present disclosure.

Other configurations of layout 900C are within the scope of the present disclosure.

FIG. 9D is a diagram of a layout 900D of an integrated circuit 900E, in accordance with some embodiments.

Layout 900D is an embodiment of a layout of the second circuit of method 100-200 of FIGS. 1-2. In some embodiments, layout 900D is generated based on the schematic of integrated circuit 900E. In some embodiments, layout 900E is stored in standard cell library 1920 in FIG. 19.

Layout 900D is an embodiment of the first layout after being placed in the first region of the layout design of operation 110 of method 100. Layout 900D corresponds to the layout of the second circuit of method 100 of FIG. 1 after operation 114, and similar detailed description is therefore omitted. Layout 900D corresponds to the layout of integrated circuit 900E, and similar detailed description is therefore omitted.

In some embodiments, layout 900D is usable to manufacture an integrated circuit such as integrated circuit 900E of FIG. 9E or IC device 2060 of FIG. 20.

Layout 900D includes one or more features of the OD level or the active level, the POLY level, the MD level, the M0 level, the VG level, the VD level, a via-0 (V0) level or a metal 1 (M1) level. Features from other levels are not shown for ease of illustration.

Layout 900D is a variation of layout 900C, and similar detailed description is therefore omitted. In comparison with layout 900C, layout 900D further includes a set of conductive feature patterns 930 and a set of via patterns 932, and similar detailed description is therefore omitted.

In some embodiments, conductive feature pattern 930a corresponds to the third conductive feature pattern of method 200, via pattern 932a corresponds to the first via pattern of method 200, via pattern 932b corresponds to the second via pattern of method 200, and similar detailed description is therefore omitted.

Layout 900D includes the features of layout 900C. Layout 900D further includes one or more conductive feature patterns 930a (collectively referred to as a "set of conductive feature patterns 930") extending in the second direction Y.

The set of conductive feature patterns 930 is usable to manufacture a corresponding set of conductors of integrated circuit 900B, 900E, 1000A, 1000D, 1100A, 1100D, 1200A, 1200D, 1500A or 1500D. Conductive feature pattern 930a is usable to manufacture corresponding conductor 960 of integrated circuit 900E.

In some embodiments, the set of conductive feature patterns 930 overlap the set of conductive feature patterns 920. In some embodiments, the set of conductive feature patterns 930 are located on the second layout level. In some embodiments, the second layout level is different from the first layout level, the fifth layout level, the third layout level and the fourth layout level. In some embodiments, the second layout level corresponds to the M1 level. In some embodiments, the M1 level is above the M0 level, the OD level, the MD level and the POLY level.

Conductive feature pattern 930*a* is positioned into routing track T2 in operation 110 of method 100 or operation 210 of method 200. In some embodiments, conductive feature pattern 930*a* can be positioned in routing tracks T1, T3, T4 or T5 by operation 110 of method 100 or operation 210 of method 200. In some embodiments, conductive feature pattern 930*a* is positioned into routing track T2 based on the candidate routing track selection criteria discussed in at least FIG. 8.

Other configurations, arrangements on other layout levels or quantities of patterns in the set of conductive feature patterns 930 are within the scope of the present disclosure.

Layout 900D further includes one or more via patterns of set of via patterns 932*a* or 932*b* (collectively referred to as a "set of via patterns 932").

The set of via patterns 932 is usable to manufacture a corresponding set of vias of integrated circuit 900B, 900E, 1000A, 1000D, 1100A, 1100D, 1200A, 1200D, 1500A or 1500D. Via patterns 932*a*, 932*b* are usable to manufacture corresponding vias 932*a*', 932*b*' of integrated circuit 900E.

The set of via patterns 932 is positioned at a via over M0 (V0) level. In some embodiments, the V0 level is above the OD level, the MD level, the POLY level and the M0 level. In some embodiments, the V0 level is below the M1 level. In some embodiments, the V0 level is between the first layout level and the second layout level. Other layout levels are within the scope of the present disclosure.

Conductive feature pattern 930*a*, via pattern 932*a* and via pattern 932*b* connect conductive feature pattern 920*a* and conductive feature pattern 920*e* together.

Other configurations, arrangements on other layout levels or quantities of patterns in at least set of via patterns that is on the V0 level are within the scope of the present disclosure.

In some embodiments, layout 900D achieves one or more of the benefits discussed within the present disclosure.

Other configurations of layout 900D are within the scope of the present disclosure.

FIG. 9E is a circuit diagram of integrated circuit 900E, in accordance with some embodiments.

Integrated circuit 900E is an AND gate. In some embodiments, integrated circuit 900E is configured to function as integrated circuit 900A.

Integrated circuit 900E is an embodiment of the second circuit of method 100-200 of FIGS. 1-2.

Integrated circuit 900E includes PMOS transistors P1, P2 and P3, NMOS transistors N1, N2 and N3, pins JP1-JP2, group G1, pin label MJ1 and a conductor 960.

Integrated circuit 900E is a variation of integrated circuit 900B of FIG. 9B, and similar detailed description is therefore omitted. In comparison with integrated circuit 900B of FIG. 9B, the drain of NMOS transistor N1 in FIG. 9E is connected to the drain terminal of PMOS transistor P1, the drain terminal of PMOS transistor P2, the gate terminal of PMOS transistor P3 and the gate terminal of NMOS transistor N3 by conductor 960.

Integrated circuit 900E corresponds to the second circuit of method 100 of FIG. 1 after operation 114, and similar detailed description is therefore omitted.

In some embodiments, integrated circuit 900E achieves one or more of the benefits discussed within the present disclosure.

FIG. 9F is a diagram of a Verilog netlist 900F of integrated circuit 900B, in accordance with some embodiments.

Verilog netlist 900F is a netlist of integrated circuit 900B. In some embodiments, the Verilog netlist 900F corresponds to the netlist of the first circuit that is generated by method 100 after operation 102, and similar detailed description is therefore omitted. In some embodiments, the Verilog netlist 900F is useable by method 100 to generate the schematic of integrated circuit 900B.

FIG. 9G is a cross-sectional view of integrated circuit 900G, in accordance with some embodiments. FIG. 9G is a cross-sectional view of an integrated circuit 900G corresponding to layout 900D as intersected by plane A-A', in accordance with some embodiments.

Integrated circuit 900G includes each of the features of layout 900D, but some features are not shown for ease of illustration.

Conductor 960 connects conductor 920*a*' and conductor 920*e*'. For example, conductor 960 is connected to conductor 920*a*' by via 932*a*', and conductor 960 is connected to conductor 920*e*' by via 932*b*'.

Other configurations of integrated circuit 900G are within the scope of the present disclosure.

FIG. 10A is a circuit diagram of an integrated circuit 1000A, in accordance with some embodiments. FIG. 10B is a diagram of a layout 1000B of integrated circuit 1000A, in accordance with some embodiments. FIG. 10C is a diagram of a layout 1000C of an integrated circuit 1000D, in accordance with some embodiments. FIG. 10D is a circuit diagram of integrated circuit 1000D, in accordance with some embodiments. FIG. 10E is a diagram of a Verilog netlist 1000E of integrated circuit 1000A, in accordance with some embodiments.

FIG. 10A is a circuit diagram of an integrated circuit 1000A, in accordance with some embodiments.

Integrated circuit 1000A is a non-functional representation of the AND gate of FIG. 9A. Integrated circuit 1000A is an embodiment of the first circuit of method 100-200 of FIGS. 1-2. In some embodiments, integrated circuit 1000A is generated by Verilog netlist 1000E of FIG. 10E.

Integrated circuit 1000A includes PMOS transistors P1, P2 and P3, NMOS transistors N1, N2 and N3, pins JP1-JP2, group G2 and pin labels MJ1 and MJ2.

Integrated circuit 1000A is a variation of integrated circuit 900A of FIG. 9A, and similar detailed description is therefore omitted. In comparison with integrated circuit 900A of FIG. 9A, the drain of NMOS transistor N1 in FIG. 10A is not connected to the drain terminal of PMOS transistor P1, the drain terminal of PMOS transistor P2, the gate terminal of PMOS transistor P3 and the gate terminal of NMOS transistor N3.

Integrated circuit 1000A corresponds to the first circuit of method 100 of FIG. 1 after operation 104, and similar detailed description is therefore omitted. Integrated circuit 1000A corresponds to the first circuit of method 600 of FIG. 6 after operation 606, and similar detailed description is therefore omitted.

Pin JP1 corresponds to the first pin of methods 100-200 and 600, and is the pin or node of the drain terminal of PMOS transistor P1, the drain terminal of PMOS transistor P2, the gate terminal of PMOS transistor P3 and the gate terminal of NMOS transistor N3.

Pin JP2 corresponds to the second pin of methods 100-200 and 600, and is the pin or node of drain of NMOS transistor N1.

Pin label MJ1 corresponds to the first label of method 600, pin label MJ2 corresponds to the second label of method 600, and similar detailed description is therefore omitted.

Group G2 corresponds to the first group of pins of methods 100 and 600, and similar detailed description is therefore omitted.

During execution of method 600, in operation 602, pin JP1 is designated or labelled with a first pin label (e.g., pin label MJ1) as the first to be connected pin, and pin JP2 is designated or labelled with a second pin label (e.g., pin label MJ2). Afterwards, in operation 604 of method 600, the first to be connected pin and the second to be connected pin are designed as a first set of to be connected pins. Afterwards, in operation 606, the first set of to be connected pins is designated as the first group of pins (e.g., group G2) that are to be connected together.

FIG. 10B is a diagram of a layout 1000B of integrated circuit 1000A, in accordance with some embodiments.

Layout 1000B is an embodiment of the first layout of method 100-200 of FIGS. 1-2. In some embodiments, layout 1000B is generated based on the schematic of integrated circuit 1000A or the Verilog netlist 1000E of FIG. 10E. In some embodiments, layout 1000B is stored in standard cell library 1920 in FIG. 19.

Layout 1000B corresponds to the first layout of method 100 of FIG. 1 after at least one of operation 106 or 108, and similar detailed description is therefore omitted.

In some embodiments, layout 1000B is usable to manufacture an integrated circuit such as integrated circuit 1000A or integrated circuit 900G of FIG. 9G or IC device 2060 of FIG. 20.

Layout 1000B is a variation of layout 900C, and similar detailed description is therefore omitted. In comparison with layout 900C of FIG. 9C, conductive feature pattern 920a is labelled with pin label MJ1, and conductive feature pattern 920e is labelled with pin label MJ2, and similar detailed description is therefore omitted.

Layout 1000B further includes a region 1002. Region 1002 correspond to the region of layout 900C or layout 1000B that includes routing tracks T1-T3.

Other configurations of layout 1000B are within the scope of the present disclosure.

FIG. 10C is a diagram of a layout 1000C of integrated circuit 1000D, in accordance with some embodiments.

Layout 1000C is an embodiment of a layout of the second circuit of method 100-200 of FIGS. 1-2. In some embodiments, layout 1000C is generated based on the schematic of integrated circuit 1000D. In some embodiments, layout 1000C is stored in standard cell library 1920 in FIG. 19.

Layout 1000C is an embodiment of the first layout after being placed in the first region of the layout design of operation 110 of method 100. Layout 1000C corresponds to the layout of the second circuit of method 100 of FIG. 1 after operation 114, and similar detailed description is therefore omitted. Layout 1000C corresponds to the layout of integrated circuit 1000D, and similar detailed description is therefore omitted.

In some embodiments, layout 1000C is usable to manufacture an integrated circuit such as integrated circuit 1000D or integrated circuit 900G of FIG. 9G or IC device 2060 of FIG. 20.

Layout 1000C is a variation of layout 900D, and similar detailed description is therefore omitted. In comparison with layout 900D of FIG. 9D, conductive feature pattern 920a is labelled with pin label MJ1, and conductive feature pattern 920e is labelled with pin label MJ2, and similar detailed description is therefore omitted.

In some embodiments, layout 1000C achieves one or more of the benefits discussed within the present disclosure.

Other configurations of layout 1000C are within the scope of the present disclosure.

FIG. 10D is a circuit diagram of integrated circuit 1000D, in accordance with some embodiments.

Integrated circuit 1000D is an AND gate. In some embodiments, integrated circuit 1000D is configured to function as integrated circuit 900A.

Integrated circuit 1000D is an embodiment of the second circuit of method 100-200 of FIGS. 1-2.

Integrated circuit 1000D includes PMOS transistors P1, P2 and P3, NMOS transistors N1, N2 and N3, pins JP1-JP2, group G2, pin labels MJ1 and MJ2, and conductor 960.

Integrated circuit 1000D is a variation of integrated circuit 1000A of FIG. 10A, and similar detailed description is therefore omitted. In comparison with integrated circuit 1000A of FIG. 10A, the drain of NMOS transistor N1 in FIG. 10D is connected to the drain terminal of PMOS transistor P1, the drain terminal of PMOS transistor P2, the gate terminal of PMOS transistor P3 and the gate terminal of NMOS transistor N3 by conductor 960.

Integrated circuit 1000D corresponds to the second circuit of method 100 of FIG. 1 after operation 114, and similar detailed description is therefore omitted.

In some embodiments, integrated circuit 1000D achieves one or more of the benefits discussed within the present disclosure.

FIG. 10E is a diagram of a Verilog netlist 1000E of integrated circuit 1000A, in accordance with some embodiments.

Verilog netlist 1000E is a netlist of integrated circuit 1000A. In some embodiments, the Verilog netlist 1000E corresponds to the netlist of the first circuit that is generated by method 100 after operation 102, and similar detailed description is therefore omitted. In some embodiments, the Verilog netlist 1000E is useable by method 100 to generate the schematic of integrated circuit 1000A.

FIG. 11A is a circuit diagram of an integrated circuit 1100A, in accordance with some embodiments. FIG. 11B is a diagram of a layout 1100B of integrated circuit 1100A, in accordance with some embodiments. FIG. 11C is a diagram of a layout 1100C of an integrated circuit 1100D, in accordance with some embodiments. FIG. 11D is a circuit diagram of integrated circuit 1100D, in accordance with some embodiments.

FIG. 11A is a circuit diagram of an integrated circuit 1100A, in accordance with some embodiments.

Integrated circuit 1100A is a non-functional representation of the AND gate of FIG. 9A. Integrated circuit 1100A is an embodiment of the first circuit of method 100-200 of FIGS. 1-2. In some embodiments, integrated circuit 1100A is generated by a Verilog netlist (not shown).

Integrated circuit 1100A includes PMOS transistors P1, P2 and P3, NMOS transistors N1, N2 and N3, pins JP3-JP4, group G3 and pin label MJ3.

Integrated circuit 1100A is a variation of integrated circuit 900A of FIG. 9A, and similar detailed description is therefore omitted. In comparison with integrated circuit 900A of FIG. 9A, the drain terminal of PMOS transistor P1, the drain terminal of PMOS transistor P2 and the gate terminal of PMOS transistor P3 in FIG. 11A are not connected to the drain terminal of NMOS transistor N1 and the gate terminal of NMOS transistor N3.

Integrated circuit 1100A corresponds to the first circuit of method 100 of FIG. 1 after operation 104, and similar detailed description is therefore omitted. Integrated circuit 1100A corresponds to the first circuit of method 500 of FIG. 5 after operation 504, and similar detailed description is therefore omitted.

Pin JP3 corresponds to the first pin of methods 100-200 and 500, and is the pin or node of the drain terminal of PMOS transistor P1, the drain terminal of PMOS transistor P2 and the gate terminal of PMOS transistor P3.

Pin JP4 corresponds to the second pin of methods 100-200 and 500, and is the pin or node of the drain terminal of NMOS transistor N1 and the gate terminal of NMOS transistor N3.

Pin label MJ3 corresponds to the common label of method 500, and similar detailed description is therefore omitted.

Group G3 corresponds to the first group of pins of methods 100 and 500, and similar detailed description is therefore omitted.

During execution of method 500, in operation 502, pins JP3 and JP4 are designated or labelled with a common label (e.g., pin label MJ3) and as the first set of to be connected pins. Afterwards, in operation 504, the first set of to be connected pins is designated as the first group of pins (e.g., group G3) that are to be connected together.

FIG. 11B is a diagram of a layout 1100B of integrated circuit 1100A, in accordance with some embodiments.

Layout 1100B is an embodiment of the first layout of method 100-200 of FIGS. 1-2. In some embodiments, layout 1100B is generated based on the schematic of integrated circuit 1100A or a Verilog netlist (not shown). In some embodiments, layout 1100B is stored in standard cell library 1920 in FIG. 19.

Layout 1100B corresponds to the first layout of method 100 of FIG. 1 after at least one of operation 106 or 108, and similar detailed description is therefore omitted.

In some embodiments, layout 1100B is usable to manufacture an integrated circuit such as integrated circuit 1100A or integrated circuit 900G of FIG. 9G or IC device 2060 of FIG. 20.

Layout 1100B is a variation of layout 900C, and similar detailed description is therefore omitted. In comparison with layout 900C of FIG. 9C, conductive feature pattern 920a and conductive feature pattern 920e are labelled with pin label MJ3, and similar detailed description is therefore omitted.

In comparison with layout 900C of FIG. 9C, layout 1100B further includes a cut feature pattern 1130. Cut feature pattern 1130 extends in the first direction X. Cut feature pattern 1130 overlaps gate patterns 904c and 904d. In some embodiments, cut feature pattern 1130 overlaps gate patterns 904c and 904d in a middle portion of layout design 1100B.

Gate pattern 904c is divided into gate patterns 1104c1 and 1104c2.

Gate pattern 904d is divided into gate patterns 1104d1 and 1104d2.

In some embodiments, cut feature pattern 1130 is usable to identify a corresponding location of a removed portion of a corresponding gate structure that is removed during a POLY cut process.

In some embodiments, cut feature pattern 1130 is usable to identify a corresponding location of a removed portion of a corresponding gate structure.

In some embodiments, cut feature pattern 1130 is located on the fourth layout level or the POLY level. Other configurations or quantities of patterns in the cut feature pattern 1130 are within the scope of the present disclosure.

Other configurations of layout 1100B are within the scope of the present disclosure.

FIG. 11C is a diagram of a layout 1100C of integrated circuit 1100D, in accordance with some embodiments.

Layout 1100C is an embodiment of a layout of the second circuit of method 100-200 of FIGS. 1-2. In some embodiments, layout 1100C is generated based on the schematic of integrated circuit 1100D. In some embodiments, layout 1100C is stored in standard cell library 1920 in FIG. 19.

Layout 1100C is an embodiment of the first layout after being placed in the first region of the layout design of operation 110 of method 100. Layout 1100C corresponds to the layout of the second circuit of method 100 of FIG. 1 after operation 114, and similar detailed description is therefore omitted. Integrated circuit 1100C corresponds to the layout of integrated circuit 1100D, and similar detailed description is therefore omitted.

In some embodiments, layout 1100C is usable to manufacture an integrated circuit such as integrated circuit 1100D or integrated circuit 900G of FIG. 9G or IC device 2060 of FIG. 20.

Layout 1100C is a variation of layout 900D, and similar detailed description is therefore omitted. In comparison with layout 900D of FIG. 9D, conductive feature pattern 920a and conductive feature pattern 920e are labelled with pin label MJ3, and similar detailed description is therefore omitted.

In comparison with layout 900D of FIG. 9D, layout 1100C further includes the cut feature pattern 1130 discussed in FIG. 9C, and similar detailed description is therefore omitted.

In some embodiments, layout 1100C achieves one or more of the benefits discussed within the present disclosure.

Other configurations of layout 1100C are within the scope of the present disclosure.

FIG. 11D is a circuit diagram of integrated circuit 1100D, in accordance with some embodiments.

Integrated circuit 1100D is an AND gate. In some embodiments, integrated circuit 1100D is configured to function as integrated circuit 900A.

Integrated circuit 1100D is an embodiment of the second circuit of method 100-200 of FIGS. 1-2.

Integrated circuit 1100D includes PMOS transistors P1, P2 and P3, NMOS transistors N1, N2 and N3, pins JP3-JP4, group G3, pin label MJ3, and a conductor 1160.

In some embodiments, conductor 1160 is similar to conductor 960, and similar detailed description is therefore omitted.

Integrated circuit 1100D is a variation of integrated circuit 1100A of FIG. 11A, and similar detailed description is therefore omitted. In comparison with integrated circuit 1100A of FIG. 11A, the drain terminal of PMOS transistor P1, the drain terminal of PMOS transistor P2 and the gate terminal of PMOS transistor P3 in FIG. 11A are connected to the drain terminal of NMOS transistor N1 and the gate terminal of NMOS transistor N3 by conductor 1160.

Integrated circuit 1100D corresponds to the second circuit of method 100 of FIG. 1 after operation 114, and similar detailed description is therefore omitted.

In some embodiments, integrated circuit 1100D achieves one or more of the benefits discussed within the present disclosure.

FIG. 12A is a circuit diagram of an integrated circuit 1200A, in accordance with some embodiments. FIG. 12B is a diagram of a layout 1200B of integrated circuit 1200A, in accordance with some embodiments. FIG. 12C is a diagram of a layout 1200C of integrated circuit 1200D, in accordance with some embodiments. FIG. 12D is a circuit diagram of integrated circuit 1200D, in accordance with some embodiments.

FIG. 12A is a circuit diagram of an integrated circuit 1200A, in accordance with some embodiments.

Integrated circuit 1200A is a non-functional representation of the AND gate of FIG. 9A. Integrated circuit 1200A is an embodiment of the first circuit of method 100-200 of FIGS. 1-2. In some embodiments, integrated circuit 1200A is generated by a Verilog netlist (not shown).

Integrated circuit 1200A includes PMOS transistors P1, P2 and P3, NMOS transistors N1, N2 and N3, pins JP5-JP7, group G4 and pin label MJ4.

Integrated circuit 1200A is a variation of integrated circuit 900A of FIG. 9A, and similar detailed description is therefore omitted. In comparison with integrated circuit 900A of FIG. 9A, the drain terminal of PMOS transistor P1 and the drain terminal of PMOS transistor P2, the gate terminal of PMOS transistor P3 and the gate terminal of NMOS transistor N3, and the drain terminal of NMOS transistor N1 are not connected in FIG. 12A.

Integrated circuit 1200A corresponds to the first circuit of method 100 of FIG. 1 after operation 104, and similar detailed description is therefore omitted. Integrated circuit 1200A corresponds to the first circuit of method 500 of FIG. 5 after operation 504, and similar detailed description is therefore omitted.

Pin JP5 corresponds to the first pin of methods 100-200 and 500, and is the pin or node of the drain terminal of PMOS transistor P1 and the drain terminal of PMOS transistor P2.

Pin JP6 corresponds to the second pin of methods 100-200 and 500, and is the pin or node of the drain terminal of NMOS transistor N1.

Pin JP7 corresponds to a third pin of methods 100-200 and 500, and is the pin or node of the gate terminal of PMOS transistor P3 and the gate terminal of NMOS transistor N3.

Pin label MJ4 corresponds to the common label of method 500, and similar detailed description is therefore omitted.

Group G4 corresponds to the first group of pins of methods 100 and 500, and similar detailed description is therefore omitted.

During execution of method 500, in operation 502, pins JP5, JP6 and JP7 are designated or labelled with a common label (e.g., pin label MJ4) and as the first set of to be connected pins. Afterwards, in operation 504, the first set of to be connected pins is designated as the first group of pins (e.g., group G4) that are to be connected together.

FIG. 12B is a diagram of a layout 1200B of integrated circuit 1200A, in accordance with some embodiments.

Layout 1200B is an embodiment of the first layout of method 100-200 of FIGS. 1-2. In some embodiments, layout 1200B is generated based on the schematic of integrated circuit 1200A or a Verilog netlist (not shown). In some embodiments, layout 1200B is stored in standard cell library 1920 in FIG. 19.

Layout 1200B corresponds to the first layout of method 100 of FIG. 1 after at least one of operation 106 or 108, and similar detailed description is therefore omitted.

In some embodiments, layout 1200B is usable to manufacture an integrated circuit such as integrated circuit 1200A or IC device 2060 of FIG. 20.

Layout 1200B is a double height cell. Layout 1200B is a variation of layout 900C, and similar detailed description is therefore omitted. In comparison with layout 900C of FIG. 9C, layout 1200B includes region 1002, and similar detailed description is therefore omitted.

In comparison with layout 900C of FIG. 9C, conductive feature pattern 920a and conductive feature pattern 920e are labelled with pin label MJ4, and similar detailed description is therefore omitted.

In comparison with layout 900C of FIG. 9C, layout 1200B further includes active region patterns 1202a and 1202b. In some embodiments, active region patterns 1202a and 1202b are similar to active region patterns 902a and 902b, and similar detailed description is therefore omitted.

In comparison with layout 900C of FIG. 9C, layout 1200B further includes conductive feature patterns 1220a, 1220b, 1220c, 1220d or 1220e. In some embodiments, conductive feature patterns 1220a, 1220b, 1220c, 1220d or 1220e are similar to corresponding conductive feature patterns 920a, 920b, 920c, 920d or 920e, and similar detailed description is therefore omitted.

In some embodiments, conductive feature pattern 920a corresponds to pin JP5 in FIGS. 12B-12C, conductive feature pattern 920e corresponds to pin JP6 in FIGS. 12B-12C, and conductive feature pattern 1220a corresponds to pin JP7 in FIGS. 12B-12C, and similar detailed description is therefore omitted.

In comparison with layout 900C of FIG. 9C, layout 1200B further includes via pattern 1210c. In some embodiments, via pattern 1210c is similar to one or more of via patterns 910a, 910b or 910c, and similar detailed description is therefore omitted.

In comparison with layout 900C of FIG. 9C, layout 1200B further includes via patterns 1212c and 1212d. In some embodiments, via patterns 1212c and 1212d are similar to one or more of via patterns 912a, 912b, 912c or 912d, and similar detailed description is therefore omitted.

In comparison with layout 900C of FIG. 9C, contact pattern 1206a replaces contact pattern 906a, and contact pattern 1206c replaces contact pattern 906c, and similar detailed description is therefore omitted.

In comparison with layout 900C of FIG. 9C, layout 1200B further includes contact patterns 1206b and 1206d. In some embodiments, contact patterns 1206b and 1206d are similar to corresponding contact patterns 906a, 906b, . . . , 906h, and similar detailed description is therefore omitted.

In comparison with layout 900C of FIG. 9C, layout 1200B includes routing tracks T1-T3, and similar detailed description is therefore omitted.

Other configurations of layout 1200B are within the scope of the present disclosure.

FIG. 12C is a diagram of a layout 1200C of integrated circuit 1200D, in accordance with some embodiments.

Layout 1200C is an embodiment of a layout of the second circuit of method 100-200 of FIGS. 1-2. In some embodiments, layout 1200C is generated based on the schematic of integrated circuit 1200D. In some embodiments, layout 1200C is stored in standard cell library 1920 in FIG. 19.

Layout 1200C is an embodiment of the first layout after being placed in the first region of the layout design of operation 110 of method 100. Layout 1200C corresponds to the layout of the second circuit of method 100 of FIG. 1 after operation 114, and similar detailed description is therefore omitted. Layout 1200C corresponds to the layout of integrated circuit 1200D, and similar detailed description is therefore omitted.

In some embodiments, layout 1200C is usable to manufacture an integrated circuit such as integrated circuit 1200D or integrated circuit 900G of FIG. 9G or IC device 2060 of FIG. 20.

Layout 1200C is a variation of layout 1200B, and similar detailed description is therefore omitted. In comparison with layout 1200B of FIG. 12B, conductive feature pattern 1230a replaces conductive feature pattern 930a, and similar detailed description is therefore omitted.

In comparison with layout 1200B of FIG. 12B, layout 1200C further includes via pattern 1232c, and similar detailed description is therefore omitted. In some embodiments, via pattern 1232c is similar to via pattern 932a or 932b, and similar detailed description is therefore omitted.

In some embodiments, via pattern 932a corresponds to the first via pattern of method 200, via pattern 932b corresponds to the second via pattern of method 200, via pattern 1232c corresponds to the third via pattern of method 200, and similar detailed description is therefore omitted.

Conductive feature pattern 1230a, via pattern 932a, via pattern 932b and via pattern 1232c connect conductive feature pattern 920a, conductive feature pattern 920e and conductive feature pattern 1220a together.

In some embodiments, layout 1200C achieves one or more of the benefits discussed within the present disclosure.

Other configurations of layout 1200C are within the scope of the present disclosure.

FIG. 12D is a circuit diagram of integrated circuit 1200D, in accordance with some embodiments.

Integrated circuit 1200D is an AND gate. In some embodiments, integrated circuit 1200D is configured to function as integrated circuit 900A.

Integrated circuit 1200D is an embodiment of the second circuit of method 100-200 of FIGS. 1-2.

Integrated circuit 1200D includes PMOS transistors P1, P2 and P3, NMOS transistors N1, N2 and N3, pins JP5-JP7, group G4, pin label MJ4, and a conductor 1260.

In some embodiments, conductor 1260 is similar to conductor 960, and similar detailed description is therefore omitted.

Integrated circuit 1200D is a variation of integrated circuit 1200A of FIG. 12A, and similar detailed description is therefore omitted. In comparison with integrated circuit 1200A of FIG. 12A, the drain terminal of PMOS transistor P1 and the drain terminal of PMOS transistor P2, the gate terminal of PMOS transistor P3 and the gate terminal of NMOS transistor N3, and the drain terminal of NMOS transistor N1 are connected together by conductor 1260.

Integrated circuit 1200D corresponds to the second circuit of method 100 of FIG. 1 after operation 114, and similar detailed description is therefore omitted.

In some embodiments, integrated circuit 1200D achieves one or more of the benefits discussed within the present disclosure.

FIG. 13A is a circuit diagram of an integrated circuit 1300A, in accordance with some embodiments.

Integrated circuit 1300A is a buffer circuit. Integrated circuit 1300A includes a set of regions 1302. The set of regions 1302 includes regions 1302a, 1302b and 1302c. Each region 1302a, 1302b or 1302c of the set of regions 1302 is a buffer circuit. Each region 1302a, 1302b or 1302c of the set of regions 1302 includes two stages of inverters (e.g., a first inverter stage and a second inverter stage). An internal pin (e.g., internal) is between the first inverter stage and the second inverter stage.

An input of regions 1302a, 1302b and 1302c is coupled together by an input pin IN.

An output of regions 1302a, 1302b and 1302c is coupled together by an output pin Z.

An input of each inverter of the first inverters stage is coupled together by an input pin IN.

In some embodiments, as shown in FIGS. 13A-13B, at least one or more of the features of methods 100-200 can be applied to the input pins (e.g., IN), the output pins (e.g., Z) and internal pins (e.g., Internal) of integrated circuit 1300B, and similar detailed description is therefore omitted. For example, two or more internal pins (e.g., Internal) of integrated circuit 1300B can be disconnected in method 100, and can then by reconnected by method after operation 114, and similar detailed description is therefore omitted. In yet another example, two or more input pins (e.g., IN) of integrated circuit 1300B can be disconnected in method 100, and can then by reconnected by method after operation 114, and similar detailed description is therefore omitted. In yet another example, two or more output pins (e.g., Z) of integrated circuit 1300B can be disconnected in method 100, and can then by reconnected by method after operation 114, and similar detailed description is therefore omitted.

Other configurations of integrated circuit 1300A are within the scope of the present disclosure.

In some embodiments, integrated circuit 1300A achieves one or more of the benefits discussed within the present disclosure.

FIG. 13B is a diagram of a layout 1300B of integrated circuit 1300A, in accordance with some embodiments.

Layout 1300B is an embodiment of the first layout of method 100-200 of FIGS. 1-2. In some embodiments, layout 1300B is generated based on the schematic of integrated circuit 1300A or a Verilog netlist (not shown). In some embodiments, layout 1300B is stored in standard cell library 1920 in FIG. 19.

Layout 1300B corresponds to the first layout of method 100 of FIG. 1 after at least one of operation 106 or 108, and similar detailed description is therefore omitted.

In some embodiments, layout 1300B is usable to manufacture an integrated circuit such as integrated circuit 1300A or IC device 2060 of FIG. 20.

Layout 1300B is a triple height cell. Other cell heights are within the scope of the present disclosure. Layout 1300B includes rows (e.g., row 1, row 2, and row 3) of cells 1310a, 1310b, 1310c. Cell 1310a corresponds to region 1302a, cell 1310b corresponds to region 1302b, and cell 1310c corresponds to region 1302c.

Each cell of cells 1310a, 1310b, 1310c is a variation of layout 900C, and similar detailed description is therefore omitted. In comparison with layout 900C of FIG. 9C, layout 1500B does not show other elements from layout 900C for ease of illustration, but layout 1500B still includes the other elements that are not shown in FIG. 15B.

Cell 1310a includes conductive feature patterns 1320a, 1320b, 1322a and 1324a. In some embodiments, conductive feature patterns 1320a, 1320b, 1322a and 1324a are similar to corresponding conductive feature patterns 920a, 920b, 920c, 920d or 920e, and similar detailed description is therefore omitted.

Cell 1310b includes conductive feature patterns 1330a, 1330b, 1332a and 1334a. In some embodiments, conductive feature patterns 1330a, 1330b, 1332a and 1334a are similar to corresponding conductive feature patterns 920a, 920b, 920c, 920d or 920e, and similar detailed description is therefore omitted.

Cell 1310c includes conductive feature patterns 1340a, 1340b, 1342a and 1344a. In some embodiments, conductive feature patterns 1340a, 1340b, 1342a and 1344a are similar to corresponding conductive feature patterns 920a, 920b, 920c, 920d or 920e, and similar detailed description is therefore omitted.

Conductive feature patterns 1320a, 1320b, 1330a, 1330b, 1340a and 1340b correspond to internal pins (e.g., Internal) of integrated circuit 1300B. Conductive feature patterns 1322a, 1332a, and 1342b correspond to the input pins (e.g., IN) of integrated circuit 1300B. Conductive feature patterns 1324a, 1334a, and 1344b correspond to the output pins (e.g., Z) of integrated circuit 1300B.

In some embodiments, layout 1300B achieves one or more of the benefits discussed within the present disclosure.

Other configurations of layout 1300B are within the scope of the present disclosure.

FIG. 14A is a circuit diagram of an integrated circuit 1400A, in accordance with some embodiments.

Integrated circuit 1400A is a multi-bit flip-flop circuit. Integrated circuit 1400A includes a set of flip-flops 1402. The set of flip-flops 1402 includes flip-flop 1402a, 1402b, 1402c and 1402d. Each flip-flop 1402a, 1402b, 1402c and 1402d of the set of flip-flops 1402 corresponds to a single bit. Other numbers of flip-flips in the set of flip-flops 1402 are within the scope of the present disclosure.

Each flip-flop 1402a, 1402b, 1402c and 1402d of the set of flip-flops 1402 includes a set of clock pins 1404 (e.g., clkb). In some embodiments, the set of clock pins 1404 (e.g., clkb) are coupled together.

In some embodiments, as shown in FIGS. 14A-14B, at least one or more of the features of methods 100-200 can be applied to the set of clock pins for 1404 (e.g., clkb) of integrated circuit 1400B, and similar detailed description is therefore omitted. For example, two or more clock pins of the set of clock pins for 1404 (e.g., clkb) of integrated circuit 1400B can be disconnected in method 100, and can then by reconnected by method after operation 114, and similar detailed description is therefore omitted.

Other configurations of integrated circuit 1400A are within the scope of the present disclosure.

In some embodiments, integrated circuit 1400A achieves one or more of the benefits discussed within the present disclosure.

FIG. 14B is a diagram of a layout 1400B of integrated circuit 1400A, in accordance with some embodiments.

Layout 1400B is an embodiment of the first layout of method 100-200 of FIGS. 1-2. In some embodiments, layout 1400B is generated based on the schematic of integrated circuit 1400A or a Verilog netlist (not shown). In some embodiments, layout 1400B is stored in standard cell library 1920 in FIG. 19.

Layout 1400B corresponds to the first layout of method 100 of FIG. 1 after at least one of operation 106 or 108, and similar detailed description is therefore omitted.

In some embodiments, layout 1400B is usable to manufacture an integrated circuit such as integrated circuit 1400A or IC device 2060 of FIG. 20.

Layout 1400B corresponds to a layout of at least one flip-flop 1402a, 1402b, 1402c or 1402d of the set of flip-flops 1402.

Layout 1400B is a variation of layout 900C, and similar detailed description is therefore omitted. In comparison with layout 900C of FIG. 9C, Layout 1400B does not show other elements from layout 900C for ease of illustration, but layout 1400B still includes the other elements that are not shown in FIG. 14B.

Layout 1400B includes conductive feature patterns 1420a, 1420b, 1420c, 1420d and 1420e. In some embodiments, conductive feature patterns 1420a, 1420b, 1420c, 1420d and 1420e are similar to corresponding conductive feature patterns 920a, 920b, 920c, 920d or 920e, and similar detailed description is therefore omitted.

Pin JP8 corresponds to conductive feature patterns 1420a.
Pin JP9 corresponds to conductive feature patterns 1420b.
Pin JP10 corresponds to conductive feature patterns 1420c.
Pin JP11 corresponds to conductive feature patterns 1420d.
Pin JP12 corresponds to conductive feature patterns 1420e.

Conductive feature patterns 1420a, 1420b, 1420c, 1420d and 1420e correspond to the set of clock pins 1404 (e.g., clkb) of integrated circuit 1400B.

Layout 1400B further includes regions 1430a, 1430b, 1430c where conductive feature patterns in the M1 level can be placed in corresponding routing tracks T1-T3 in operation 110 of method 100.

In some embodiments, the set of clock pins 1404 (e.g., clkb) in integrated circuit 1400A and layout 1400B allow flexible placement, during the APR stage, of M1 conductive feature patterns that reduce coupling without having M1 conductive feature patterns that block the clock pins.

In some embodiments, layout 1400B achieves one or more of the benefits discussed within the present disclosure.

Other configurations of layout 1400B are within the scope of the present disclosure.

FIG. 15A is a circuit diagram of an integrated circuit 1500A, in accordance with some embodiments. FIG. 15B is a diagram of a layout 1500B of integrated circuit 1500A, in accordance with some embodiments. FIG. 15C is a diagram of a layout 1500C of an integrated circuit 1500D, in accordance with some embodiments. FIG. 15D is a circuit diagram of integrated circuit 1500D, in accordance with some embodiments.

FIG. 15A is a circuit diagram of an integrated circuit 1500A, in accordance with some embodiments.

Integrated circuit 1500A is a non-functional representation of the AND gate of FIG. 9A. Integrated circuit 1500A is an embodiment of the first circuit of method 100-200 of FIGS. 1-2. In some embodiments, integrated circuit 1500A is generated by a Verilog netlist (not shown).

Figure 16:
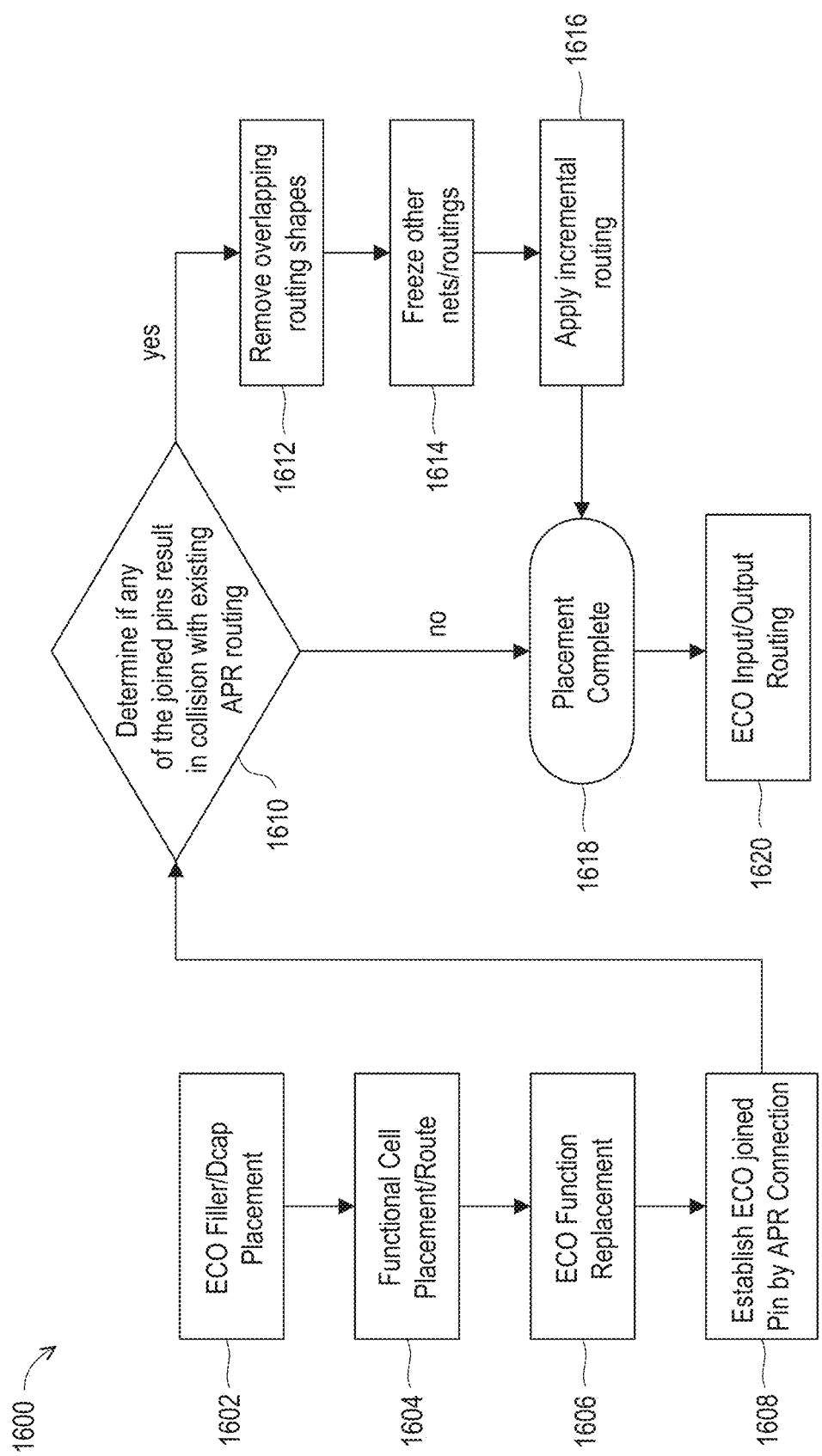
FIG. 16 is a flowchart of a method of placing and routing ECO cells into a layout, in accordance with some embodiments.

In some embodiments, integrated circuit 1500A is schematic representation of an engineering change order (ECO) cell that is placed in operation 1606 or 1608 of FIG. 16, and similar detailed description is therefore omitted. In some embodiments, at least one or more of the features of methods 100-200, 500 and 600 can be applied to FIGS. 15A-15D and method 1600, and similar detailed description is therefore omitted. For example, two or more pins in integrated circuit 1500A can be disconnected in method 100, and can then by reconnected by method after operation 114, and similar detailed description is therefore omitted.

Integrated circuit 1500A includes PMOS transistors P1, P2, P3 and P4, NMOS transistors N1, N2, N3, N4, N5 and N6, pins JP13-JP17, groups G5 and G6 and pin labels MJ5 and MJ6.

Integrated circuit 1500A is a variation of integrated circuit 900A of FIG. 9A, and similar detailed description is therefore omitted.

In comparison with integrated circuit 900A of FIG. 9A, integrated circuit further includes PMOS transistor P4 and NMOS transistors N4, N5 and N6.

In comparison with integrated circuit 900A of FIG. 9A, the drain terminal of PMOS transistor P1 and the drain terminal of PMOS transistor P2, and the gate terminal of PMOS transistor P3, the gate terminal of NMOS transistor N3, and the drain terminal of NMOS transistor N1 are not connected in FIG. 15A.

In comparison with integrated circuit 900A of FIG. 9A, the drain terminal of PMOS transistor P3 and the drain terminal of NMOS transistor N3, and the output node Z are not connected in FIG. 15A.

NMOS transistor N4 is configured as a capacitor C1, and therefore a source terminal of NMOS transistor N4 and a drain terminal of NMOS transistor N4 are coupled together.

A gate terminal of NMOS transistor N4 is coupled to the voltage supply VDD. Each of the source terminal of NMOS transistor N4, the drain terminal of NMOS transistor N4, the drain terminal of NMOS transistor N2 and the source terminal of NMOS transistor N1 are coupled to each other.

NMOS transistor N5 is configured as a capacitor C2, and therefore a source terminal of NMOS transistor N5 and a drain terminal of NMOS transistor N5 are coupled together.

A gate terminal of NMOS transistor N5 is coupled to the voltage supply VDD. Each of the source terminal of NMOS transistor N5, the drain terminal of NMOS transistor N5, the drain terminal of NMOS transistor N1, the gate terminal of PMOS transistor P3 and the gate terminal of NMOS transistor N3 are coupled together.

PMOS transistor P4 is configured as a capacitor C3, and therefore a source terminal of PMOS transistor P4 and a drain terminal of PMOS transistor P4 are coupled together.

NMOS transistor N6 is configured as a capacitor C4, and therefore a source terminal of NMOS transistor N6 and a drain terminal of NMOS transistor N6 are coupled together.

A gate terminal of PMOS transistor P4 is coupled to the voltage supply VDD. A gate terminal of NMOS transistor N5 is coupled to the voltage supply VDD.

Each of the source terminal of NMOS transistor N6, the drain terminal of NMOS transistor N6, the drain terminal of PMOS transistor P4, the source terminal of PMOS transistor P4 and the output node Z are coupled together.

In some embodiments, at least one of capacitor C1, C2, C3 or C4 is inserted by system 1900 of FIG. 19 during operation 1602 of method 1600 of FIG. 16, and similar detailed description is therefore omitted.

Integrated circuit 1500A corresponds to the first circuit of method 100 of FIG. 1 after operation 104, and similar detailed description is therefore omitted. Integrated circuit 1500A corresponds to the first circuit of method 500 of FIG. 5 after operation 504, and similar detailed description is therefore omitted.

In some embodiments, pin JP13 corresponds to the first pin of methods 100-200 and 500, and is the pin or node of the drain terminal of PMOS transistor P1 and the drain terminal of PMOS transistor P2.

In some embodiments, pin JP14 corresponds to the second pin of methods 100-200 and 500, and is the pin or node of the drain terminal of NMOS transistor N1.

In some embodiments, pin JP15 corresponds to the first pin of methods 100-200 and 500, and is the pin or node of the drain terminal of PMOS transistor P3.

In some embodiments, pin JP16 corresponds to the second pin of methods 100-200 and 500, and is the pin or node of the drain terminal of NMOS transistor N3.

In some embodiments, pin JP17 corresponds to a third pin of methods 100-200 and 500, and is the pin or node of the output node Z, the drain and source terminals of PMOS transistor P4 and the drain and source terminals of NMOS transistor N6.

In some embodiments, pin label MJ5 corresponds to the common label of method 500, and similar detailed description is therefore omitted.

In some embodiments, pin label MJ6 corresponds to the common label of method 500, and similar detailed description is therefore omitted.

In some embodiments, group G5 corresponds to the first group of pins of methods 100 and 500, and similar detailed description is therefore omitted.

In some embodiments, group G6 corresponds to the second group of pins of methods 100 and 500, and similar detailed description is therefore omitted.

During execution of method 500, in operation 502, pins JP13 and JP14 are designated or labelled with a common label (e.g., pin label MJ4) and as the first set of to be connected pins, and pins JP15, JP16 and JP17 are designated or labelled with a common label (e.g., pin label MJ5) and as the second set of to be connected pins. Afterwards, in operation 504, the first set of to be connected pins is designated as the first group of pins (e.g., group G5) that are to be connected together, and the second set of to be connected pins is designated as the second group of pins (e.g., group G6) that are to be connected together.

FIG. 15B is a diagram of a layout 1500B of integrated circuit 1500A, in accordance with some embodiments.

Layout 1500B is an embodiment of the first layout of method 100-200 of FIGS. 1-2. In some embodiments, layout 1500B is generated based on the schematic of integrated circuit 1500A or a Verilog netlist (not shown). In some embodiments, layout 1500B is stored in standard cell library 1920 in FIG. 19.

Layout 1500B corresponds to the first layout of method 100 of FIG. 1 after at least one of operation 106 or 108, and similar detailed description is therefore omitted.

In some embodiments, layout 1500B is a layout of the ECO cell that is placed in operation 1606 or 1608 of FIG. 16, and similar detailed description is therefore omitted.

In some embodiments, layout 1500B is usable to manufacture an integrated circuit such as integrated circuit 1500A or IC device 2060 of FIG. 20.

Layout 1500B is a variation of layout 900C, and similar detailed description is therefore omitted. In comparison with layout 900C of FIG. 9C, layout 1500B does not show other elements from layout 900C for ease of illustration, but layout 1500B still includes the other elements that are not shown in FIG. 15B.

In comparison with layout 900C of FIG. 9C, conductive feature patterns 1520a and 1520b replace conductive feature pattern 920a, conductive feature pattern 1520c replaces conductive feature pattern 920d, conductive feature pattern 1520d replaces conductive feature pattern 920e, and similar detailed description is therefore omitted.

Conductive feature patterns 1520a and 1520c are labelled with pin label MJ5, and conductive feature patterns 1520b and conductive feature pattern 1520d are labelled with pin label MJ6.

In some embodiments, conductive feature pattern 1520a corresponds to pin JP13 in FIGS. 15B-15C, conductive feature pattern 1520c corresponds to pin JP14 in FIGS. 15B-15C, conductive feature pattern 1520b corresponds to at least one of pin JP15 or JP17 in FIGS. 15B-15C, conductive feature pattern 1520d corresponds to at least one of pin JP16 or JP17 in FIGS. 15B-15C, and similar detailed description is therefore omitted.

In comparison with layout 900C of FIG. 9C, layout 1500B further includes via patterns 1512a, 1512b, 1512c, and 1512d. In some embodiments, via patterns 1512a, 1512b, 1512c and 1512d are similar to one or more of via patterns 912a, 912b, 912c or 912d, and similar detailed description is therefore omitted.

In comparison with layout 900C of FIG. 9C, layout 1500B includes two sets of routing tracks (e.g., T1a-T3a and T1b-T7b) instead of one set of routing tracks T1-T5, and similar detailed description is therefore omitted.

In some embodiments, each routing track of the set of routing tracks T1a-T3a defines regions where conductive feature pattern 1530a can be positioned in operation 110 of method 100.

In some embodiments, each routing track of the set of routing tracks T1b-T7b defines regions where conductive feature pattern 1530b can be positioned in operation 110 of method 100.

Other configurations of layout 1500B are within the scope of the present disclosure.

FIG. 15C is a diagram of a layout 1500C of integrated circuit 1500D, in accordance with some embodiments.

Layout 1500C is an embodiment of a layout of the second circuit of method 100-200 of FIGS. 1-2. In some embodiments, layout 1500C is generated based on the schematic of integrated circuit 1500D. In some embodiments, layout 1500C is stored in standard cell library 1920 in FIG. 19.

Layout 1500C is an embodiment of the first layout after being placed in the first region of the layout design of operation 110 of method 100. Layout 1500C corresponds to the layout of the second circuit of method 100 of FIG. 1 after operation 114, and similar detailed description is therefore omitted. Layout 1500C corresponds to the layout of integrated circuit 1500D, and similar detailed description is therefore omitted.

In some embodiments, layout 1500C is a layout of the ECO cell after operation 1618 of FIG. 16, and similar detailed description is therefore omitted.

In some embodiments, layout 1500C is usable to manufacture an integrated circuit such as integrated circuit 1500D or IC device 2060 of FIG. 20.

Layout 1500C is a variation of layout 1500B, and similar detailed description is therefore omitted. In comparison with layout 1500B of FIG. 15B, layout 1500C further includes conductive feature patterns 1530a and 1530b, and via patterns 1532a, 1532b, 1532c and 1532d, and similar detailed description is therefore omitted.

In some embodiments, conductive feature patterns 1530a and 1530b are similar to conductive feature pattern 930a, and similar detailed description is therefore omitted.

In some embodiments, via patterns 1532a, 1532b, 1532c and 1532d is similar to via pattern 932a or 932b, and similar detailed description is therefore omitted.

In some embodiments, via pattern 1532a corresponds to the first via pattern of method 200, and via pattern 1532b corresponds to the second via pattern of method 200, and similar detailed description is therefore omitted.

In some embodiments, via pattern 1532c corresponds to the first via pattern of method 200, and via pattern 1532d corresponds to the second via pattern of method 200, and similar detailed description is therefore omitted.

Conductive feature pattern 1530a, via pattern 1532a and via pattern 1532b connect conductive feature pattern 1520a and conductive feature pattern 1520c together.

Conductive feature pattern 1530b, via pattern 1532c and via pattern 1532d connect conductive feature pattern 1520b and conductive feature pattern 1520d together.

In some embodiments, layout 1500C achieves one or more of the benefits discussed within the present disclosure.

Other configurations of layout 1500C are within the scope of the present disclosure.

FIG. 15D is a circuit diagram of integrated circuit 1500D, in accordance with some embodiments.

Integrated circuit 1500D is an AND gate. In some embodiments, integrated circuit 1500D is configured to function as integrated circuit 900A.

Integrated circuit 1500D is an embodiment of the second circuit of method 100-200 of FIGS. 1-2.

In some embodiments, integrated circuit 1500D is schematic representation of the ECO cell after operation 1618 of FIG. 16, and similar detailed description is therefore omitted.

Integrated circuit 1500D includes PMOS transistors P1, P2, P3 and P4, NMOS transistors N1, N2, N3, N4, N5 and N6, pins JP13-JP17, groups G5 and G6 and pin labels MJ5 and MJ6, and conductors 1560 and 1260.

In some embodiments, conductor 1560 is similar to conductor 960, and similar detailed description is therefore omitted.

Integrated circuit 1500D is a variation of integrated circuit 1500A of FIG. 15A, and similar detailed description is therefore omitted. In comparison with integrated circuit 1500A of FIG. 15A, the drain terminal of PMOS transistor P1 and the drain terminal of PMOS transistor P2, and the gate terminal of PMOS transistor P3, the gate terminal of NMOS transistor N3, and the drain terminal of NMOS transistor N1 are connected by conductor 1560.

In comparison with integrated circuit 1500A of FIG. 15A, the drain terminal of PMOS transistor P3 and the drain terminal of NMOS transistor N3, the output node Z and capacitors C3 and C4 are connected by conductor 1260.

Integrated circuit 1500D corresponds to the second circuit of method 100 of FIG. 1 after operation 114, and similar detailed description is therefore omitted.

In some embodiments, integrated circuit 1500D achieves one or more of the benefits discussed within the present disclosure.

FIG. 16 is a flowchart of a method 1600 of placing and routing ECO cells into a layout, in accordance with some embodiments.

It is understood that additional operations may be performed before, during, and/or after the method 1600 depicted in FIG. 16, and that some other processes may only be briefly described herein.

In some embodiments, method 1600 includes at least one or more of the features of methods 100-200, 500 and 600 applied to FIGS. 15A-15D, and similar detailed description is therefore omitted.

In some embodiments, method 1600 is the application of methods 100-200, 500 and 600 to ECO cells, and similar detailed description is therefore omitted. For example, in some embodiments, method 1600 is the application of methods 100-200, 500 and 600 to ECO cells, where one or more pins in a corresponding ECO cell are connected in a manner similar to methods 100-200, 500 and 600, and similar detailed description is therefore omitted.

In some embodiments, method 1600 is usable to connect a first pin and a second pin in an ECO replacement cell. In some embodiments, an ECO cell is a spare cell that is inserted into a layout. In some embodiments, the layout of method 1600 includes at least one of layout 300 of FIG. 3 or layout 400 of FIG. 4, cells 320A1, 320A2, 320B-320E of FIG. 3, cells 400A-400B or 440A-440E of FIG. 4, layouts 700A-700C of FIGS. 7A-7C, layout 800 of FIG. 8, layouts 900C-900D of FIGS. 9C-9D, layouts 1000B-1000C of FIGS. 10B-10C, layouts 1100B-1100C of FIGS. 11B-11C, layouts 1200B-1200C of FIGS. 12B-12C, layouts 1300B of FIG. 13B, layouts 1400B of FIG. 14B or layouts 1500B-1500C of FIGS. 15B-15C.

In operation 1602 of method 1600, one or more filler cells or decoupling capacitor (DCAP) cells are placed into the layout.

In some embodiments, operation 1602 includes filling existing cells with filler cells, and then placing the filler cells into the layout. In some embodiments, operation 1602 includes filling existing cells within the layout with filler cells. In some embodiments, a filler cell is a cell that has no logical function and is used to fill an empty space in a standard cell row.

In some embodiments, operation 1602 includes filling existing cells with DCAPS, and then placing the DCAP cells into the layout. In some embodiments, operation 1602 includes filling existing cells within the layout with DCAPS.

In some embodiments, DCAP cells improve the timing performance of the layout by reducing noise. In some embodiments, DCAP cells are added near one or more paths in the layout where timing requirements are not satisfied.

In some embodiments, the DCAPS of method 1600 include at least one of capacitor C1, C2, C3 or C4 in FIGS. 15A-15D.

In some embodiments, cells of operation 1602 correspond to ECO cells.

In operation 1604 of method 1600, one or more cells are placed into the layout and routed. In some embodiments, operation 1604 includes the actual placement of cells into the layout. In some embodiments, operation 1604 includes the placement of one or more standard cells into the layout. In some embodiments, operation 1604 of method 1600 includes one or more of operation 102, 104, 106, 108, 110, 112 or 114, and similar detailed description is therefore omitted.

In some embodiments, the one or more cells of operation 1604 includes at least one layout layouts 900C-900D of FIGS. 9C-9D, layouts 1000B-1000C of FIGS. 10B-10C, layouts 1100B-1100C of FIGS. 11B-11C, layouts 1200B-1200C of FIGS. 12B-12C, layouts 1300B of FIG. 13B, layouts 1400B of FIG. 14B or layouts 1500B-1500C of FIGS. 15B-15C.

In operation 1606 of method 1600, one or more filler cells of operation 1602 are replaced with a corresponding ECO replacement cell. In some embodiments, operation 1606 includes replacing one or more filler cells with corresponding ECO cells where the performance (e.g., timing) of the layout should be improved.

In some embodiments, an ECO replacement cell is a functional version of the filler cell.

In some embodiments, the filler cell is able to be 'programed' (transformed) into an ECO replacement cell that is configured to operate and provide one of the same, common, low-level functions provided by a corresponding standard functional cell. In some embodiments, the ECO replacement cell is configured to operate and provide one of the logic functions including an inverter, NAND, NOR, XOR, D-latch, decoupling capacitor (DeCap), and-or-invert (AOI), or-and-invert (OAI), multiplexer, flip-flop, or the like. In some embodiments, the filler cell is programmed (transformed) into an ECO replacement cell by altering one or more connections within at least one filler cell (intra-filler-cell connections) such as metal to silicon contacts and metal to polysilicon contacts, or making other metal layer changes with corresponding vias or contacts.

In operation 1608 of method 1600, ECO joined pins are established within each ECO replacement cell. In some embodiments, operation 1608 of method 1600 includes reconnecting a first pin and second pin within each ECO replacement cell by the APR tool, similar to method 100-200, and similar detailed description is therefore omitted.

In some embodiments, operation 1608 of method 1600 includes applying one or more of operation 102, 104, 106, 108, 110, 112 or 114 to each of the ECO replacement cells, and similar detailed description is therefore omitted.

In operation 1610 of method 1600, a determination is made by system 1900 of FIG. 19 if one or more of the joined pins within each ECO replacement cell result in collision with existing APR routing. In some embodiments, operation 1610 of method 1600 includes applying one or more of operation 110, 112 or 114 to each of the ECO replacement cells, and similar detailed description is therefore omitted.

If one or more of the joined pins within each ECO replacement cell result in collision with existing APR routing, then method 1600 proceeds to operation 1612. In some embodiments, the collision process of operation 1610 is similar to the conflict of FIG. 4, and similar detailed description is therefore omitted.

If one or more of the joined pins within each ECO replacement cell do not result in collision with existing APR routing, then method 1600 proceeds to operation 1618.

In operation 1612 of method 1600, overlapping routing shapes are removed from the layout. In some embodiments, the overlapping routing shapes that are removed from the layout are routing shapes that have collisions of operation 1610 or conflicts of FIG. 4, and similar detailed description is therefore omitted. In some embodiments, operation 1612 includes disconnecting pins that were previously connected in at least operation 1608.

In operation 1614 of method 1600, other nets and routings are freezed. In some embodiments, the freezed other nets and routings cannot be used by the APR tool for routing.

In some embodiments, the freezed other nets and routings are freezed until the collisions of operation 1610 or conflicts of FIG. 4 are resolved.

In operation 1616 of method 1600, incremental routing is applied to the layout. In some embodiments, incremental routing is applied to the layout in order to resolve the collisions of operation 1610 or conflicts of FIG. 4.

In operation 1618 of method 1600, placement of patterns and cells in the layout is complete.

In operation 1620 of method 1600, performing at least one of ECO input routing or output routing of the layout.

While method 1600 is described as connecting the first pin and the second pin together, other numbers of pins can be connected together and are within the scope of the present disclosure.

In some embodiments, by using method 1600, a number of collisions with pre-existing APR routing during ECO placement is reduced compared to other approaches.

In some embodiments, by using method 1600, rerouting during ECO placement is reduced compared to other approaches, and ensures that the timing and power of the layout satisfy design parameters.

In some embodiments, method 1600 achieves one or more of the benefits discussed within the present disclosure.

Figure 17:
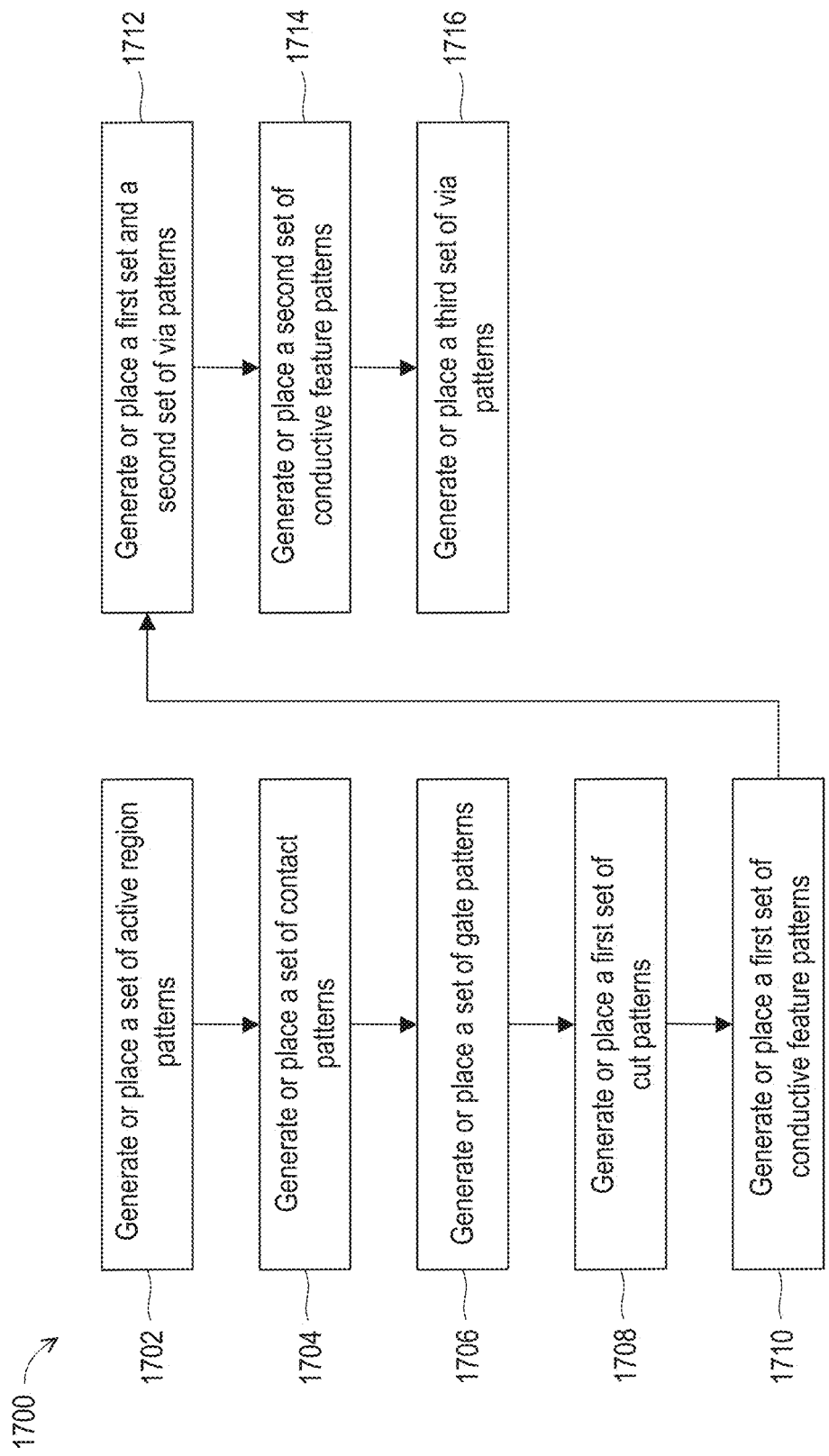
FIG. 17 is a flowchart of a method of generating a layout of an integrated circuit, in accordance with some embodiments.

FIG. 17 is a flowchart of a method 1700 of generating a layout of an integrated circuit, in accordance with some embodiments. It is understood that additional operations may be performed before, during, and/or after the method 1700 depicted in FIG. 17, and that some other processes may only be briefly described herein.

In some embodiments, method 1700 is an embodiment of at least one of operation 106 or 108 of method 100. In some embodiments, method 1700 is usable to generate one or more layout patterns of at least layout design 500A-500D, 700A-700B, 800A-800B, 900A-900B, 1000A-1000B or 1100A-1100B, or one or more features similar to at least integrated circuit 600.

In some embodiments, method 1700 is usable to generate one or more layout patterns having structural relationships including alignment, lengths and widths, as well as configurations and layers of at least layout 300A of FIG. 3, cell 320A1, 320A2, 320B-320E of FIG. 3, cell 400A-400B or 440A-440E of FIG. 4, layout 700A-700C of FIGS. 7A-7C, layout 800 of FIG. 8, layout 900C-900D of FIGS. 9C-9D, layout 1000B-1000C of FIGS. 10B-10C, layout 1100B-1100C of FIGS. 11B-11C, layout 1200B-1200C of FIGS. 12B-12C, layout 1300B of FIG. 13B, layout 1400B of FIG. 14B or layout 1500B-1500C of FIGS. 15B-15C, or one or more features similar to at least integrated circuit 900G, and similar detailed description will not be described in FIG. 17, for brevity.

In operation 1702 of method 1700, a set of active region patterns is generated or placed on the layout design. In some embodiments, the set of active region patterns of method 1700 includes at least portions of one or more patterns of the set of active region patterns 902 or 1202. In some embodiments, the set of active region patterns of method 1700 includes one or more regions similar to the active regions 902a' or 902b'. In some embodiments, the set of active region patterns of method 1700 includes one or more active region patterns in the OD layer.

In operation 1704 of method 1700, a set of contact patterns is generated or placed on the layout design. In some embodiments, the set of contact pattern of method 1700 includes at least portions of one or more patterns of at least the set of contact patterns 906 or 1206. In some embodiments, the first set of contact patterns of method 1700 includes one or more contact patterns similar to at least contacts 906b' or 906g'. In some embodiments, the set of contact patterns of method 1700 includes one or more contact patterns in the MD layer.

In operation 1706 of method 1700, a set of gate patterns is generated or placed on the layout design. In some embodiments, the set of gate patterns of method 1700 includes at least portions of one or more gate patterns of the set of gate patterns 904 or 1204. In some embodiments, the set of gate patterns of method 1700 includes one or more gate patterns in the POLY layer.

In operation 1708 of method 1700, a first set of cut patterns is generated or placed on the layout design. In some embodiments, the first set of cut patterns of method 1700 includes at least portions of one or more cut patterns of the cut feature pattern 1130.

In operation 1710 of method 1700, a first set of conductive feature patterns is generated or placed on the layout design. In some embodiments, the first set of conductive feature patterns of method 1700 includes at least portions of one or more patterns of at least the set of conductive feature patterns 920, 1220 or 1520.

In some embodiments, the first set of conductive feature patterns of method 1700 includes at least portions of one or more patterns of at least conductive feature pattern 302 or 304 of FIG. 3, conductive feature pattern 402 or 404 of FIG. 4, conductive feature patterns 704a-704d, 706a-706d or 708a-708d of FIGS. 7A-7C, conductive feature patterns 802 and 804 of FIG. 8, conductive feature patterns 920a-920e of FIGS. 9C-9D, 10B-10C, 11B-11C, 12B-12C, conductive feature pattern 1220a-1220e of FIGS. 12B-12C, conductive feature patterns 1320a-1320b, 1322a, 1324a, 1330a-1330b, 1332a, 1334a, 1340a-1340b, 1342a, 1344a of FIGS. 13A-13B, conductive feature patterns 1420a-1420e of FIG. 14B or conductive feature patterns 1520a-1520d of FIGS. 15B-15C.

In some embodiments, the first set of conductive feature patterns of method 1700 includes one or more conductive feature patterns similar to at least conductors 920a' or 920e'. In some embodiments, the set of conductive feature patterns of method 1700 includes one or more conductive feature patterns in the M0 layer.

In operation 1712 of method 1700, a first set of via patterns and a second set of via patterns are generated or placed on the layout design.

In some embodiments, the first set of via patterns of method 1700 includes at least portions of one or more via patterns of set of via patterns 910 or 1210. In some embodiments, the first set of via patterns of method 1700 includes one or more via patterns similar to at least via 910a'. In some embodiments, the first set of via patterns of method 1700 includes one or more vias similar to at least vias in the VD layer.

In some embodiments, the second set of via patterns of method 1700 includes at least portions of one or more via patterns of set of via patterns 912, 1212 or 1512. In some embodiments, the second set of via patterns of method 1700 includes one or more vias similar to at least vias in the VG layer.

In operation 1714 of method 1700, a second set of conductive feature patterns is generated or placed on the layout design. In some embodiments, the second set of conductive feature patterns of method 1700 includes at least portions of one or more conductive feature patterns of at least the set of conductive feature patterns 930, 1230 or 1530.

In some embodiments, the second set of conductive feature patterns of method 1700 includes at least portions of one or more conductive feature patterns of at least conductive feature pattern 322 or 332 of FIG. 3, conductive feature pattern 930a of FIGS. 9E, 10C and 11C, conductive feature pattern 1230a of FIG. 12C, conductive feature patterns 1430a, 1430b and 1430c of FIG. 14B or conductive feature patterns 1530a and 1530b of FIG. 15C.

In some embodiments, the second set of conductive feature patterns of method 1700 includes one or more conductive feature patterns similar to at least conductor 960, 1160, 1260 or 1560. In some embodiments, the second set of conductive feature patterns of method 1700 includes one or more conductors similar to at least conductors in the M0 layer.

In operation 1716 of method 1700, a third set of via patterns are generated or placed on the layout design.

In some embodiments, the third set of via patterns of method 1700 includes at least portions of one or more via patterns of set of via patterns 932, 1232 or 1532.

In some embodiments, the third set of via patterns of method 1700 includes at least portions of one or more via patterns of via pattern 324 or 334 of FIG. 3, via pattern 932a of FIGS. 9E, 10C and 11C, via pattern 1232c of FIG. 12C or via patterns 1532a and 1532c of FIG. 15C. In some embodiments, the third set of via patterns of method 1700 includes at least portions of one or more via patterns of via pattern 326 or 336 of FIG. 3, via pattern 932b of FIGS. 9E, 10C and 11C, via pattern 1232c of FIG. 12C or via patterns 1532b and 1532d of FIG. 15C.

In some embodiments, the third set of via patterns of method 1700 includes one or more via patterns similar to at least via 932a' or 932b'. In some embodiments, the third set of via patterns of method 1700 includes one or more vias similar to at least vias in the V0 layer.

FIG. 18 is a corresponding functional flow charts of method 1800 of manufacturing an IC device, in accordance with some embodiments. It is understood that additional operations may be performed before, during, and/or after at least one of method 1800 depicted in FIG. 18, and that some other processes may only be briefly described herein.

In some embodiments, other order of operations of method 1800 is within the scope of the present disclosure. Method 1800 include exemplary operations, but the operations are not necessarily performed in the order shown. Operations may be combined, divided, added, replaced, changed order, and/or eliminated as appropriate, in accordance with the spirit and scope of disclosed embodiments. In some embodiments, one or more of the operations of at least method 100, 200 500, 600, 1600, 1700 or 1800 is not performed.

In some embodiments, method 1800 is an embodiment of operation 116 of method 100. In some embodiments, the method 1800 is usable to manufacture or fabricate at least integrated circuit 900E, 900G, 1000D, 1100D, 1200D, 1300A, 1400A or 1500D, or an integrated circuit with similar features as at least layout 300A of FIG. 3, cell 320A1, 320A2, 320B-320E of FIG. 3, cell 400A-400B or 440A-440E of FIG. 4, layout 700A-700C of FIGS. 7A-7C, layout 800 of FIG. 8, layout 900C-900D of FIGS. 9C-9D, layout 1000B-1000C of FIGS. 10B-10C, layout 1100B-1100C of FIGS. 11B-11C, layout 1200B-1200C of FIGS. 12B-12C, layout 1300B of FIG. 13B, layout 1400B of FIG. 14B or layout 1500B-1500C of FIGS. 15B-15C.

In operation 1802 of method 1800, a set of active regions of a set of transistors is formed in a front-side of a substrate 990. In some embodiments, the set of transistors of at least method 1800 includes one or more transistors in active regions 902a' or 902b'. In some embodiments, the set of transistors of at least method 1800 includes one or more transistors described herein. In some embodiments, the set of active regions includes one or more active regions similar to the set of active region patterns 902 or 1202.

In some embodiments, operation 1802 further includes at least operation 1802a. In some embodiments, operation 1802a (not shown) includes fabricating source and drain regions of the set of transistors in a first well. In some embodiments, the first well comprises p-type dopants. In some embodiments, the p-dopants include boron, aluminum or other suitable p-type dopants. In some embodiments, the first well comprises an epi-layer grown over a substrate. In some embodiments, the epi-layer is doped by adding dopants during the epitaxial process. In some embodiments, the epi-layer is doped by ion implantation after the epi-layer is formed. In some embodiments, the first well is formed by doping the substrate. In some embodiments, the doping is performed by ion implantation. In some embodiments, the first well has a dopant concentration ranging from $1\times10^{12}$ atoms/cm$^3$ to $1\times10^{14}$ atoms/cm$^3$. Other dopant concentrations are in the scope of the present disclosure.

In some embodiments, the first well comprises n-type dopants. In some embodiments, the n-type dopants include phosphorus, arsenic or other suitable n-type dopants. In some embodiments, the n-type dopant concentration ranges from about $1\times10^{12}$ atoms/cm$^3$ to about $1\times10^{14}$ atoms/cm$^3$. Other dopant concentrations are in the scope of the present disclosure.

In some embodiments, the formation of the source/drain features includes, a portion of the substrate is removed to form recesses at an edge of spacers, and a filling process is then performed by filling the recesses in the substrate. In some embodiments, the recesses are etched, for example, a wet etching or a dry etching, after removal of a pad oxide layer or a sacrificial oxide layer. In some embodiments, the etch process is performed to remove a top surface portion of the active region adjacent to an isolation region, such as an STI region. In some embodiments, the filling process is performed by an epitaxy or epitaxial (epi) process. In some embodiments, the recesses are filled using a growth process which is concurrent with an etch process where a growth rate of the growth process is greater than an etch rate of the etch process. In some embodiments, the recesses are filled using a combination of growth process and etch process. For example, a layer of material is grown in the recess and then the grown material is subjected to an etch process to remove a portion of the material. Then a subsequent growth process is performed on the etched material until a desired thickness of the material in the recess is achieved. In some embodiments, the growth process continues until a top surface of the material is above the top surface of the substrate. In some embodiments, the growth process is continued until the top surface of the material is co-planar with the top surface of the substrate. In some embodiments, a portion of the first well is removed by an isotropic or an anisotropic etch process. The etch process selectively etches the first well without etching a gate structure and any spacers. In some embodiments, the etch process is performed using a reactive ion etch (RIE), wet etching, or other suitable techniques. In some embodiments, a semiconductor material is deposited in the recesses to form the source/drain features. In some embodiments, an epi process is performed to deposit the semiconductor material in the recesses. In some embodiments, the epi process includes a selective epitaxy growth (SEG) process, CVD process, molecular beam epitaxy (MBE), other suitable processes, and/or combination thereof. The epi process uses gaseous and/or liquid precursors, which interacts with a composition of substrate. In some embodiments, the source/drain features include epitaxially grown silicon (epi Si), silicon carbide, or silicon germanium. Source/drain features of the IC device associated with the gate structure are in-situ doped or undoped during the epi process in some instances. When source/drain features are undoped during the epi process, source/drain features are doped during a subsequent process in some instances. The subsequent doping process is achieved by an ion implantation, plasma immersion ion implantation, gas and/or solid source diffusion, other suitable processes, and/ or combination thereof. In some embodiments, source/drain features are further exposed to annealing processes after forming source/drain features and/or after the subsequent doping process.

In operation 1804 of method 1800, a first conductive material is deposited over source/drain regions of the set of transistors on a first level thereby forming a set of contacts of the set of transistors. In some embodiments, the first level of at least method 1800 includes the MD level or the POLY level.

In some embodiments, the source/drain regions of the set of transistors of at least method 1800 includes the source/ drain regions of one or more transistors in the set of active regions. In some embodiments, the set of contacts of at least method 1800 include at least contacts 906b' or 906g'. In some embodiments, the set of contacts includes one or more contacts similar to the set of contact patterns 906 or 1206. In some embodiments, the set of contacts of at least method 1800 includes features in the MD level.

In operation 1806 of method 1800, a set of gates of the set of transistors is formed on the second level. In some embodiments, the set of gates of at least method 1800 includes gate regions similar to the set of gate patterns 904 or 1204. In some embodiments, the second level of at least method 1800 includes the POLY level.

In some embodiments, the gate region is between the drain region and the source region. In some embodiments, the gate region is over the first well and the substrate. In some embodiments, fabricating the gate regions of operation 1806 includes performing one or more deposition processes to form one or more dielectric material layers. In some embodiments, a deposition process includes a chemical vapor deposition (CVD), a plasma enhanced CVD (PECVD), an atomic layer deposition (ALD), or other process suitable for depositing one or more material layers.

In some embodiments, fabricating the gate regions includes performing one or more deposition processes to form one or more conductive material layers. In some embodiments, fabricating the gate regions includes forming gate electrodes or dummy gate electrodes. In some embodiments, fabricating the gate regions includes depositing or growing at least one dielectric layer, e.g., gate dielectric. In some embodiments, gate regions are formed using a doped or non-doped polycrystalline silicon (or polysilicon). In some embodiments, the gate regions include a metal, such as Al, Cu, W, Ti, Ta, TiN, TaN, NiSi, CoSi, other suitable conductive materials, or combinations thereof.

In operation 1808 of method 1800, a cut process is performed to remove portions of the set of gates. In some embodiments, the removed portions of the set of gates of at least method 1800 includes features similar to at least cut feature pattern 1130. In some embodiments, the removed portions of the set of gates of at least method 1800 includes features in the POLY level.

In some embodiments, operation 1808 is performed by one or more removal processes. In some embodiments, the one or more removal processes include one or more etching processes suitable to remove a portion of the gate structure. In some embodiments, the etching process of operation 1808 includes identifying a portion of the gate structure that is to be removed, and etching the portion of the gate structure that is to be removed. In some embodiments, a mask is used to specify portions of the gate structure that are to be cut or removed.

In some embodiments the mask is a hard mask. In some embodiments, the mask is a soft mask. In some embodiments, etching corresponds to plasma etching, reactive ion etching, chemical etching, dry etching, wet etching, other suitable processes, any combination thereof, or the like.

In operation 1810 of method 1800, a first set of vias and a second set of vias are formed.

In some embodiments, the first set of vias of at least method 1800 are in the VD. In some embodiments, the first set of vias of at least method 1800 includes at least via 910a'. In some embodiments, the first set of vias includes one or more vias similar to the set of via patterns 910 or 1210.

In some embodiments, the second set of vias of at least method 1800 are in the VG level. In some embodiments, the second set of vias includes one or more vias similar to the set of via patterns 912, 1212 or 1512.

In some embodiments, the first set of vias are formed over the first set of contacts. In some embodiments, the second set of vias are formed over the set of gates.

In some embodiments, operation 1810 includes forming a first and second set of self-aligned contacts (SACs) in the insulating layer over the front-side of the wafer. In some embodiments, the first and second set of vias are electrically coupled to at least the set of transistors.

In operation 1812 of method 1800, a second conductive material is deposited on a third level thereby forming a second set of conductive lines. In some embodiments, the third level of at least method 1800 includes the M0 layer. In some embodiments, operation 1814 includes at least depositing a first set of conductive regions over the front-side of the integrated circuit.

In some embodiments, the first set of conductive lines of at least method 1800 includes one or more portions of at least conductor 920a' or 920e'. In some embodiments, the first set of conductive lines includes one or more conductive lines similar to the set of conductive feature patterns 920 or 1220.

In some embodiments, the first set of conductive lines includes one or more conductive lines similar to at least one of conductive feature pattern 302 or 304 of FIG. 3, conductive feature pattern 402 or 404 of FIG. 4, conductive feature pattern 402 or 404 of FIG. 4, conductive feature patterns 704a-704d, 706a-706d or 708a-708d of FIGS. 7A-7C, conductive feature patterns 802 and 804 of FIG. 8, conductive feature patterns 920a-920e of FIGS. 9C-9D, 10B-10C, 11B-11C, 12B-12C, conductive feature pattern 1220a-1220e of FIGS. 12B-12C, conductive feature patterns 1320a-1320b, 1322a, 1324a, 1330a-1330b, 1332a, 1334a, 1340a-1340b, 1342a, 1344a of FIGS. 13A-13B, conductive feature patterns 1420a-1420e of FIG. 14B or conductive feature patterns 1520a-1520d of FIGS. 15B-15C.

In operation 1814 of method 1800, a third set of vias are formed. In some embodiments, the third set of vias of at least method 1800 are in the V0 level. In some embodiments, the third set of vias of at least method 1800 includes at least via 932a' or 932b'. In some embodiments, the third set of vias includes one or more vias similar to the set of via patterns 932, 1232 or 1532.

In some embodiments, the third set of vias includes one or more vias similar to at least one or more via patterns of via pattern 324 or 334 of FIG. 3, via pattern 932a of FIGS. 9E, 10C and 11C, via pattern 1232c of FIG. 12C or via patterns 1532a and 1532c of FIG. 15C. In some embodiments, the third set of vias includes one or more vias similar to at least one or more via patterns of via pattern 326 or 336 of FIG. 3, via pattern 932b of FIGS. 9E, 10C and 11C, via pattern 1232c of FIG. 12C or via patterns 1532b and 1532d of FIG. 15C.

In operation 1816 of method 1800, a third conductive material is deposited on a fourth level thereby forming a first set of conductors. In some embodiments, the fourth level of at least method 1800 includes the M1 layer. In some embodiments, the first set of conductors of at least method 1800 includes one or more portions of at least the conductor 960, 1160, 1260 or 1560.

In some embodiments, the first set of conductors includes one or more conductive lines similar to the set of conductive feature patterns 930, 1230 or 1530. In some embodiments, the first set of conductors includes one or more conductors similar to at least one or more conductive feature patterns of at least conductive feature pattern 322 or 332 of FIG. 3, conductive feature pattern 930a of FIGS. 9E, 10C and 11C, conductive feature pattern 1230a of FIG. 12C, conductive feature patterns 1430a, 1430b and 1430c of FIG. 14B or conductive feature patterns 1530a and 1530b of FIG. 15C.

In some embodiments, the first set of conductors of at least method 1800 includes one or more conductors similar to at least conductors in the M1 layer.

FIG. 19 is a schematic view of a system 1900 for designing an IC layout design and manufacturing an IC circuit in accordance with some embodiments.

In some embodiments, system 1900 generates or places one or more IC layout designs described herein. System 1900 includes a hardware processor 1902 and a non-transitory, computer readable storage medium 1904 (e.g., memory 1904) encoded with, i.e., storing, the computer program code 1906, i.e., a set of executable instructions 1906. Computer readable storage medium 1904 is configured for interfacing with manufacturing machines for producing the integrated circuit. The processor 1902 is electrically coupled to the computer readable storage medium 1904 via a bus 1908. The processor 1902 is also electrically coupled to an I/O interface 1910 by bus 1908. A network interface 1912 is also electrically connected to the processor 1902 via bus 1908.

Network interface 1912 is connected to a network 1914, so that processor 1902 and computer readable storage medium 1904 are capable of connecting to external elements via network 1914. The processor 1902 is configured to execute the computer program code 1906 encoded in the computer readable storage medium 1904 in order to cause system 1900 to be usable for performing a portion or all of the operations as described in methods 100-200, 500-600 and 1600-1700.

In some embodiments, the processor 1902 is a central processing unit (CPU), a multi-processor, a distributed processing system, an application specific integrated circuit (ASIC), and/or a suitable processing unit.

In some embodiments, the computer readable storage medium 1904 is an electronic, magnetic, optical, electromagnetic, infrared, and/or a semiconductor system (or apparatus or device). For example, the computer readable storage medium 1904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1904 includes a compact disk-read only memory (CD-ROM), a compact disk-read/write (CD-R/W), and/or a digital video disc (DVD).

In some embodiments, the storage medium 1904 stores the computer program code 1906 configured to cause system 1900 to perform methods 100-200, 500-600 and 1600-1700. In some embodiments, the storage medium 1904 also stores information needed for performing methods 100-200, 500-600 and 1600-1700 as well as information generated during performing methods 100-200, 500-600 and 1600-1700, such as layout design 1916, user interface 1918, standard cell library 1920, netlist 1922 and fabrication tool 1930, and/or a set of executable instructions to perform the operation of methods 100-200, 500-600 and 1600-1700. In some embodiments, layout design 1916 comprises one or more of layout patterns of at least layout design 500A-500D, 700A-700B, 800A-800B, 900A-900B, 1000A-1000B or 1100A-1100B, or features similar to at least integrated circuit 600.

In some embodiments, the storage medium 1904 stores instructions (e.g., computer program code 1906) for interfacing with manufacturing machines. The instructions (e.g., computer program code 1906) enable processor 1902 to generate manufacturing instructions readable by the manufacturing machines to effectively implement methods 100-200, 500-600 and 1600-1700 during a manufacturing process.

System 1900 includes I/O interface 1910. I/O interface 1910 is coupled to external circuitry. In some embodiments, I/O interface 1910 includes a keyboard, keypad, mouse, trackball, trackpad, and/or cursor direction keys for communicating information and commands to processor 1902.

System 1900 also includes network interface 1912 coupled to the processor 1902. Network interface 1912 allows system 1900 to communicate with network 1914, to which one or more other computer systems are connected. Network interface 1912 includes wireless network interfaces such as BLUETOOTH, WIFI, WIMAX, GPRS, or WCDMA; or wired network interface such as ETHERNET, USB, or IEEE-2094. In some embodiments, methods 100-200, 500-600 and 1600-1700 is implemented in two or more systems 1900, and information such as layout design, and user interface are exchanged between different systems 1900 by network 1914.

System 1900 is configured to receive information related to a layout design through I/O interface 1910 or network interface 1912. The information is transferred to processor 1902 by bus 1908 to determine a layout design for producing at least integrated circuit 600. The layout design is then stored in computer readable medium 1904 as layout design 1916. System 1900 is configured to receive information related to a user interface through I/O interface 1910 or network interface 1912. The information is stored in computer readable medium 1904 as user interface 1918. System 1900 is configured to receive information related to a standard cell library through I/O interface 1910 or network interface 1912. The information is stored in computer readable medium 1904 as standard cell library 1920. System 1900 is configured to receive information related to a netlist through I/O interface 1910 or network interface 1912. The information is stored in computer readable medium 1904 as netlist 1922. System 1900 is configured to receive information related to a fabrication tool 1930 through I/O interface 1910 or network interface 1912. The information is stored in computer readable medium 1904 as fabrication tool 1930. In some embodiments, the fabrication tool 1930 includes fabrication information utilized by system 1900. In some embodiments, the fabrication tool 1930 corresponds to mask fabrication 2034 of FIG. 20.

In some embodiments, methods 100-200, 500-600 and 1600-1700 is implemented as a standalone software application for execution by a processor. In some embodiments, methods 100-200, 500-600 and 1600-1700 is implemented as a software application that is a part of an additional software application. In some embodiments, methods 100-200, 500-600 and 1600-1700 is implemented as a plug-in to a software application. In some embodiments, methods 100-200, 500-600 and 1600-1700 is implemented as a software application that is a portion of an EDA tool. In some embodiments, methods 100-200, 500-600 and 1600-1700 is implemented as a software application that is used by an EDA tool. In some embodiments, the EDA tool is used to generate a layout of the integrated circuit device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, methods 100-200, 500-600 and 1600-1700 is implemented by a manufacturing device to manufacture an integrated circuit using a set of masks manufactured based on one or more layout designs generated by system 1900. In some embodiments, system 1900 is a manufacturing device configured to manufacture an integrated circuit using a set of masks manufactured based on one or more layout designs of the present disclosure. In some embodiments, system 1900 of FIG. 19 generates layout designs of an integrated circuit that are smaller than other approaches. In some embodiments, system 1900 of FIG. 19 generates layout designs of integrated circuit structure that occupy less area and provide better routing resources than other approaches.

FIG. 20 is a block diagram of an integrated circuit (IC) manufacturing system 2000, and an IC manufacturing flow associated therewith, in accordance with at least one embodiment of the present disclosure. In some embodiments, based on a layout diagram, at least one of (A) one or more semiconductor masks or (B) at least one component in a layer of a semiconductor integrated circuit is fabricated using manufacturing system 2000.

In FIG. 20, IC manufacturing system 2000 (hereinafter "system 2000") includes entities, such as a design house 2020, a mask house 2030, and an IC manufacturer/fabricator ("fab") 2040, that interact with one another in the design, development, and manufacturing cycles and/or services related to manufacturing an IC device 2060. The entities in system 2000 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, one or more of design house 2020, mask house 2030, and IC fab 2040 is owned by a single larger company. In some embodiments, one or more of design house 2020, mask house 2030, and IC fab 2040 coexist in a common facility and use common resources.

Design house (or design team) 2020 generates an IC design layout 2022. IC design layout 2022 includes various geometrical patterns designed for an IC device 2060. The geometrical patterns correspond to patterns of metal, oxide, or semiconductor layers that make up the various components of IC device 2060 to be fabricated. The various layers combine to form various IC features. For example, a portion of IC design layout 2022 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 2020 implements a proper design procedure to form IC design layout 2022. The design procedure includes one or more of logic design, physical design or place and route. IC design layout 2022 is presented in one or more data files having information of the geometrical patterns. For example, IC design layout 2022 can be expressed in a GDSII file format or DFII file format.

Mask house 2030 includes data preparation 2032 and mask fabrication 2034. Mask house 2030 uses IC design layout 2022 to manufacture one or more masks 2045 to be used for fabricating the various layers of IC device 2060 according to IC design layout 2022. Mask house 2030 performs mask data preparation 2032, where IC design layout 2022 is translated into a representative data file (RDF). Mask data preparation 2032 provides the RDF to mask fabrication 2034. Mask fabrication 2034 includes a mask writer. A mask writer converts the RDF to an image on a substrate, such as a mask (reticle) 2045 or a semiconductor wafer 2042. The design layout 2022 is manipulated by mask data preparation 2032 to comply with particular characteristics of the mask writer and/or requirements of IC fab 2040. In FIG. 20, mask data preparation 2032 and mask fabrication 2034 are illustrated as separate elements. In some embodiments, mask data preparation 2032 and mask fabrication 2034 can be collectively referred to as mask data preparation.

In some embodiments, mask data preparation 2032 includes optical proximity correction (OPC) which uses lithography enhancement techniques to compensate for image errors, such as those that can arise from diffraction, interference, other process effects and the like. OPC adjusts IC design layout 2022. In some embodiments, mask data preparation 2032 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 2032 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 2034, which may undo part of the modifications performed by OPC in order to meet mask creation rules.

In some embodiments, mask data preparation 2032 includes lithography process checking (LPC) that simulates processing that will be implemented by IC fab 2040 to fabricate IC device 2060. LPC simulates this processing based on IC design layout 2022 to create a simulated manufactured device, such as IC device 2060. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 2022.

It should be understood that the above description of mask data preparation 2032 has been simplified for the purposes of clarity. In some embodiments, data preparation 2032 includes additional features such as a logic operation (LOP) to modify the IC design layout according to manufacturing rules. Additionally, the processes applied to IC design layout 2022 during data preparation 2032 may be executed in a variety of different orders.

After mask data preparation 2032 and during mask fabrication 2034, a mask 2045 or a group of masks 2045 are fabricated based on the modified IC design layout 2022. In some embodiments, mask fabrication 2034 includes performing one or more lithographic exposures based on IC design 2022. In some embodiments, an electron-beam (e-beam) or a mechanism of multiple e-beams is used to form a pattern on a mask (photomask or reticle) 2045 based on the modified IC design layout 2022. The mask 2045 can be formed in various technologies. In some embodiments, the mask 2045 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary version of mask 2045 includes a transparent substrate (e.g., fused quartz) and an opaque material (e.g., chromium) coated in the opaque regions of the binary mask. In another example, the mask 2045 is formed using a phase shift technology. In the phase shift mask (PSM) version of mask 2045, various features in the pattern formed on the mask are configured to have proper phase difference to enhance the resolution and imaging quality. In various examples, the phase shift mask can be attenuated PSM or alternating PSM. The mask(s) generated by mask fabrication 2034 is used in a variety of processes. For example, such a mask(s) is used in an ion implantation process to form various doped regions in the semiconductor wafer, in an etching process to form various etching regions in the semiconductor wafer, and/or in other suitable processes.

IC fab 2040 is an IC fabrication entity that includes one or more manufacturing facilities for the fabrication of a variety of different IC products. In some embodiments, IC Fab 2040 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 2040 includes wafer fabrication tools 2052 (hereinafter "fabrication tools 2052") configured to execute various manufacturing operations on semiconductor wafer 2042 such that IC device 2060 is fabricated in accordance with the mask(s), e.g., mask 2045. In various embodiments, fabrication tools 2052 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 2040 uses mask(s) 2045 fabricated by mask house 2030 to fabricate IC device 2060. Thus, IC fab 2040 at least indirectly uses IC design layout 2022 to fabricate IC device 2060. In some embodiments, a semiconductor wafer 2042 is fabricated by IC fab 2040 using mask(s) 2045 to form IC device 2060. In some embodiments, the IC fabrication includes performing one or more lithographic exposures based at least indirectly on IC design 2022. Semiconductor wafer 2042 includes a silicon substrate or other proper substrate having material layers formed thereon. Semiconductor wafer 2042 further includes one or more of various doped regions, dielectric features, multilevel interconnects, and the like (formed at subsequent manufacturing steps).

System 2000 is shown as having design house 2020, mask house 2030 or IC fab 2040 as separate components or entities. However, it is understood that one or more of design house 2020, mask house 2030 or IC fab 2040 are part of the same component or entity.

One aspect of this description relates to a method of forming an integrated circuit (IC), the method includes generating, by a processor, a netlist of a first circuit, wherein the first circuit is configured as a non-functional circuit, and the first circuit includes a first pin and a second pin that are electrically disconnected from each other. In some embodiments, generating the netlist of the first circuit includes designating the first pin and the second pin as a first group of pins that are to be connected together. In some embodiments, the method further includes generating, by the processor, a first cell layout of the first circuit, wherein the first cell layout includes a first conductive feature pattern and a second conductive feature pattern extending in a first direction, being on a first layout level, and being separated from each other in a second direction different from the first direction, wherein the first conductive feature pattern and the second conductive feature pattern are not coupled together, the first conductive feature pattern corresponds to the first pin, and the second conductive feature pattern corresponds to the second pin. In some embodiments, the method further includes placing the first cell layout, by an automatic placement and routing (APR) tool, in a first region of a layout design. In some embodiments, placing the first cell layout by the APR tool includes connecting the first pin and the second pin in the first group of pins together thereby changing the first circuit to a second circuit, the second circuit being configured as a functional version of the first circuit.

Another aspect of this description relates to a system for manufacturing an integrated circuit, the system includes a non-transitory computer readable medium configured to store executable instructions, and a processor coupled to the non-transitory computer readable medium, wherein the processor is configured to execute the instructions for generating a netlist of a first circuit, wherein the first circuit is configured as a non-functional circuit, and the first circuit includes a first pin, a second pin and a third pin that are electrically disconnected from each other. In some embodiments, generating the netlist of the first circuit includes the integrated circuit further includes grouping the first pin, the second pin and the third pin together into a first set of to be connected pins. In some embodiments, the processor is configured to execute the instructions for generating a first cell layout of the first circuit, wherein the first cell layout includes a first conductive feature pattern corresponding to the first pin, a second conductive feature pattern corresponding to the second pin, and a third conductive feature pattern corresponding to the third pin. In some embodiments, the processor is configured to execute the instructions for placing the first cell layout, by an automatic placement and routing (APR) tool, in a first region of a layout design, wherein placing the first cell layout by the APR tool includes connecting the first set of to be connected pins together, thereby changing the first circuit to a second circuit, the second circuit being configured as a functional version of the first circuit.

Still another aspect of this description relates to a non-transitory computer readable medium configured to store executable instructions. In some embodiments, the executable instructions are configured to be executed by a processor coupled to the non-transitory computer readable medium that cause the processor to perform a method including generating a netlist of a first circuit, wherein the first circuit is configured as a non-functional circuit, and the first circuit includes a first pin and a second pin that are electrically disconnected from each other. In some embodiments, generating the netlist of the first circuit includes labelling the first pin and the second pin as a first set of to be connected pins, and designating the first set of to be connected pins as a common group of pins that are to be connected together. In some embodiments, the method further includes generating a first cell layout of the first circuit, wherein the first cell layout includes a first conductive feature pattern corresponding to the first pin, and a second conductive feature pattern corresponding to the second pin, and being in a first layout level. In some embodiments, the method further includes placing the first cell layout, by an automatic placement and routing (APR) tool, in a first region of a layout design. In some embodiments, placing the first cell layout by the APR tool includes connecting the first set of to be connected pins in the common group of pins together, thereby changing the first circuit to a second circuit, the second circuit being configured as a functional version of the first circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated circuit (IC), the method comprising:
generating, by a processor, a netlist of a first circuit, wherein the first circuit is configured as a non-functional circuit, and the first circuit includes a first pin and a second pin that are electrically disconnected from each other, wherein generating the netlist of the first circuit comprises:
designating the first pin and the second pin as a first group of pins that are to be connected together;
generating, by the processor, a first cell layout of the first circuit, wherein the first cell layout includes a first conductive feature pattern and a second conductive feature pattern extending in a first direction, being on a first layout level, and being separated from each other in a second direction different from the first direction, wherein the first conductive feature pattern and the second conductive feature pattern are not coupled together, the first conductive feature pattern corresponds to the first pin, and the second conductive feature pattern corresponds to the second pin;
placing the first cell layout, by an automatic placement and routing (APR) tool, in a first region of a layout design, wherein placing the first cell layout by the APR tool comprises:
connecting the first pin and the second pin in the first group of pins together thereby changing the first circuit to a second circuit, the second circuit being configured as a functional version of the first circuit.

2. The method of claim 1, wherein designating the first pin and the second pin as the first group of pins that are to be connected together comprises:
labelling the first pin and the second pin with a common label and as a first set of to be connected pins; and
designating the first set of to be connected pins as the first group of pins that are to be connected together.

3. The method of claim 1, wherein designating the first pin and the second pin as the first group of pins that are to be connected together comprises:
labelling the first pin with a first label as a first to be connected pin and the second pin with a second label as a second to be connected pin;
designating the first to be connected pin and the second to be connected pin as a first set of to be connected pins; and
designating the first set of to be connected pins as the first group of pins that are to be connected together.

4. The method of claim 1, wherein connecting the first pin and the second pin in the first group of pins together comprises:
connecting the first conductive feature pattern and the second conductive feature pattern by at least a third conductive feature pattern, the third conductive feature pattern extending in the second direction, overlapping the first conductive feature pattern and the second conductive feature pattern, and being on a second layout level above the first layout level.

5. The method of claim 4, wherein placing the first cell layout in the first region of the layout design comprises:
selecting a first routing track from a first set of candidate routing tracks, wherein the first set of candidate routing tracks are not occupied by a corresponding conductive feature pattern in the second layout level, the first set of candidate routing tracks extend in the second direction, and each routing track of the first set of candidate routing tracks is separated from one another in the first direction; and
placing the third conductive feature pattern in the first routing track.

6. The method of claim 4, wherein connecting the first conductive feature pattern and the second conductive feature pattern by at least the third conductive feature pattern comprises:
placing the third conductive feature pattern to overlap the first conductive feature pattern and the second conductive feature pattern, and being in a first routing track of a first set of routing tracks, the first set of routing tracks extending in the second direction, and each routing track of the first set of routing tracks being separated from one another in the first direction;
placing a first via pattern over the first conductive feature pattern, the first via pattern being between the first conductive feature pattern and the third conductive feature pattern, and coupling the first conductive feature pattern and the third conductive feature pattern together; and
placing a second via pattern over the second conductive feature pattern, the second via pattern being between the second conductive feature pattern and the third conductive feature pattern, and coupling the second conductive feature pattern and the third conductive feature pattern together.

7. The method of claim 6, wherein
the first circuit further includes a third pin and a fourth pin that are electrically disconnected from each other;
generating the netlist of the first circuit further comprises:
designating the third pin and the fourth pin as a second group of pins that are to be connected together;
the first cell layout further includes a fourth conductive feature pattern and a fifth conductive feature pattern extending in the first direction, being on the first layout level, and being separated from each other in the second direction, wherein the fourth conductive feature pattern and the fifth conductive feature pattern are not coupled together, the fourth conductive feature pattern corresponds to the third pin, and the fifth conductive feature pattern corresponds to the fourth pin.

8. The method of claim 7, wherein placing the first cell layout by the APR tool further comprises:
connecting the third pin and the fourth pin in the second group of pins together thereby further changing the first circuit to the second circuit.

9. The method of claim 8, wherein connecting the third pin and the fourth pin in the second group of pins together comprises:
connecting the fourth conductive feature pattern and the fifth conductive feature pattern by at least a sixth conductive feature pattern, the sixth conductive feature pattern extending in the second direction, overlapping the fourth conductive feature pattern and the fifth conductive feature pattern, and being on the second layout level.

10. The method of claim 9, wherein connecting the fourth conductive feature pattern and the fifth conductive feature pattern by at least the sixth conductive feature pattern comprises:

placing the sixth conductive feature pattern to overlap the fourth conductive feature pattern and the fifth conductive feature pattern, and being in a second routing track of a second set of routing tracks, the second set of routing tracks extending in the second direction, and each routing track of the second set of routing tracks being separated from one another in the first direction;

placing a third via pattern over the fourth conductive feature pattern, the third via pattern being between the fourth conductive feature pattern and the sixth conductive feature pattern, and coupling the fourth conductive feature pattern and the sixth conductive feature pattern together; and placing a fourth via pattern over the fifth conductive feature pattern, the fourth via pattern being between the fifth conductive feature pattern and the sixth conductive feature pattern, and coupling the fifth conductive feature pattern and the sixth conductive feature pattern together.

11. A system for manufacturing an integrated circuit, the system comprises:
a non-transitory computer readable medium configured to store executable instructions; and
a processor coupled to the non-transitory computer readable medium, wherein the processor is configured to execute the instructions for:
generating a netlist of a first circuit, wherein the first circuit is configured as a non-functional circuit, and the first circuit includes a first pin, a second pin and a third pin that are electrically disconnected from each other, wherein generating the netlist of the first circuit comprises:
grouping the first pin, the second pin and the third pin together into a first set of to be connected pins;
generating a first cell layout of the first circuit, wherein the first cell layout includes a first conductive feature pattern corresponding to the first pin, a second conductive feature pattern corresponding to the second pin, and a third conductive feature pattern corresponding to the third pin;
placing the first cell layout, by an automatic placement and routing (APR) tool, in a first region of a layout design, wherein placing the first cell layout by the APR tool comprises:
connecting the first set of to be connected pins together, thereby changing the first circuit to a second circuit, the second circuit being configured as a functional version of the first circuit.

12. The system of claim 11, wherein the processor configured to execute the instructions where connecting the first set of to be connected pins together, thereby changing the first circuit to the second circuit comprises:
connecting the first pin, the second pin and the third pin together.

13. The system of claim 12, wherein the processor configured to execute the instructions where connecting the first pin, the second pin and the third pin together comprises:
connecting the first conductive feature pattern, the second conductive feature pattern and the third conductive feature pattern by at least a fourth conductive feature pattern,
wherein the first conductive feature pattern, the second conductive feature pattern and the third conductive feature pattern extend in a first direction, are on a first layout level, and are separated from each other in a second direction different from the first direction,
the fourth conductive feature pattern extends in the second direction, overlaps the first conductive feature pattern, the second conductive feature pattern and the third conductive feature pattern, and is on a second layout level above the first layout level.

14. The system of claim 13, wherein the processor configured to execute the instructions where connecting the first conductive feature pattern, the second conductive feature pattern and the third conductive feature pattern by at least the fourth conductive feature pattern comprises:
placing the fourth conductive feature pattern to overlap the first conductive feature pattern, the second conductive feature pattern and the third conductive feature pattern, and being in a first routing track of a first set of routing tracks, the first set of routing tracks extending in the second direction, and each routing track of the first set of routing tracks being separated from one another in the first direction;
placing a first via pattern over the first conductive feature pattern, the first via pattern being between the first conductive feature pattern and the fourth conductive feature pattern, and coupling the first conductive feature pattern and the fourth conductive feature pattern together;
placing a second via pattern over the second conductive feature pattern, the second via pattern being between the second conductive feature pattern and the fourth conductive feature pattern, and coupling the second conductive feature pattern and the fourth conductive feature pattern together; and
placing a third via pattern over the third conductive feature pattern, the third via pattern being between the third conductive feature pattern and the fourth conductive feature pattern, and coupling the third conductive feature pattern and the fourth conductive feature pattern together.

15. The system of claim 11, wherein the first circuit includes:
a first transistor;
a second transistor;
a third transistor;
a fourth transistor; and
a fifth transistor,
wherein the first conductive feature pattern is coupled to a gate of the first transistor and a gate of the second transistor;
the second conductive feature pattern is coupled to a drain of the third transistor and a drain of the fourth transistor; and
the third conductive feature pattern is coupled to a drain of the fifth transistor.

16. A non-transitory computer readable medium configured to store executable instructions, wherein the executable instructions are configured to be executed by a processor coupled to the non-transitory computer readable medium that cause the processor to perform a method comprising:
generating a netlist of a first circuit, wherein the first circuit is configured as a non-functional circuit, and the first circuit includes a first pin and a second pin that are electrically disconnected from each other, wherein generating the netlist of the first circuit comprises:
labelling the first pin and the second pin as a first set of to be connected pins; and
designating the first set of to be connected pins as a common group of pins that are to be connected together;

generating a first cell layout of the first circuit, wherein the first cell layout includes a first conductive feature pattern corresponding to the first pin, and a second conductive feature pattern corresponding to the second pin, and being in a first layout level;

placing the first cell layout, by an automatic placement and routing (APR) tool, in a first region of a layout design, wherein placing the first cell layout by the APR tool comprises:

connecting the first set of to be connected pins in the common group of pins together, thereby changing the first circuit to a second circuit, the second circuit being configured as a functional version of the first circuit.

17. The non-transitory computer readable medium of claim 16, wherein connecting the first set of to be connected pins in the common group of pins together, thereby changing the first circuit to the second circuit comprises:

connecting the first pin and the second pin together.

18. The non-transitory computer readable medium of claim 16, wherein connecting the first pin and the second pin together comprises:

placing a third conductive feature pattern in a first routing track of a first set of candidate routing tracks, the third conductive feature pattern extending in a first direction, overlapping the first conductive feature pattern and the second conductive feature pattern, and being on a second layout level above the first layout level, and the first set of candidate routing tracks are not occupied by a corresponding conductive feature pattern in the second layout level, the first set of candidate routing tracks extend in the first direction, and each routing track of the first set of candidate routing tracks is separated from one another in a second direction different from the first direction; and connecting the first conductive feature pattern and the second conductive feature pattern by at least the third conductive feature pattern.

19. The non-transitory computer readable medium of claim 16, wherein the first circuit includes:

a first transistor;
a second transistor;
a third transistor;
a fourth transistor; and
a fifth transistor, wherein the first conductive feature pattern is coupled to a gate of the first transistor, a gate of the second transistor, a drain of the third transistor, and a drain of the fourth transistor; and the second conductive feature pattern is coupled to a drain of the fifth transistor.

20. The non-transitory computer readable medium of claim 16, wherein the first circuit includes:

a first transistor;
a second transistor;
a third transistor;
a fourth transistor; and
a fifth transistor, wherein the first conductive feature pattern is coupled to a gate of the first transistor, a drain of the third transistor, and a drain of the fourth transistor; and the second conductive feature pattern is coupled to a drain of the fifth transistor and a gate of the first transistor.

\* \* \* \* \*